US012431649B2

(12) United States Patent
Yayoshi

(10) Patent No.: US 12,431,649 B2
(45) Date of Patent: Sep. 30, 2025

(54) MATEABLE SURFACE MOUNT CONNECTORS WITH DIFFERENT DISTANCES BETWEEN CONTACT POINTS

(71) Applicant: JAPAN AVIATION ELECTRONICS INDUSTRY, LIMITED, Tokyo (JP)

(72) Inventor: Tadamichi Yayoshi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 385 days.

(21) Appl. No.: 18/080,137

(22) Filed: Dec. 13, 2022

(65) Prior Publication Data

US 2023/0246368 A1 Aug. 3, 2023

(30) Foreign Application Priority Data

Jan. 28, 2022 (JP) ................................ 2022-011661
May 30, 2022 (JP) ................................ 2022-087407

(51) Int. Cl.
*H01R 12/71* (2011.01)
*H01R 13/04* (2006.01)
*H01R 13/115* (2006.01)

(52) U.S. Cl.
CPC ........... *H01R 13/04* (2013.01); *H01R 12/716* (2013.01); *H01R 13/115* (2013.01)

(58) Field of Classification Search
CPC ...... H01R 12/55; H01R 12/57; H01R 12/716; H01R 13/20; H01R 13/64
See application file for complete search history.

(56) References Cited

U.S. PATENT DOCUMENTS 9,077,102 B2 7/2015 Miyazaki
9,190,752 B1 * 11/2015 Little .................. H01R 12/707
9,281,586 B2 3/2016 Miyazaki
9,450,318 B2 * 9/2016 Hasegawa .............. H01R 12/73
10,516,228 B2 12/2019 Takenaga et al.
11,233,346 B2 1/2022 Gondo
2022/0200186 A1 6/2022 Gondo

FOREIGN PATENT DOCUMENTS

JP 6128435 B2 4/2017
JP 6241712 B2 11/2017
JP 2019046670 A 3/2019
JP 2020181803 A 11/2020

* cited by examiner

*Primary Examiner* — Vanessa Girardi
(74) *Attorney, Agent, or Firm* — Holtz, Holtz & Volek PC

(57) ABSTRACT

An assembly comprises a first connector and a second connector. The first connector is mateable with the second connector in an up-down direction. The first connector comprises a plurality of first terminals and a first holding member. Each of the first terminals has two pressed contact points and an insertion end portion. The first terminals include at least one primary first terminal and at least one secondary first terminal. The second connector comprises a plurality of second terminals and a second holding member. The second terminals correspond to the first terminals, respectively. Each of the second terminals has two pressing contact points. The second terminals include a primary second terminal and at least one secondary second terminal. A first size S1 and a second size S2 meet a condition of S1≠S2, where S1=Sa−D1, and S2=Sb−D2.

11 Claims, 36 Drawing Sheets

MATEABLE SURFACE MOUNT CONNECTORS WITH DIFFERENT DISTANCES BETWEEN CONTACT POINTS

CROSS REFERENCE TO RELATED APPLICATIONS

This application is based on and claims priority under 35 U.S.C. § 119 to Japanese Patent Applications No. JP 2022-011661 filed Jan. 28, 2022 and No. JP 2022-087407 filed May 30, 2022, the contents of which are incorporated herein in their entirety by reference.

BACKGROUND OF THE INVENTION

This invention relates to an assembly comprising a first connector and a second connector.

Referring to FIG. 72, JP-A 2019-46670 (Patent Document 1) discloses an assembly 900 of this type. The assembly 900 comprises a first connector 910 and a second connector 950. The first connector 910 is mateable with the second connector 950 in a Z-direction. The first connector 910 comprises a plurality of first terminals 912 and a first holding member 918. The first terminals 912 are held by the first holding member 918. Each of the first terminals 912 has two pressed contact points 913. The pressed contact points 913 are positioned apart from each other in an X-direction. The pressed contact points 913 face in orientations different from each other in the X-direction. The second connector 950 comprises a plurality of second terminals 952 and a second holding member 958. The second terminals 952 correspond to the first terminals 912, respectively. The second terminals 952 are held by the second holding member 958. Each of the second terminals 952 has two pressing contact points 953. Under an unmated state before the second connector 950 is mated with the first connector 910, the pressing contact points 953 are spaced apart from each other in the X-direction and face each other in the X-direction. Under a mated state where the first connector 910 and the second connector 950 are mated with each other, the pressing contact points 953 of each of the second terminals 952 press the pressed contact points 913, respectively, of the corresponding first terminal 912 in the X-direction. In other words, the first terminal 912 is in contact with the corresponding second terminal 952 by two points under the mated state where the first connector 910 and the second connector 950 are mated with each other.

If an assembly such as the assembly 900 of Patent Document 1 has an increased number of first terminals and second terminals, the assembly requires an increased insertion force when a first connector and a second connector are mated with each other. Accordingly, such an assembly has a risk that mating of a first connector with a second connector is not completed, and such an assembly also has a risk that a first connector or a second connector is broken when the first connector and the second connector are mated with each other.

SUMMARY OF THE INVENTION

It is therefore an object of the present invention to provide an assembly which requires a reduced insertion force upon mating of a first connector with a second connector and in which, upon mating of a first connector with a second connector, a first terminal and a second terminal are brought into contact with each other by two points so that a reliable connection of the first terminal and the second terminal is ensured.

One aspect of the present invention provides an assembly comprising a first connector and a second connector. The first connector is mateable with the second connector in an up-down direction. The first connector comprises a plurality of first terminals and a first holding member. The first terminals are held by the first holding member. Each of the first terminals has two pressed contact points and an insertion end portion. Each of the pressed contact points is positioned apart from the insertion end portion in the up-down direction. The pressed contact points are positioned apart from each other in a width direction perpendicular to the up-down direction. The pressed contact points face in orientations different from each other in the width direction. The first terminals include at least one primary first terminal and at least one secondary first terminal. The primary first terminal has a primary pressed size Sa which is a largest size of the primary first terminal in the width direction in an area of the primary first terminal from the insertion end portion to the pressed contact point. The secondary first terminal has a secondary pressed size Sb which is a largest size of the secondary first terminal in the width direction in an area of the secondary first terminal from the insertion end portion to the pressed contact point. The second connector comprises a plurality of second terminals and a second holding member. The second terminals correspond to the first terminals, respectively. The second terminals are held by the second holding member. Each of the second terminals has two pressing contact points. Under an unmated state before the second connector is mated with the first connector, the pressing contact points are spaced apart from each other in the width direction and face each other in the width direction. Under a mated state where the first connector and the second connector are mated with each other, the pressing contact points of each of the second terminals press the pressed contact points, respectively, of the corresponding first terminal in the width direction. The second terminals include a primary second terminal and at least one secondary second terminal. The primary second terminal corresponds to the primary first terminal. The secondary second terminal corresponds to the secondary first terminal. The pressing contact points of the primary second terminal are spaced apart from each other in the width direction by a primary pressing distance D1 under the unmated state. The pressing contact points of the secondary second terminal are spaced apart from each other in the width direction by a secondary pressing distance D2 under the unmated state. A first size S1 and a second size S2 meet a condition of $S1 \neq S2$, where $S1 = Sa - D1$, and $S2 = Sb - D2$.

The assembly of the present invention is configured as follows: under the mated state where the first connector and the second connector are mated with each other, the pressing contact points of the second terminal press the pressed contact points, respectively, of the corresponding first terminal in the width direction; and $S1 \neq S2$, where $S1 = Sa - D1$, and $S2 = Sb - D2$. Accordingly, upon the mating of the first connector with the second connector, the assembly of the present invention requires a reduced insertion force while the first terminal and the second terminal are brought into contact with each other by two points so that a reliable connection of the first terminal and the second terminal is ensured.

An appreciation of the objectives of the present invention and a more complete understanding of its structure may be had by studying the following description of the preferred embodiment and by referring to the accompanying drawings.

Figure 1:
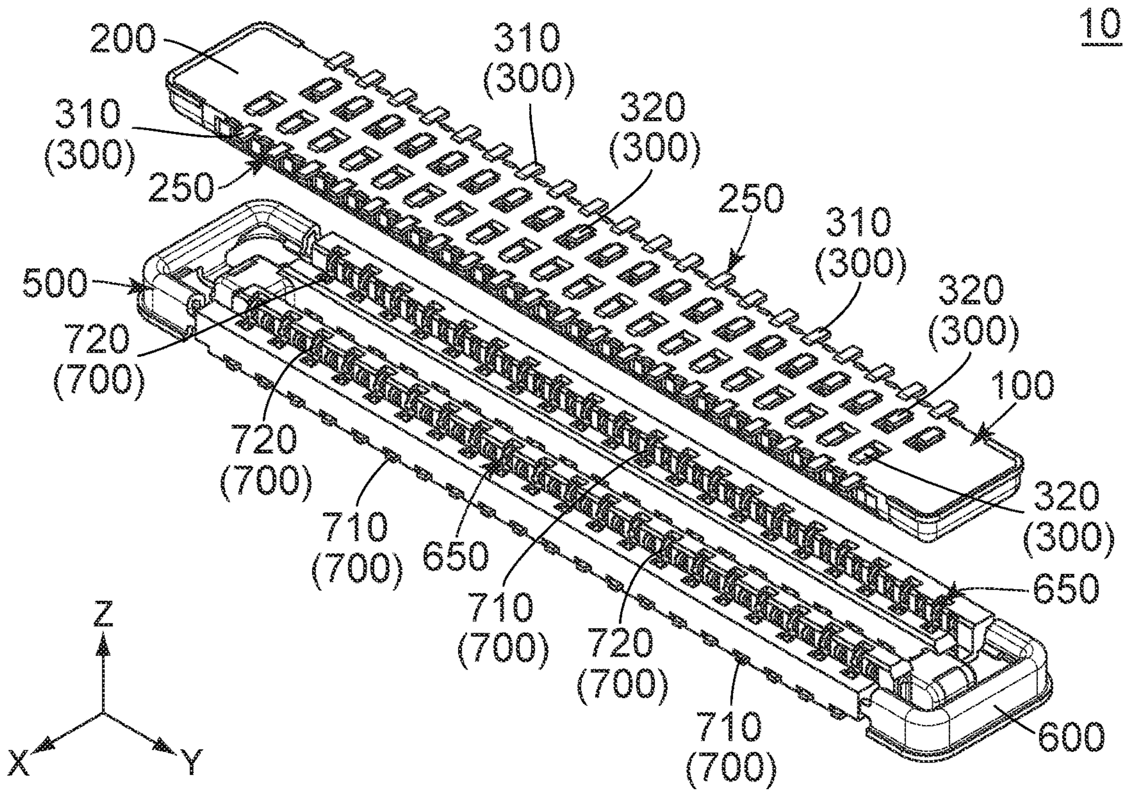
FIG. 1 is a perspective view showing an assembly according to a first embodiment of the present invention. In the figure, a first connector and a second connector are not mated with each other.
Figure 2:
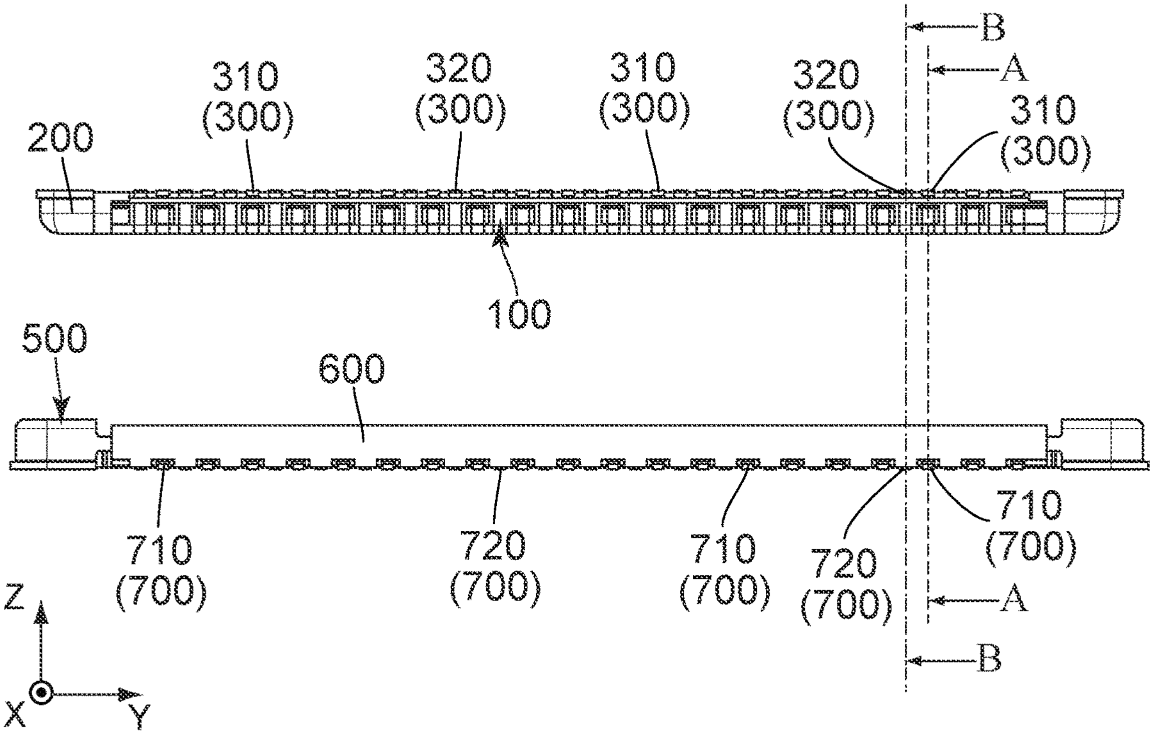
FIG. 2 is a side view showing the assembly of FIG. 1.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

First Embodiment

As shown in FIG. 1, an assembly 10 according to a first embodiment of the present invention comprises a first connector 100 and a second connector 500.

Figure 5:
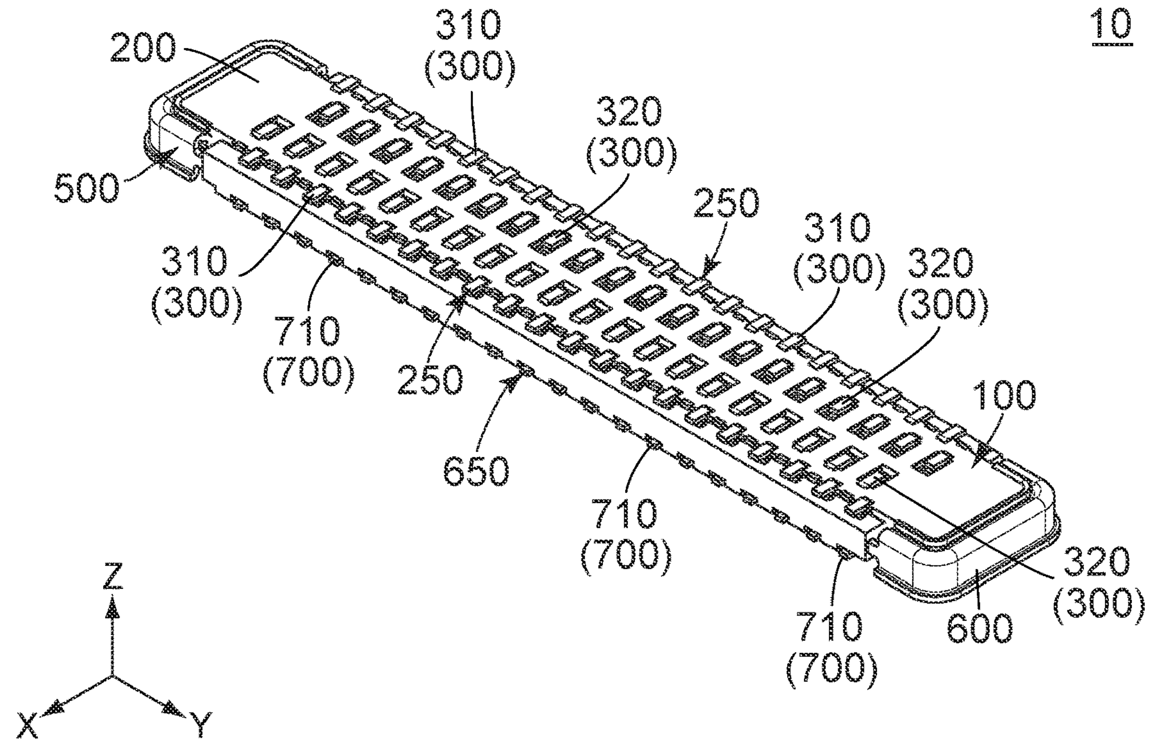
FIG. 5 is a perspective view showing the assembly of FIG. 1. In the figure, the first connector and the second connector are mated with each other.
Figure 6:
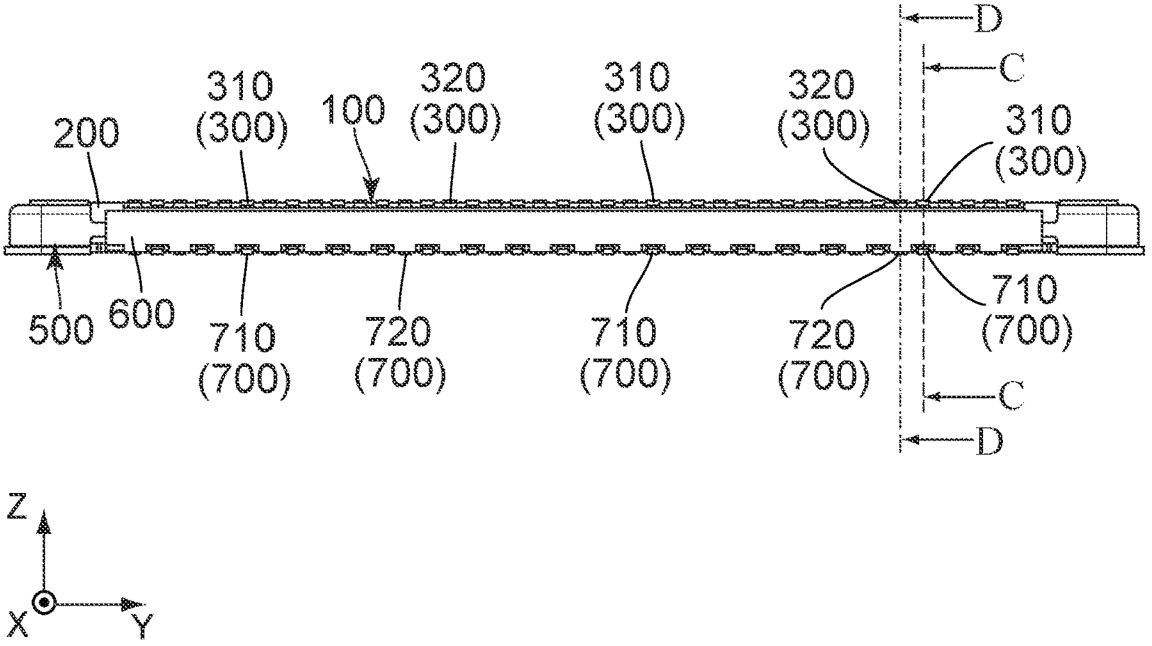
FIG. 6 is a side view showing the assembly of FIG. 5.

As understood from FIGS. 1 and 5, the first connector 100 of the present embodiment is mateable with the second connector 500 in an up-down direction. In the present embodiment, the up-down direction is a Z-direction. Specifically, it is assumed that upward is a positive Z-direction while downward is a negative Z-direction. The first connector 100 is mountable on a circuit board (not shown).

Figure 9:
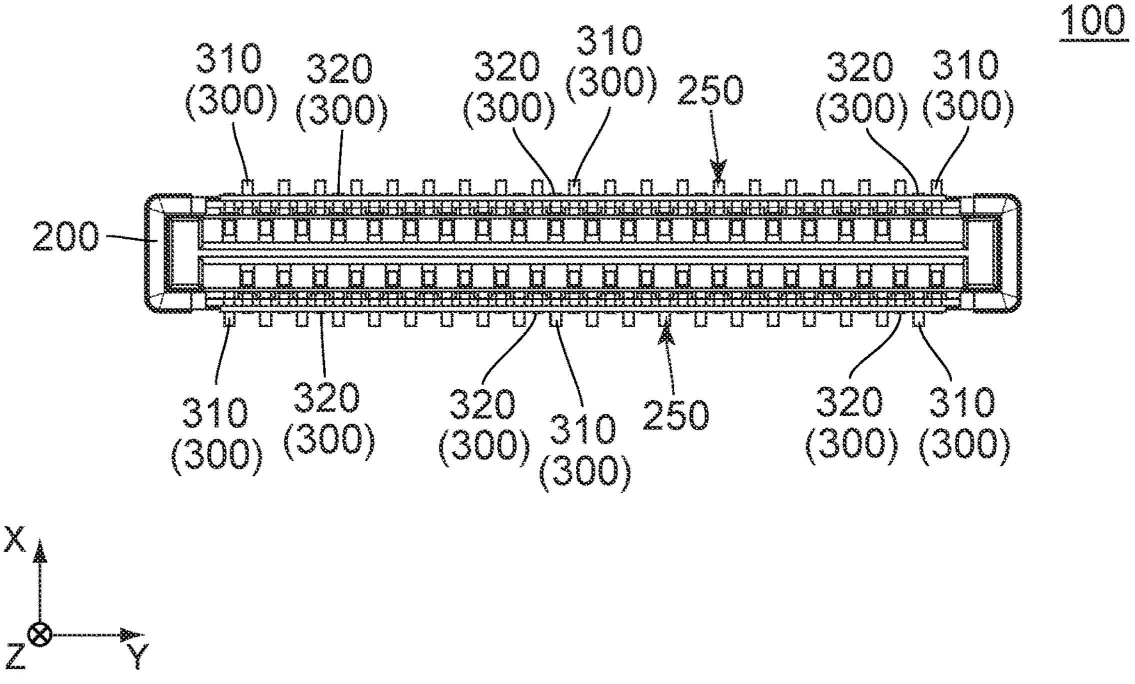
FIG. 9 is a bottom view showing the first connector which is included in the assembly of FIG. 1.

As shown in FIG. 9, the first connector 100 comprises a plurality of first terminals 300 and a first holding member 200. Each of the first terminals 300 is made of metal. The first holding member 200 is made of insulator.

As shown in FIG. 9, the first connector 100 has two first terminal rows 250 which are positioned apart from each other in a width direction. In the present embodiment, the width direction is an X-direction. In addition, the width direction is also referred to as a front-rear direction. Specifically, it is assumed that forward is a positive X-direction while rearward is a negative X-direction. In other words, the two first terminal rows 250 are positioned apart from each other in the front-rear direction. The first terminal row 250 is also referred to as a terminal row 250. Although the number of the terminal rows 250 is two, the present invention is not limited thereto. Specifically, the number of the terminal row 250 may be one.

As shown in FIG. 9, each of the first terminal rows 250 consists of the first terminals 300 which are arranged in a pitch direction perpendicular to both the up-down direction and the width direction. In the present embodiment, the pitch direction is a Y-direction.

As shown in FIG. 9, the first terminals 300 of the present embodiment are held by the first holding member 200. The first terminals 300 consist of a plurality of primary first terminals 310 and a plurality of secondary first terminals 320. In other words, each of the first terminal rows 250 includes a plurality of the primary first terminals 310 and a plurality of the secondary first terminals 320. The primary first terminal 310 is adjacent to the secondary first terminal 320 in the pitch direction. More specifically, in each of the first terminal rows 250, the primary first terminals 310 and the secondary first terminals 320 are alternately arranged in the pitch direction. In the present embodiment, the number of the primary first terminals 310 and the number of the secondary first terminals 320 are equal to each other. However, the present invention is not limited thereto, but each of the first terminal rows 250 should include at least one of the primary first terminal 310 and at least one of the secondary first terminal 320. At any rate, the first terminals 300 should include at least one of the primary first terminal 310 and at least one of the secondary first terminal 320. If the number of the terminal row 250 is one, the terminal row 250 should be configured as follows: at least ones of the first terminals 300 are arranged in the pitch direction perpendicular to both the up-down direction and the width direction so that the at least ones of the first terminals 300 form the single terminal row 250; and the single terminal row 250 includes the primary first terminal 310 and the secondary first terminal 320.

Figure 3:
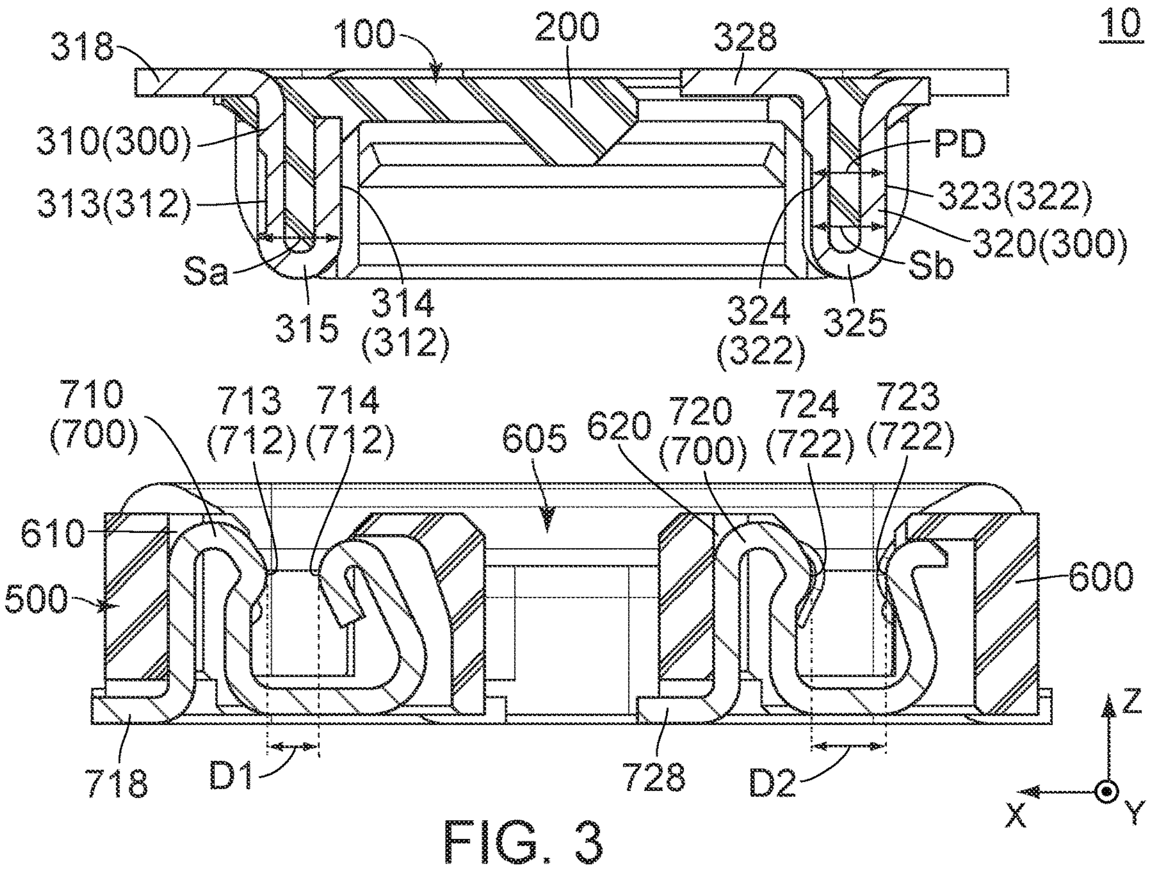
FIG. 3 is a cross-sectional view showing the assembly of FIG. 2, taken along line A-A.
Figure 4:
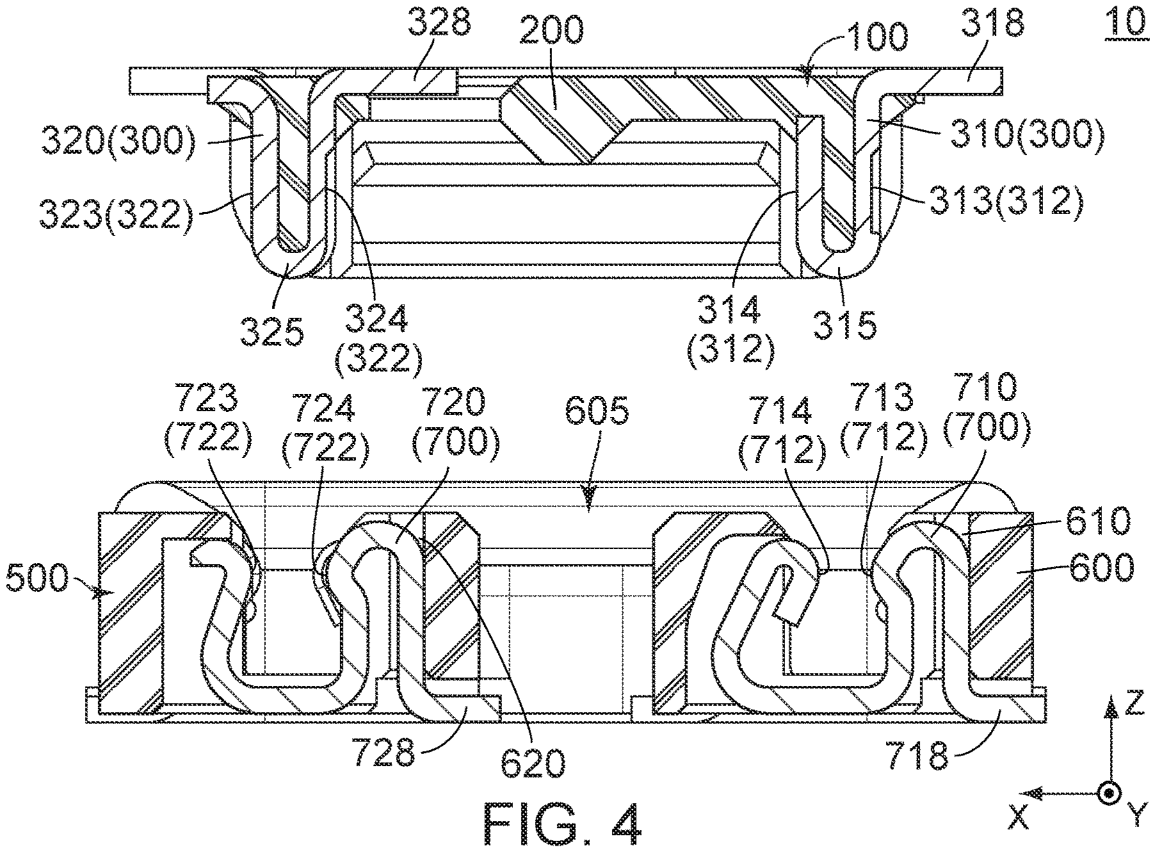
FIG. 4 is a cross-sectional view showing the assembly of FIG. 2, taken along line B-B.

Referring to FIGS. 3, 4 and 9, the primary first terminals 310 of the two first terminal rows 250 are arranged in two-fold rotational symmetry in a plane perpendicular to the up-down direction. The primary first terminals 310 of the two first terminal rows 250 are arranged in a staggered configuration.

Figure 12:
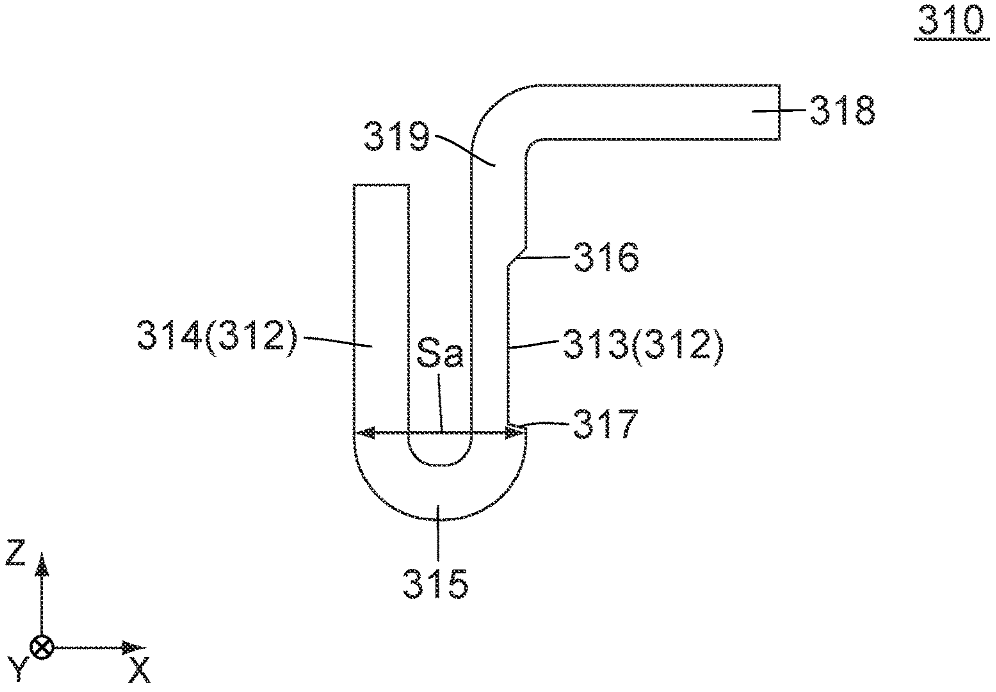
FIG. 12 is a side view showing the primary first terminal of FIG. 11.
Figure 13:
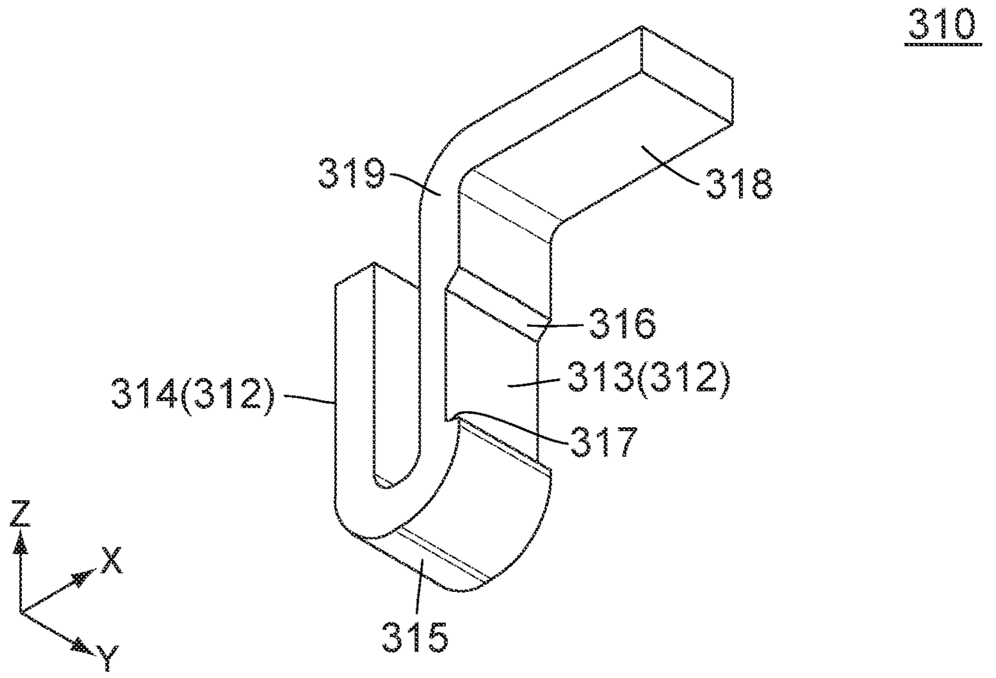
FIG. 13 is another perspective view showing the primary first terminal of FIG. 11.
Figure 14:
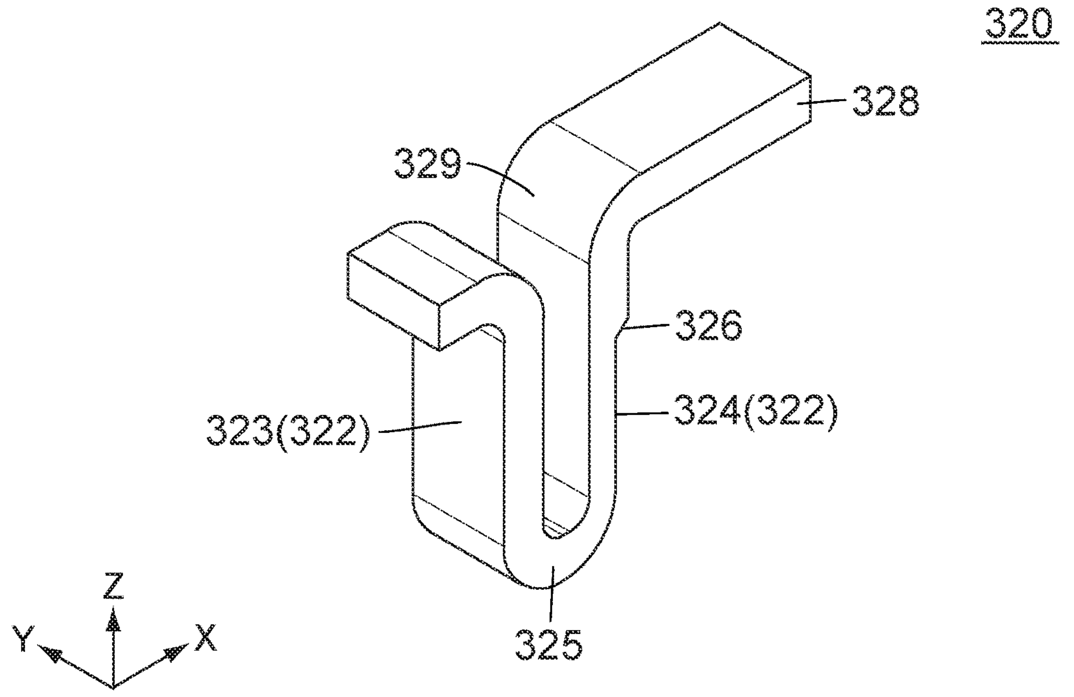
FIG. 14 is a perspective view showing a secondary first terminal which is included in the first connector of FIG. 9.

As shown in FIG. 12, each of the primary first terminals 310 of the present embodiment has two pressed contact points 312, an insertion end portion 315, an inclined portion 316, a lock portion 317, a fixed portion 318 and a coupling portion 319.

As shown in FIG. 12, each of the pressed contact points 312 is positioned apart from the insertion end portion 315 in the up-down direction. Each of the pressed contact points 312 is positioned above the insertion end portion 315 in the up-down direction. The pressed contact points 312 are positioned apart from each other in the width direction perpendicular to the up-down direction. The pressed contact points 312 face in orientations different from each other in the width direction.

As shown in FIG. 12, the pressed contact points 312 consist of an outer pressed contact point 313 and an inner pressed contact point 314.

As shown in FIG. 3, the outer pressed contact point 313 of the present embodiment faces outward in the width direction. The outer pressed contact point 313 is positioned outward of the inner pressed contact point 314 in the width direction. Referring to FIGS. 3 and 9, the outer pressed contact point 313 of the primary first terminal 310 of the first terminal row 250, which is positioned at a front side of the first connector 100, faces forward in the front-rear direction. Referring to FIGS. 4 and 9, the outer pressed contact point 313 of the primary first terminal 310 of the first terminal row 250, which is positioned at a rear side of the first connector 100, faces rearward in the front-rear direction.

As shown in FIG. 3, the inner pressed contact point 314 of the present embodiment faces inward in the width direction. The inner pressed contact point 314 is positioned inward of the outer pressed contact point 313 in the width direction. Referring to FIGS. 3 and 9, the inner pressed contact point 314 of the primary first terminal 310 of the first terminal row 250, which is positioned at the front side of the first connector 100, faces rearward in the front-rear direction. Referring to FIGS. 4 and 9, the inner pressed contact point 314 of the primary first terminal 310 of the first terminal row 250, which is positioned at the rear side of the first connector 100, faces forward in the front-rear direction. The inner pressed contact point 314 defines an inner end of the primary first terminal 310 in the width direction.

As shown in FIG. 3, the insertion end portion 315 of the present embodiment has a substantially U-shaped cross-section in a plane perpendicular to the pitch direction. As shown in FIG. 12, the insertion end portion 315 is positioned below any of the pressed contact points 312 in the up-down direction. The insertion end portion 315 is positioned below the outer pressed contact point 313 in the up-down direction. The insertion end portion 315 is positioned below the inner pressed contact point 314 in the up-down direction. The insertion end portion 315 is positioned below the lock portion 317 in the up-down direction. The insertion end portion 315 is positioned below the coupling portion 319 in the up-down direction. The insertion end portion 315 is positioned below the fixed portion 318 in the up-down direction. The insertion end portion 315 defines a lower end of the primary first terminal 310 in the up-down direction.

As shown in FIG. 12, the inclined portion 316 of the present embodiment extends upward in the up-down direction and outward in the width direction from the outer pressed contact point 313. The inclined portion 316 is oblique to both the up-down direction and the width direction. The inclined portion 316 is positioned between the outer pressed contact point 313 and the coupling portion 319 in the up-down direction. The inclined portion 316 is positioned above the outer pressed contact point 313 in the up-down direction. The inclined portion 316 is positioned below the coupling portion 319 in the up-down direction.

As shown in FIG. 12, the lock portion 317 of the present embodiment is positioned between the insertion end portion 315 and any of the pressed contact points 312 in the up-down direction. The lock portion 317 is positioned below any of the pressed contact points 312 in the up-down direction. Specifically, the lock portion 317 is positioned below the outer pressed contact point 313 in the up-down direction. The lock portion 317 is positioned above the insertion end portion 315 in the up-down direction. The lock portion 317 is positioned below the coupling portion 319 in the up-down direction. The lock portion 317 is positioned below the fixed portion 318 in the up-down direction. The lock portion 317 is positioned outward of any of the pressed contact points 312 in the width direction. The lock portion 317 extends outward in the width direction from the outer pressed contact point 313. The lock portion 317 is positioned inward of the fixed portion 318 in the width direction.

Referring to FIG. 3, the fixed portion 318 of the present embodiment is soldered on a pad (not shown) of the circuit board when the first connector 100 is mounted on the circuit board. The fixed portion 318 defines an upper end of the primary first terminal 310 in the up-down direction. The fixed portion 318 defines an outer end of the primary first terminal 310 in the width direction. Referring to FIGS. 3 and 9, the fixed portion 318 of the primary first terminal 310 of the first terminal row 250, which is positioned at the front side of the first connector 100, defines a front end of the first connector 100 in the front-rear direction. Referring to FIGS. 4 and 9, the fixed portion 318 of the primary first terminal 310 of the first terminal row 250, which is positioned at the rear side of the first connector 100, defines a rear end of the first connector 100 in the front-rear direction. As shown in FIG. 12, the fixed portion 318 extends outward in the width direction from the coupling portion 319. Referring to FIGS. 3, 9 and 12, the fixed portion 318 of the primary first terminal 310 of the first terminal row 250, which is positioned at the front side of the first connector 100, extends forward in the front-rear direction from the coupling portion 319. Referring to FIGS. 4, 9 and 12, the fixed portion 318 of the primary first terminal 310 of the first terminal row 250, which is positioned at the rear side of the first connector 100, extends rearward in the front-rear direction from the coupling portion 319.

As shown in FIG. 12, the coupling portion 319 of the present embodiment couples the outer pressed contact point 313 with the fixed portion 318. The coupling portion 319 is positioned between the outer pressed contact point 313 and the fixed portion 318 in the up-down direction. The coupling portion 319 is positioned above the outer pressed contact point 313 in the up-down direction. The coupling portion 319 is positioned below the fixed portion 318 in the up-down direction.

As shown in FIG. 12, the primary first terminal 310 has a primary pressed size Sa which is a largest size of the primary first terminal 310 in the width direction in an area of the primary first terminal 310 from the insertion end portion 315 to the pressed contact point 312. The primary pressed size Sa of the present embodiment is equal to a distance between the inner pressed contact point 314 and an outer end of the lock portion 317 in the width direction.

Referring to FIGS. 3, 4 and 9, the secondary first terminals 320 of the two first terminal rows 250 are arranged in two-fold rotational symmetry in the plane perpendicular to the up-down direction. The secondary first terminals 320 of the two first terminal rows 250 are arranged in a staggered configuration.

As described above, the primary first terminals 310 of the two first terminal rows 250 are arranged in two-fold rotational symmetry in the plane perpendicular to the up-down direction while the secondary first terminals 320 of the two first terminal rows 250 are arranged in two-fold rotational symmetry in the plane perpendicular to the up-down direction. Accordingly, a distance between adjacent two of the first terminals 300 in the pitch direction can be reduced in each of the first terminal rows 250.

Figure 15:
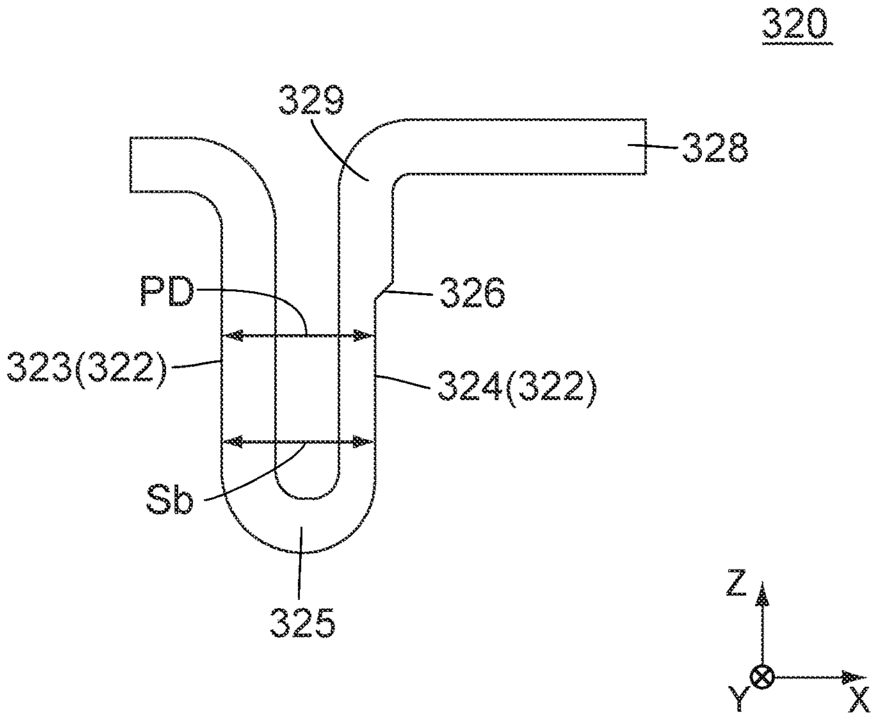
FIG. 15 is a side view showing the secondary first terminal of FIG. 14.
Figure 16:
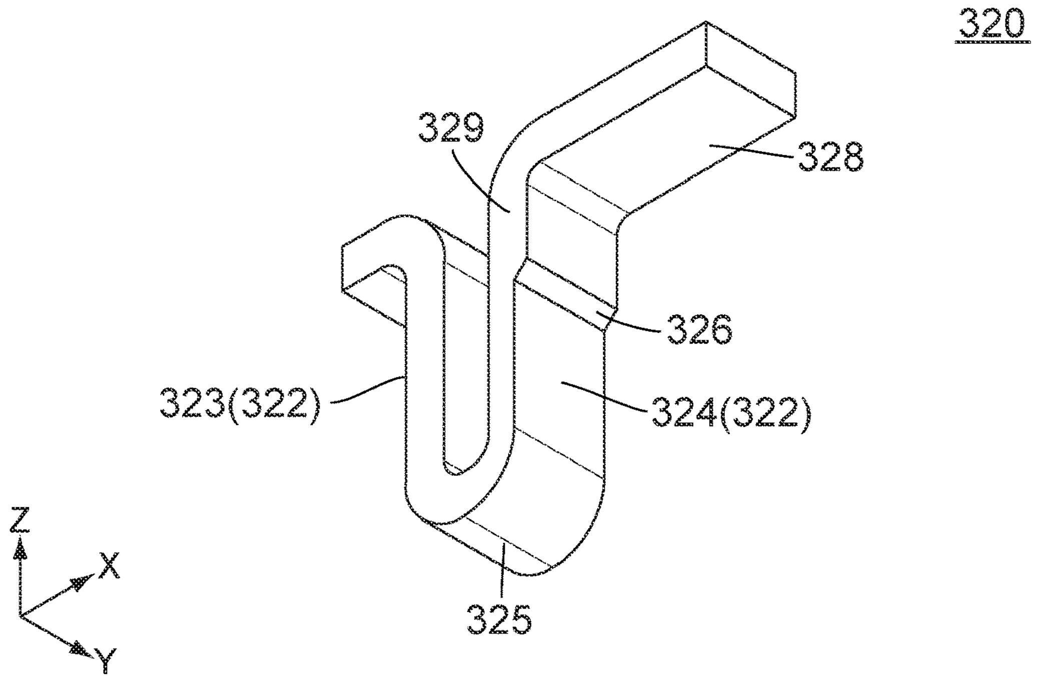
FIG. 16 is another perspective view showing the secondary first terminal of FIG. 14.

As shown in FIG. 15, each of the secondary first terminals 320 of the present embodiment has two pressed contact points 322, an insertion end portion 325, an inclined portion 326, a fixed portion 328 and a coupling portion 329. Specifically, dissimilar to the primary first terminal 310, the secondary first terminal 320 has no lock portion.

As shown in FIG. 15, each of the pressed contact points 322 is positioned apart from the insertion end portion 325 in the up-down direction. Each of the pressed contact points 322 is positioned above the insertion end portion 325 in the up-down direction. The pressed contact points 322 are positioned apart from each other in the width direction perpendicular to the up-down direction. The pressed contact points 322 face in orientations different from each other in the width direction.

As shown in FIG. 15, the pressed contact points 322 consist of an outer pressed contact point 323 and an inner pressed contact point 324.

As shown in FIG. 4, the outer pressed contact point 323 of the present embodiment faces outward in the width direction. The outer pressed contact point 323 is positioned outward of the inner pressed contact point 324 in the width direction. Referring to FIGS. 4 and 9, the outer pressed contact point 323 of the secondary first terminal 320 of the first terminal row 250, which is positioned at the front side of the first connector 100, faces forward in the front-rear direction. Referring to FIGS. 3 and 9, the outer pressed contact point 323 of the secondary first terminal 320 of the first terminal row 250, which is positioned at the rear side of the first connector 100, faces rearward in the front-rear direction.

As shown in FIG. 4, the inner pressed contact point 324 of the present embodiment faces inward in the width direction. The inner pressed contact point 324 is positioned inward of the outer pressed contact point 323 in the width direction. Referring to FIGS. 4 and 9, the inner pressed contact point 324 of the secondary first terminal 320 of the first terminal row 250, which is positioned at the front side of the first connector 100, faces rearward in the front-rear direction. Referring to FIGS. 3 and 9, the inner pressed contact point 324 of the secondary first terminal 320 of the first terminal row 250, which is positioned at the rear side of the first connector 100, faces forward in the front-rear direction.

As shown in FIG. 4, the insertion end portion 325 of the present embodiment has a substantially U-shaped cross-section in the plane perpendicular to the pitch direction. The insertion end portion 325 is positioned below any of the pressed contact points 322 in the up-down direction. The insertion end portion 325 is positioned below the outer pressed contact point 323 in the up-down direction. The insertion end portion 325 is positioned below the inner pressed contact point 324 in the up-down direction. The insertion end portion 325 is positioned below the fixed portion 328 in the up-down direction. The insertion end portion 325 defines a lower end of the secondary first terminal 320 in the up-down direction.

Referring to FIG. 15, the inclined portion 326 of the present embodiment extends upward in the up-down direction and inward in the width direction from the inner pressed contact point 324. The inclined portion 326 is oblique to both the up-down direction and the width direction. The inclined portion 326 is positioned between the inner pressed contact point 324 and the coupling portion 329 in the up-down direction. The inclined portion 326 is positioned above the inner pressed contact point 324 in the up-down direction. The inclined portion 326 is positioned below the coupling portion 329 in the up-down direction.

Referring to FIG. 4, the fixed portion 328 of the present embodiment is soldered on a pad (not shown) of the circuit board when the first connector 100 is mounted on the circuit board. The fixed portion 328 defines an upper end of the secondary first terminal 320 in the up-down direction. The fixed portion 328 defines an inner end of the secondary first terminal 320 in the width direction. As shown in FIG. 15, the fixed portion 328 extends inward in the width direction from the coupling portion 329. Referring to FIGS. 4, 9 and 15, the fixed portion 328 of the secondary first terminal 320 of the first terminal row 250, which is positioned at the front side of the first connector 100, extends rearward in the front-rear direction from the coupling portion 329. Referring to FIGS. 3, 9 and 15, the fixed portion 328 of the secondary first terminal 320 of the first terminal row 250, which is positioned at the rear side of the first connector 100, extends forward in the front-rear direction from the coupling portion 329.

As shown in FIG. 15, the coupling portion 329 of the present embodiment couples the inner pressed contact point 324 with the fixed portion 328. The coupling portion 329 is positioned between the inner pressed contact point 324 and the fixed portion 328 in the up-down direction. The coupling portion 329 is positioned above the inner pressed contact point 324 in the up-down direction. The coupling portion 329 is positioned below the fixed portion 328 in the up-down direction.

As shown in FIG. 15, the secondary first terminal 320 has a secondary pressed size Sb which is a largest size of the secondary first terminal 320 in the width direction in an area of the secondary first terminal 320 from the insertion end portion 325 to the pressed contact point 322. The secondary pressed size Sb of the present embodiment is equal to a distance PD between the outer pressed contact point 323 and the inner pressed contact point 324 in the width direction. Specifically, the pressed contact points 322 of the secondary first terminal 320 are positioned apart from each other in the width direction by the predetermined distance PD, and the secondary pressed size Sb and the predetermined distance PD meet a condition of $Sb=PD$.

Referring to FIG. 3, the secondary pressed size Sb is unequal to the primary pressed size Sa. In other words, the primary pressed size Sa and the secondary pressed size Sb meet a condition of $Sa \neq Sb$. More specifically, in the present embodiment, the secondary pressed size Sb is smaller than the primary pressed size Sa. In other words, the primary pressed size Sa and the secondary pressed size Sb meet a condition of $Sb<Sa$.

As described above, each of the primary first terminals 310 has the two pressed contact points 312 and the insertion end portion 315, and each of the secondary first terminals 320 has the two pressed contact points 322 and the insertion end portion 325. In other words, each of the first terminals 300 has the two pressed contact points 312, 322 and the insertion end portion 315, 325.

Referring to FIG. 3, the second connector 500 of the present embodiment is mountable on a circuit board (not shown) which is an object. The second connector 500 comprises a plurality of second terminals 700 and a second holding member 600. Each of the second terminals 700 is made of metal. The second holding member 600 is made of insulator. The second holding member 600 is provided with a single opening 605. The opening 605 pierces the second holding member 600 in the up-down direction. The opening 605 is positioned at a middle of the second holding member 600 in the width direction. The second holding member 600 has a plurality of first holding portions 610 and a plurality of second holding portions 620.

Figure 10:
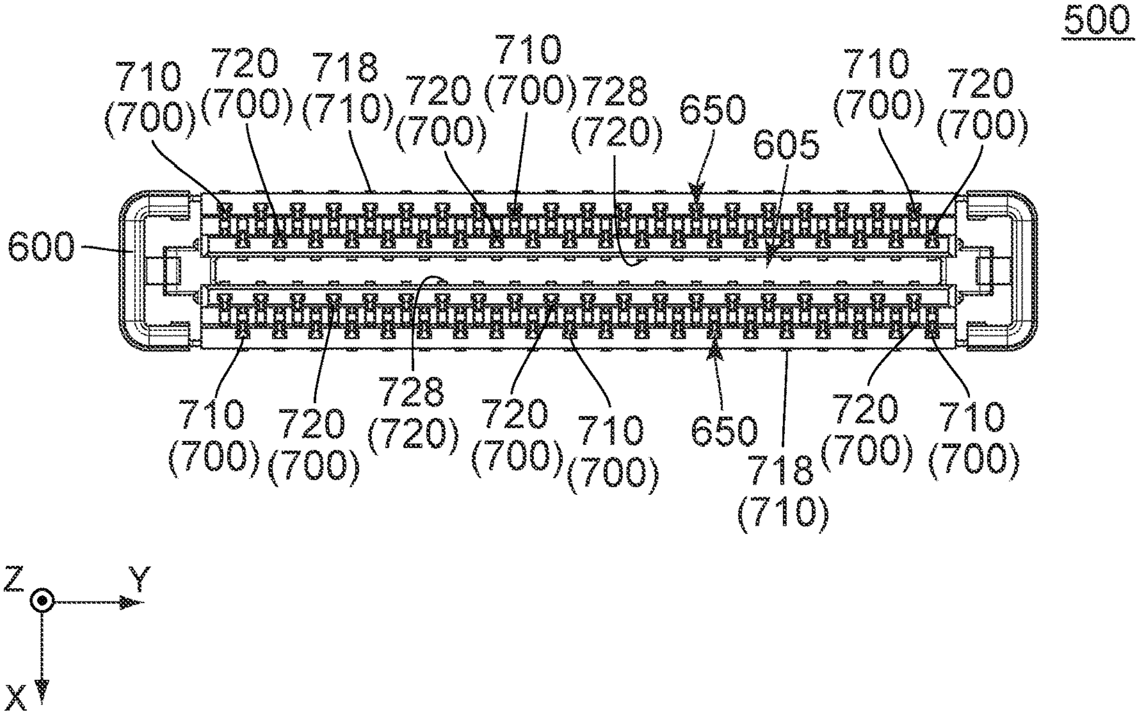
FIG. 10 is a top view showing the second connector which is included in the assembly of FIG. 1.
Figure 11:
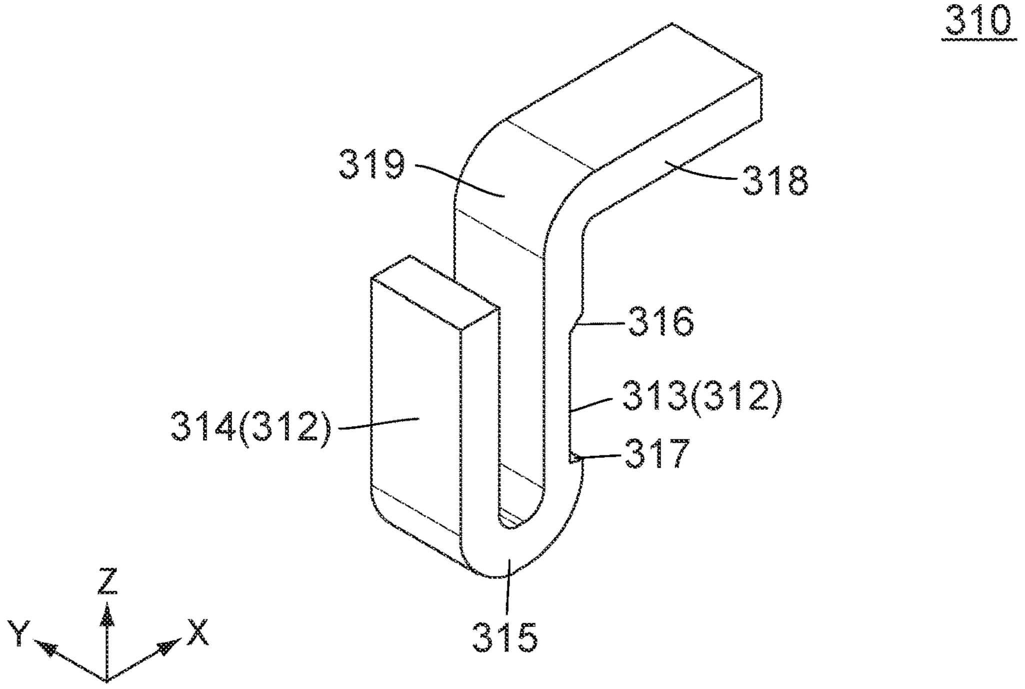
FIG. 11 is a perspective view showing a primary first terminal which is included in the first connector of FIG. 9.

As shown in FIG. 10, the second connector 500 has two second terminal rows 650 which are positioned apart from each other in the width direction. In other words, the two second terminal rows 650 are positioned apart from each other in the front-rear direction. Although the number of the second terminal rows 650 is two, the present invention is not limited thereto. Specifically, the number of the second terminal row 650 may be one.

As shown in FIG. 10, each of the second terminal rows 650 consists of the second terminals 700 which are arranged in the pitch direction perpendicular to both the up-down direction and the width direction.

As shown in FIG. 10, the second terminals 700 of the present embodiment are held by the second holding member 600. Referring to FIGS. 3 and 4, the second terminals 700 correspond to the first terminals 300, respectively. The second terminals 700 consist of a plurality of primary second terminals 710 and a plurality of secondary second terminals 720. Referring to FIGS. 3, 4 and 10, each of the second terminal rows 650 includes a plurality of the primary second terminals 710 and a plurality of the secondary second terminals 720. The primary second terminal 710 is adjacent to the secondary second terminal 720 in the pitch direction. More specifically, in each of the second terminal rows 650, the primary second terminals 710 and the secondary second terminals 720 are alternately arranged in the pitch direction. In the present embodiment, the number of the primary second terminals 710 and the number of the secondary second terminals 720 are equal to each other. However, the present invention is not limited thereto, but each of the second terminal rows 650 should include the primary second terminal 710 and the secondary second terminal 720. At any rate, the second terminals 700 should include the primary second terminal 710 and at least one of the secondary second terminal 720. If the number of the second terminal row 650 is one, the second terminal row 650 should be configured as follows: at least ones of the second terminals 700 are arranged in the pitch direction perpendicular to both the up-down direction and the width direction so that the at least ones of the second terminals 700 form the single second terminal row 650; and the single second terminal row 650 includes the primary second terminal 710 and the secondary second terminal 720.

Referring to FIGS. 3, 4 and 10, the primary second terminals 710 of the two second terminal rows 650 are arranged in two-fold rotational symmetry in the plane perpendicular to the up-down direction. The primary second terminals 710 of the two second terminal rows 650 are arranged in a staggered configuration. The primary second terminals 710 correspond to the primary first terminals 310, respectively.

Figure 17:
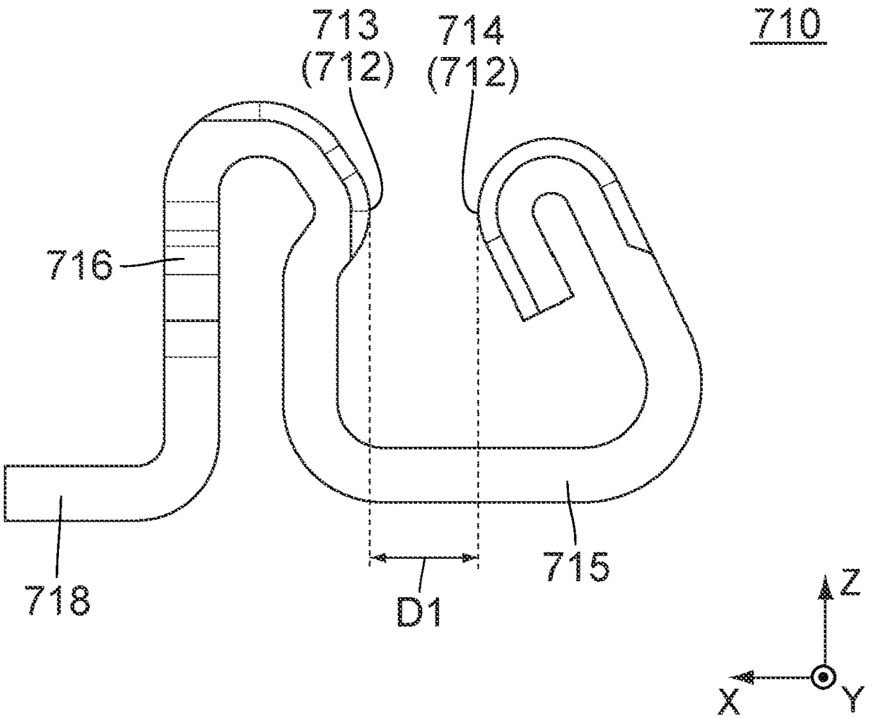
FIG. 17 is a side view showing a primary second terminal which is included in the second connector of FIG. 10.

As shown in FIG. 17, each of the primary second terminals 710 of the present embodiment has two pressing contact points 712, a supporting portion 715, a held portion 716 and a fixed portion 718.

Figure 7:
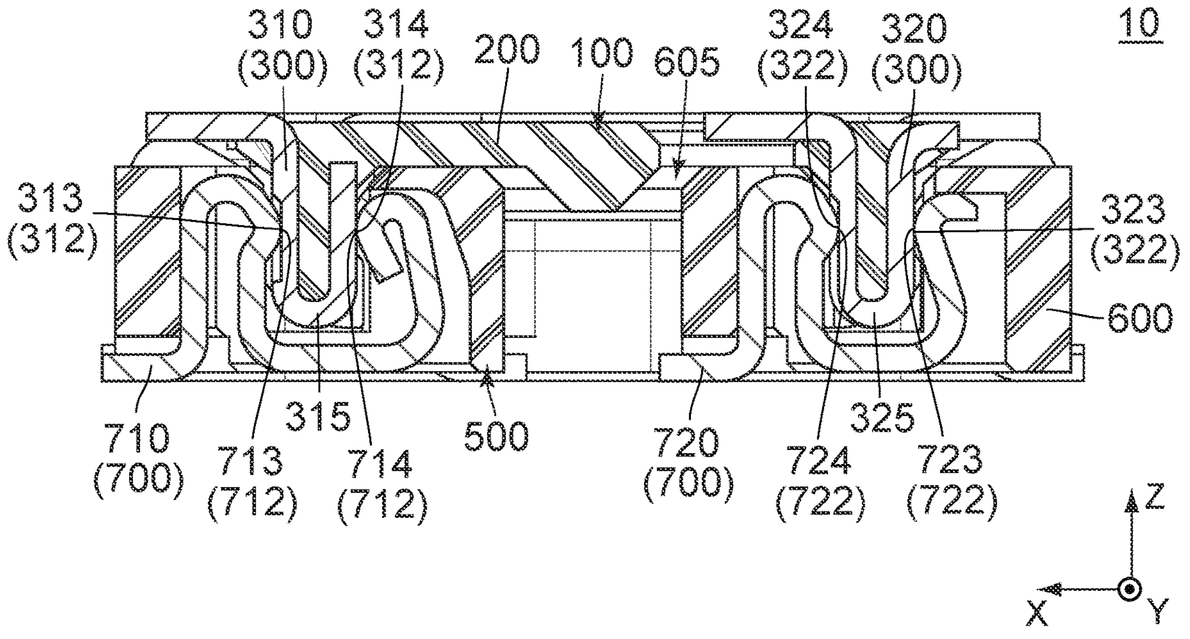
FIG. 7 is a cross-sectional view showing the assembly of FIG. 6, taken along line C-C.

As shown in FIG. 3, under an unmated state before the second connector 500 is mated with the first connector 100, the pressing contact points 712 are spaced apart from each other in the width direction and face each other in the width direction. The pressing contact points 712 of the primary second terminal 710 are spaced apart from each other in the width direction by a primary pressing distance D1 under the unmated state. As shown in FIG. 7, the pressing contact points 712 of each of the primary second terminals 710 press the pressed contact points 312, respectively, of the corresponding primary first terminal 310 under a mated state where the first connector 100 and the second connector 500 are mated with each other.

As shown in FIG. 17, the pressing contact points 712 consist of an outer pressing contact point 713 and an inner pressing contact point 714.

As shown in FIG. 3, the outer pressing contact point 713 of the present embodiment faces inward in the width direction. The outer pressing contact point 713 is positioned outward of the inner pressing contact point 714 in the width direction. Referring to FIGS. 3 and 10, the outer pressing contact point 713 of the primary second terminal 710 of the second terminal row 650, which is positioned at a front side of the second connector 500, faces rearward in the front-rear direction. Referring to FIGS. 4 and 10, the outer pressing contact point 713 of the primary second terminal 710 of the second terminal row 650, which is positioned at a rear side of the second connector 500, faces forward in the front-rear direction.

As shown in FIG. 3, the inner pressing contact point 714 of the present embodiment faces outward in the width direction. The inner pressing contact point 714 is positioned inward of the outer pressing contact point 713 in the width direction. Referring to FIGS. 3 and 10, the inner pressing contact point 714 of the primary second terminal 710 of the second terminal row 650, which is positioned at the front side of the second connector 500, faces forward in the front-rear direction. Referring to FIGS. 4 and 10, the inner pressing contact point 714 of the primary second terminal 710 of the second terminal row 650, which is positioned at the rear side of the second connector 500, faces rearward in the front-rear direction.

As shown in FIG. 3, under the unmated state, the outer pressing contact point 713 and the inner pressing contact point 714 are spaced apart from each other in the width direction and face each other in the width direction. The outer pressing contact point 713 and the inner pressing contact point 714 are spaced apart from each other in the width direction by the primary pressing distance D1 under the unmated state. As shown in FIG. 7, the outer pressing contact point 713 of the primary second terminal 710 presses the outer pressed contact point 313 of the corresponding primary first terminal 310 in the width direction under the mated state. The inner pressing contact point 714 of the primary second terminal 710 presses the inner pressed contact point 314 of the corresponding primary first terminal 310 in the width direction under the mated state.

As shown in FIG. 17, the supporting portion 715 of the present embodiment resiliently supports the two pressing contact points 712. The supporting portion 715 extends from an upper end of the held portion 716.

Referring to FIGS. 3 and 17, the held portion 716 of the present embodiment is held by the second holding member 600. The held portion 716 is press-fit into the second holding member 600. More specifically, the held portion 716 is press-fit into the first holding portion 610. As shown in FIG. 17, the held portion 716 is positioned between the supporting portion 715 and the fixed portion 718 in the width direction. The held portion 716 extends downward in the up-down direction from an outer end of the supporting portion 715 in the width direction. The held portion 716 extends upward in the up-down direction from an inner end of the fixed portion 718 in the width direction.

Referring to FIG. 3, the fixed portion 718 of the present embodiment is fixed to the object when the second connector 500 is mounted on the object. Specifically, the fixed portion 718 is soldered to a pad (not shown) of the circuit board when the second connector 500 is mounted on the circuit board. As shown in FIG. 17, the fixed portion 718 defines a lower end of the primary second terminal 710 in the up-down direction. The fixed portion 718 defines an outer end of the primary second terminal 710 in the width direction. The fixed portion 718 extends outward in the width direction from a lower end of the held portion 716. As shown in FIG. 10, the fixed portion 718 of the primary second terminal 710 is, at least in part, positioned outward in the width direction beyond the second holding member 600.

Referring to FIGS. 3, 4 and 10, the secondary second terminals 720 of the two second terminal rows 650 are arranged in two-fold rotational symmetry in the plane perpendicular to the up-down direction. The secondary second terminals 720 of the two second terminal rows 650 are arranged in a staggered configuration. An explanation will be made later about an operation of fixing the secondary second terminals 720 to the second holding member 600. The secondary second terminals 720 correspond to the secondary first terminals 320, respectively.

Figure 18:
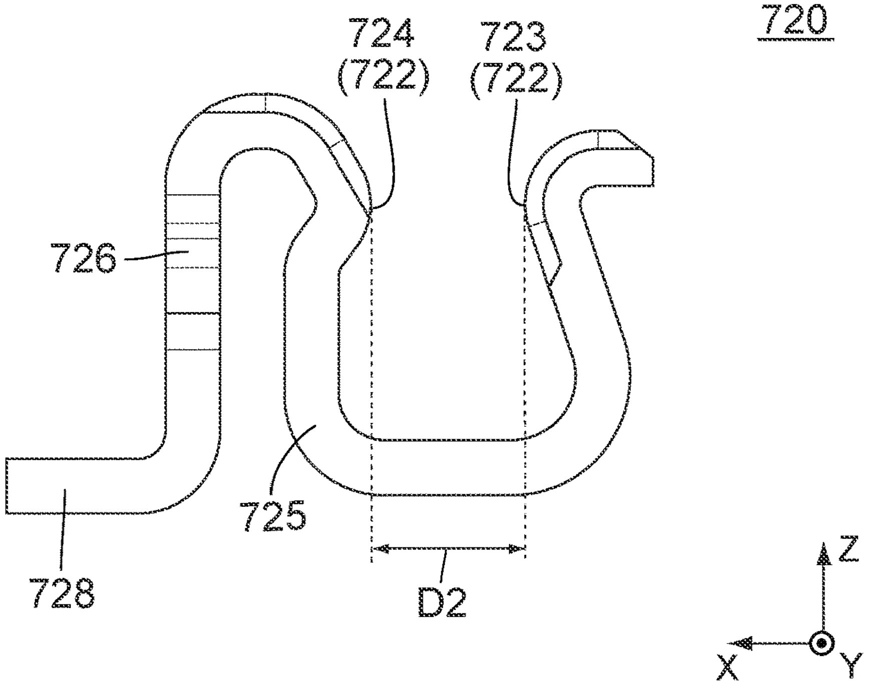
FIG. 18 is a side view showing a secondary second terminal which is included in the second connector of FIG. 10.
Figure 19:
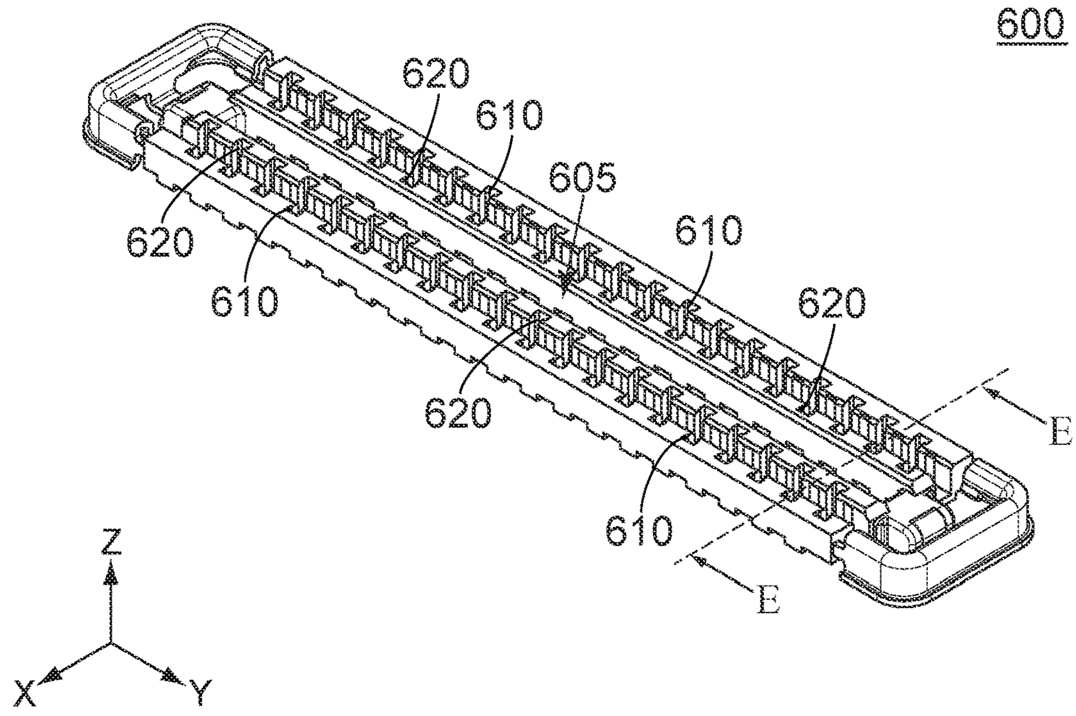
FIG. 19 is a perspective view showing a second holding member which is included in the second connector of FIG. 10.

As shown in FIG. 18, each of the secondary second terminals 720 of the present embodiment has two pressing contact points 722, a supporting portion 725, a held portion 726 and a fixed portion 728.

Figure 8:
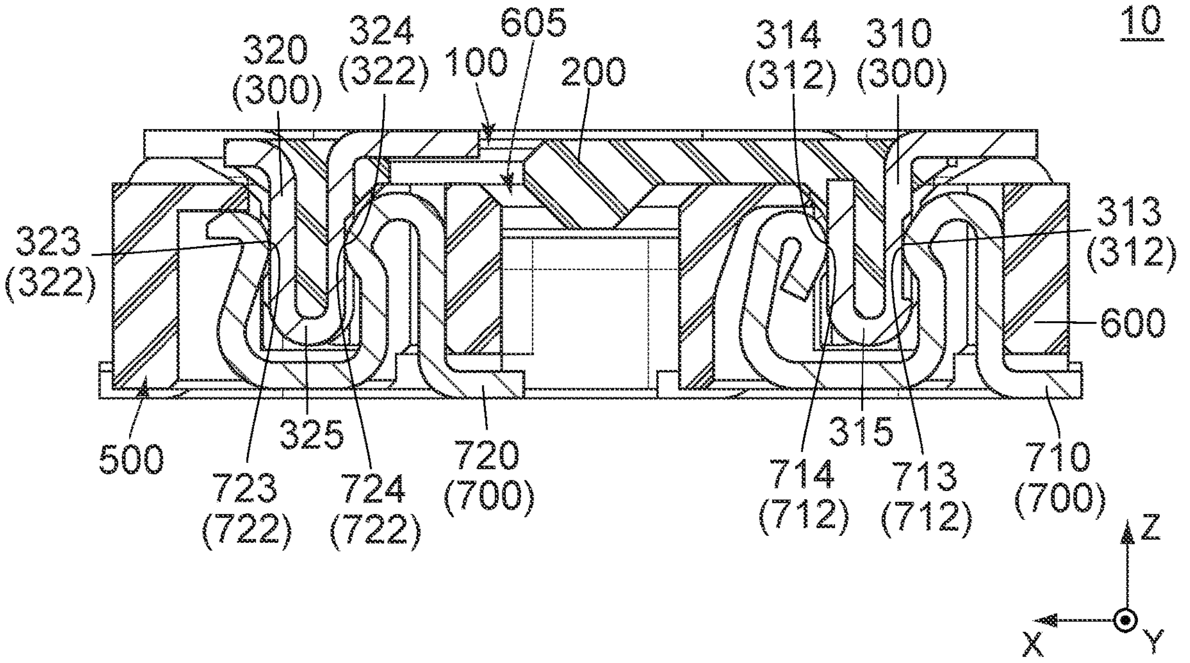
FIG. 8 is a cross-sectional view showing the assembly of FIG. 6, taken along line D-D.

As shown in FIG. 3, under the unmated state before the second connector 500 is mated with the first connector 100, the pressing contact points 722 are spaced apart from each other in the width direction and face each other in the width direction. The pressing contact points 722 of the secondary second terminal 720 are spaced apart from each other in the width direction by a secondary pressing distance D2 under the unmated state. As shown in FIG. 8, the pressing contact points 722 of each of the secondary second terminals 720 press the pressed contact points 322, respectively, of the corresponding secondary first terminal 320 under the mated state where the first connector 100 and the second connector 500 are mated with each other.

As shown in FIG. 18, the pressing contact points 722 consist of an outer pressing contact point 723 and an inner pressing contact point 724.

As shown in FIG. 4, the outer pressing contact point 723 of the present embodiment faces inward in the width direction. The outer pressing contact point 723 is positioned outward of the inner pressing contact point 724 in the width direction. Referring to FIGS. 4 and 10, the outer pressing contact point 723 of the secondary second terminal 720 of the second terminal row 650, which is positioned at the front side of the second connector 500, faces rearward in the front-rear direction. Referring to FIGS. 3 and 10, the outer pressing contact point 723 of the secondary second terminal 720 of the second terminal row 650, which is positioned at the rear side of the second connector 500, faces forward in the front-rear direction.

As shown in FIG. 4, the inner pressing contact point 724 of the present embodiment faces outward in the width direction. The inner pressing contact point 724 is positioned inward of the outer pressing contact point 723 in the width direction. Referring to FIGS. 4 and 10, the inner pressing contact point 724 of the secondary second terminal 720 of the second terminal row 650, which is positioned at the front side of the second connector 500, faces forward in the front-rear direction. Referring to FIGS. 3 and 10, the inner pressing contact point 724 of the secondary second terminal 720 of the second terminal row 650, which is positioned at the rear side of the second connector 500, faces rearward in the front-rear direction.

As shown in FIG. 3, under the unmated state, the outer pressing contact point 723 and the inner pressing contact point 724 are spaced apart from each other in the width direction and face each other in the width direction. The outer pressing contact point 723 and the inner pressing contact point 724 are spaced apart from each other in the width direction by the secondary pressing distance D2 under the unmated state. As shown in FIG. 8, the outer pressing contact point 723 of each of the secondary second terminals 720 presses the outer pressed contact point 323 of the corresponding secondary first terminal 320 in the width direction under the mated state. The inner pressing contact point 724 of each of the secondary second terminals 720 presses the inner pressed contact point 324 of the corresponding secondary first terminal 320 in the width direction under the mated state.

Referring to FIG. 3, the secondary pressing distance D2 is unequal to the primary pressing distance D1. In other words, the primary pressing distance D1 and the secondary pressing distance D2 meet a condition of $D1 \neq D2$. More specifically, in the present embodiment, the secondary pressing distance D2 is greater than the primary pressing distance D1. In other words, the primary pressing distance D1 and the secondary pressing distance D2 meet a condition of $D2 > D1$.

As shown in FIG. 18, the supporting portion 725 of the present embodiment resiliently supports the two pressing contact points 722. The supporting portion 725 extends from an upper end of the held portion 726.

Referring to FIGS. 4 and 18, the held portion 726 of the present embodiment is held by the second holding member 600. The held portion 726 is press-fit into the second holding member 600. More specifically, the held portion 726 is press-fit into the second holding portion 620. As shown in FIG. 18, the held portion 726 is positioned between the supporting portion 725 and the fixed portion 728 in the width direction. The held portion 726 extends downward in the up-down direction from an inner end of the supporting portion 725 in the width direction. The held portion 726 extends upward in the up-down direction from an outer end of the fixed portion 728 in the width direction.

Referring to FIG. 4, the fixed portion 728 of the present embodiment is fixed to the object when the second connector 500 is mounted on the object. Specifically, the fixed portion 728 is soldered to a pad (not shown) of the circuit board when the second connector 500 is mounted on the circuit board. As shown in FIG. 18, the fixed portion 728 defines a lower end of the secondary second terminal 720 in the up-down direction. The fixed portion 728 defines an inner end of the secondary second terminal 720 in the width direction. The fixed portion 728 extends inward in the width direction from a lower end of the held portion 726. As shown in FIG. 10, the fixed portion 728 of the secondary second terminal 720 is, at least in part, positioned in the opening 605 of the second holding member 600. The fixed portions 728 of all of the secondary second terminals 720 are visible through the opening 605 when the second connector 500 is viewed along the up-down direction. However, the present invention is not limited thereto, but the fixed portions 728 of the secondary second terminals 720 of at least two or more of the second terminals 700 should be visible through the opening 605 when the second connector 500 is viewed along the up-down direction.

Since the fixed portion 728 is soldered on the pad of the circuit board when the second connector 500 is mounted on the circuit board as described above, the second connector 500 should have a sufficient distance between adjacent two of the fixed portions 728 while the circuit board should have a sufficient distance between pads on which the adjacent two fixed portions 728 are soldered. If the second connector 500 is modified so that the secondary second terminals 720 of the two second terminal rows 650 are arranged in rotational asymmetry in the plane perpendicular to the up-down direction, the secondary second terminal 720 of the second terminal row 650, which is positioned at its front side, is arranged in back-to-back relationship with the secondary second terminal 720 of the second terminal row 650, which is positioned at its rear side, in the front-rear direction. In this case, the modified second connector 500 cannot have a sufficient distance between the fixed portion 728 of the secondary second terminals 720 of the second terminal row 650, which is positioned at its front side, and the fixed portion 728 of the secondary second terminal 720 of the second terminal row 650 positioned at its rear side. In contrast, as described above, the second connector 500 of the present embodiment is configured so that the secondary second terminals 720 of the two second terminal rows 650 are arranged in two-fold rotational symmetry in the plane perpendicular to the up-down direction. Accordingly, in the second connector 500 of the present embodiment, none of the secondary second terminals 720 of the second terminal row 650, which is positioned at its front side, are arranged in back-to-back relationship with any of the secondary second terminals 720 of the second terminal row 650, which is positioned at its rear side, in the front-rear direction. Thus, the second connector 500 can have a sufficient distance between the adjacent fixed portions 728 while the circuit board can have a sufficient distance between the pads on which the adjacent fixed portions 728 are soldered.

As described above, each of the primary second terminals 710 has the two pressing contact points 712 while each of the secondary second terminals 720 has the two pressing contact points 722. In other words, each of the second terminals 700 has two pressing contact points 712, 722.

Referring to FIG. 3, a first size S1 is unequal to a second size S2, where the first size S1 is a difference of the primary pressed size Sa minus the primary pressing distance D1, and the second size S2 is a difference of the secondary pressed size Sb minus the secondary pressing distance D2. In other words, the first size S1 and the second size S2 meet a condition of $S1 \neq S2$, where $S1 = Sa - D1$, and $S2 = Sb - D2$.

As described above, the assembly 10 of the present embodiment is configured as follows: the pressing contact points 712, 722 of each of the second terminals 700 press the pressed contact points 312, 322, respectively, of the corresponding first terminal 300 in the width direction under the mated state where the first connector 100 and the second connector 500 are mated with each other; and the first size S1 and the second size S2 meet the condition of $S1 \neq S2$. Accordingly, upon the mating of the first connector 100 with the second connector 500, the assembly 10 of the present embodiment requires a reduced insertion force while the first terminal 300 and the corresponding second terminal 700 are brought into contact with each other by two points so that a reliable connection of the first terminal 300 and the corresponding second terminal 700 is ensured.

Especially, in the present embodiment, the second size S2 is smaller than the first size S1. That is, the first size S1 and the second size S2 meet a condition of $S2 < S1$. Accordingly, the assembly 10 of the present embodiment is configured so that, upon the mating of the first connector 100 with the second connector 500, a force, which the secondary first terminal 320 receives from the secondary second terminal 720, is smaller than a force which the primary first terminal 310 receives from the primary second terminal 710. Specifically, the assembly 10 of the present embodiment reliably reduces a required insertion force upon the mating of the first connector 100 with the second connector 500.

Hereafter, an explanation will be made about the operation of fixing the secondary second terminals 720 to the second holding member 600.

Figure 21:
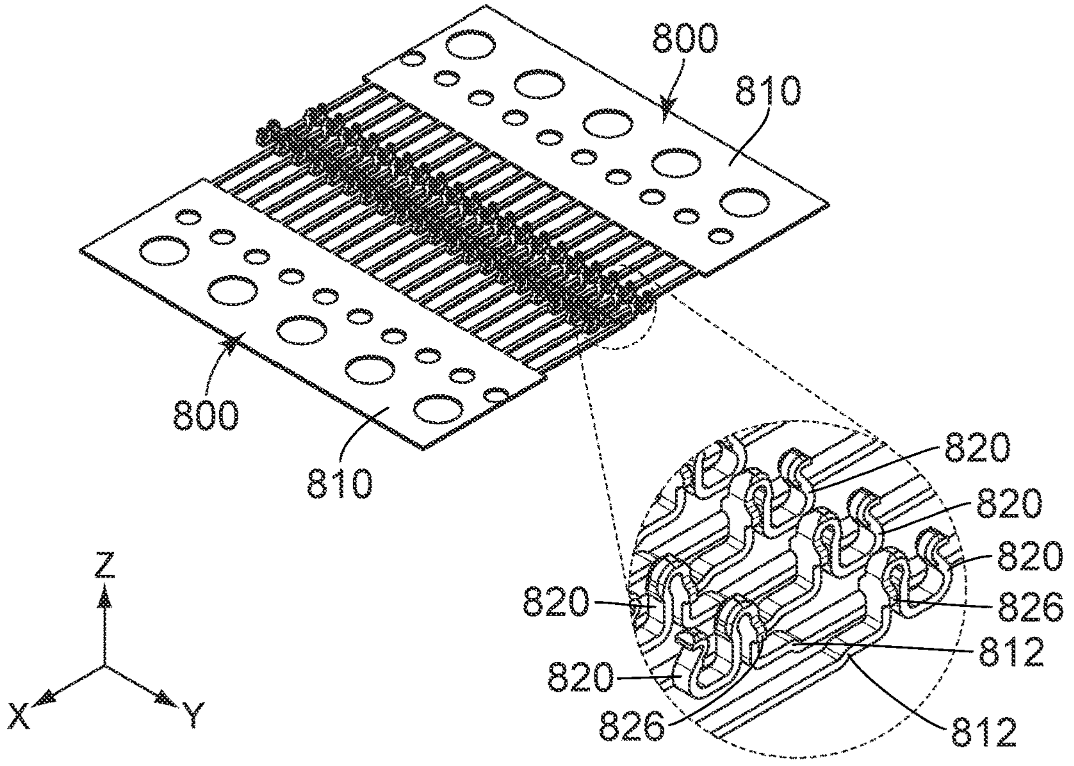
FIG. 21 is a perspective view showing a second terminal row intermediator which is used upon operation of fixing the secondary second terminals to the second holding member.
Figure 22:
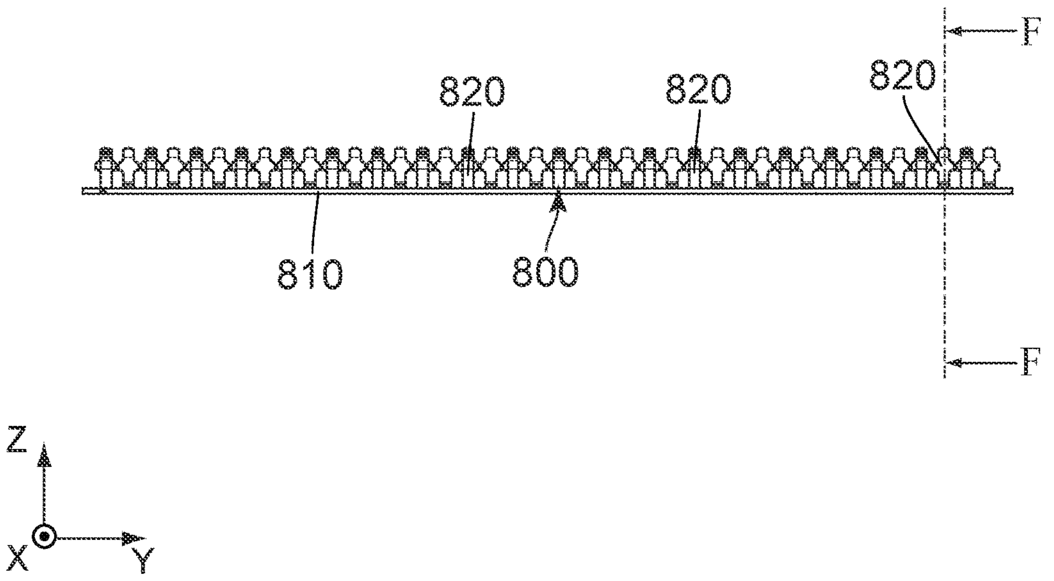
FIG. 22 is another view showing the second terminal row intermediator of FIG. 21.

First, a manufacturer prepares two second terminal row intermediators 800 each consisting of a carrier 810, coupling portions 812 and blanks 820 which are coupled with the carrier 810 via the coupling portions 812, respectively. Then, the manufacturer arranges the second terminal row intermediators 800 as shown in FIG. 21. In this state, the blanks 820 are arranged in two-fold rotational symmetry in the plane perpendicular to the up-down direction. More specifically, in this state, the blanks 820 are arranged in a staggered configuration. Additionally, in this state, the carriers 810 of the two second terminal row intermediators 800 are arranged at opposite ends, respectively, of a set of the two second terminal row intermediators 800 in the front-rear direction with the blanks 820 left therebetween.

Figure 20:
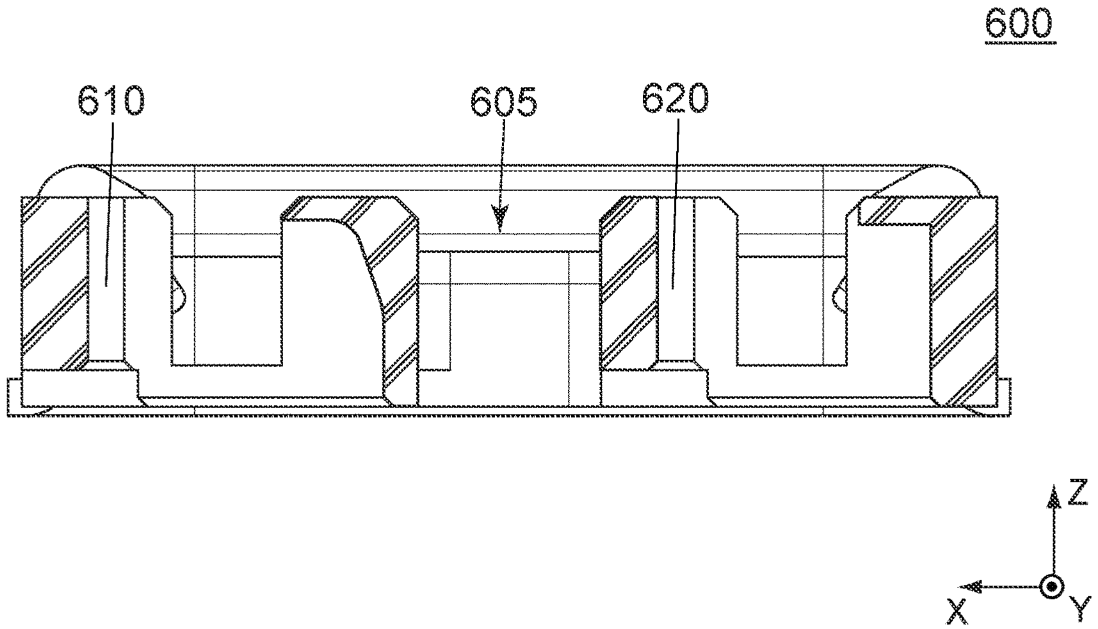
FIG. 20 is a cross-sectional view showing the second holding member of FIG. 19, taken along line E-E.
Figure 23:
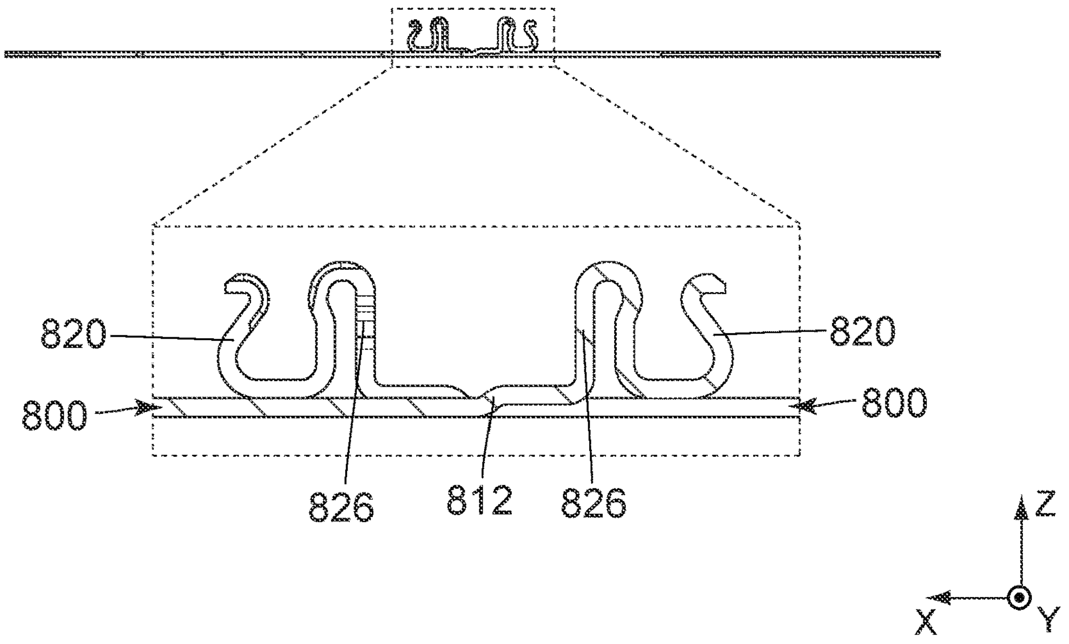
FIG. 23 is a cross-sectional view showing the second terminal row intermediator of FIG. 22, taken along line F-F.

Next, referring to FIGS. 20, 23 and 26, the blanks 820 are press-fit into the second holding member 600 from below. Specifically, held portions 826 of the blanks 820 are press-fit into the second holding portions 620, respectively, of the second holding member 600 from below. Thus, the manufacturer obtains a first intermediator 850 shown in each of FIGS. 24 to 26.

Figure 24:
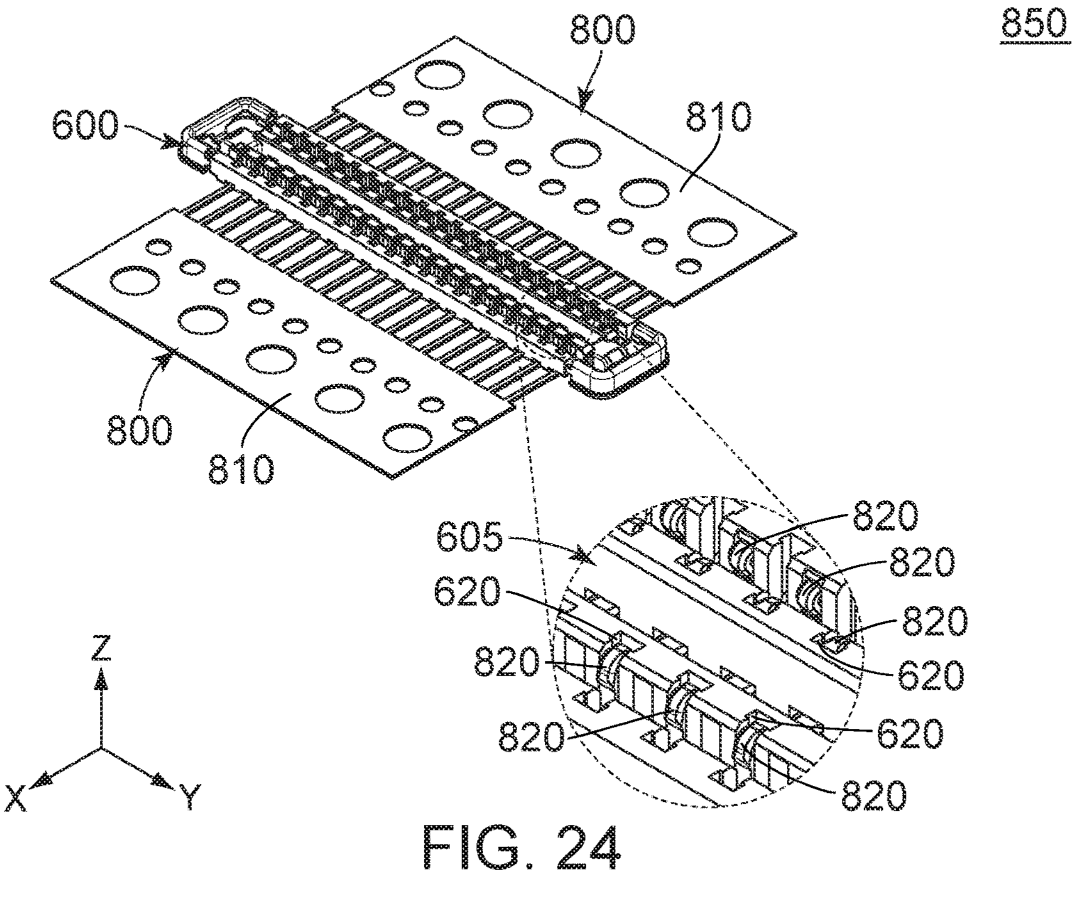
FIG. 24 is a perspective view showing a first intermediator which is obtained by press-fitting the second terminal row intermediator of FIG. 21 to the second holding member of FIG. 19.
Figure 25:
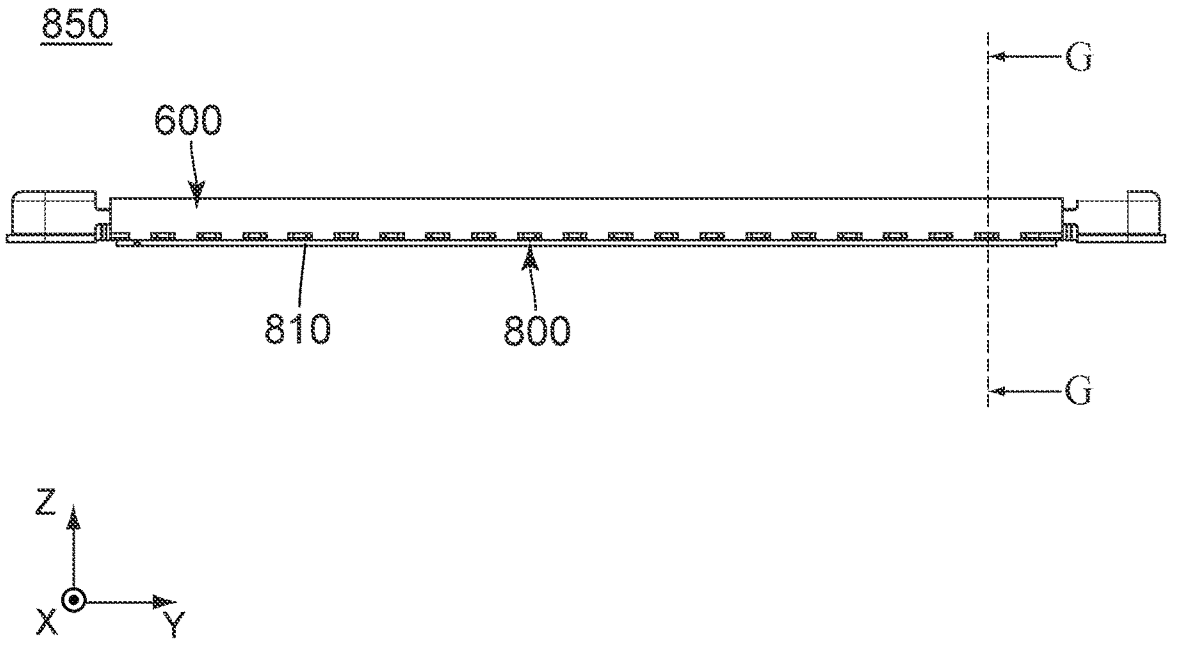
FIG. 25 is a front view showing the first intermediator of FIG. 24.
Figure 26:
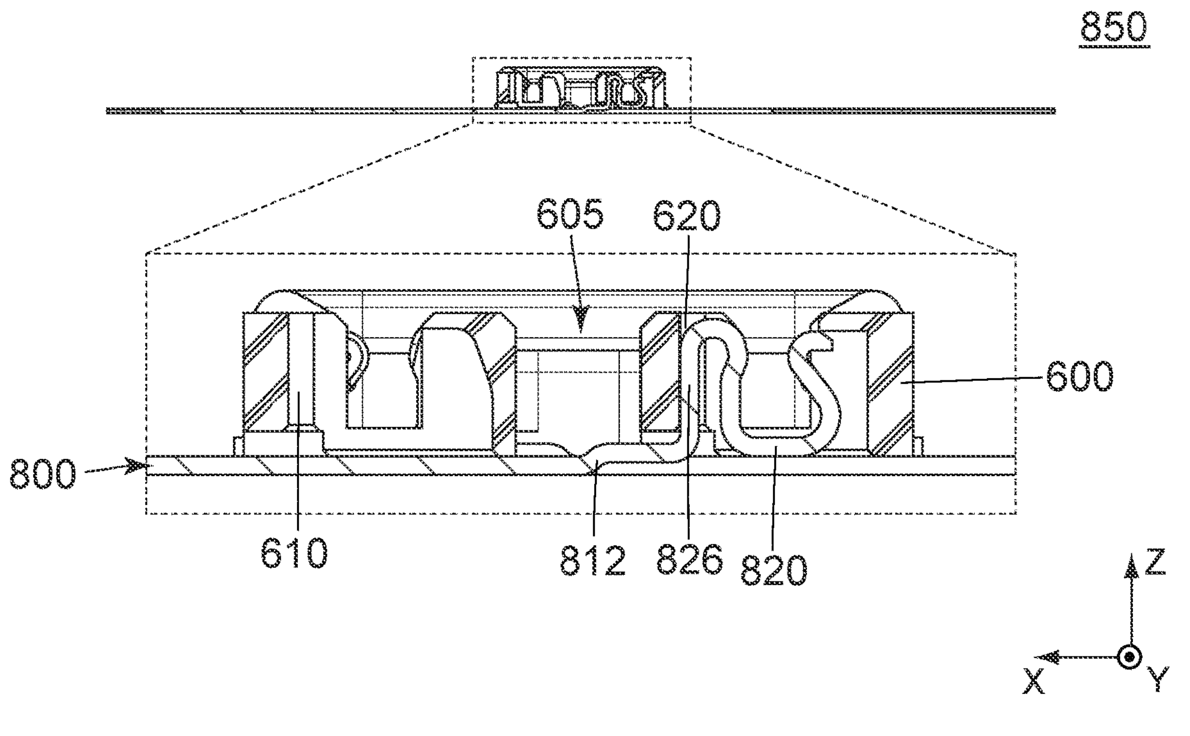
FIG. 26 is a cross-sectional view showing the first intermediator of FIG. 25, taken along line G-G.
Figure 27:
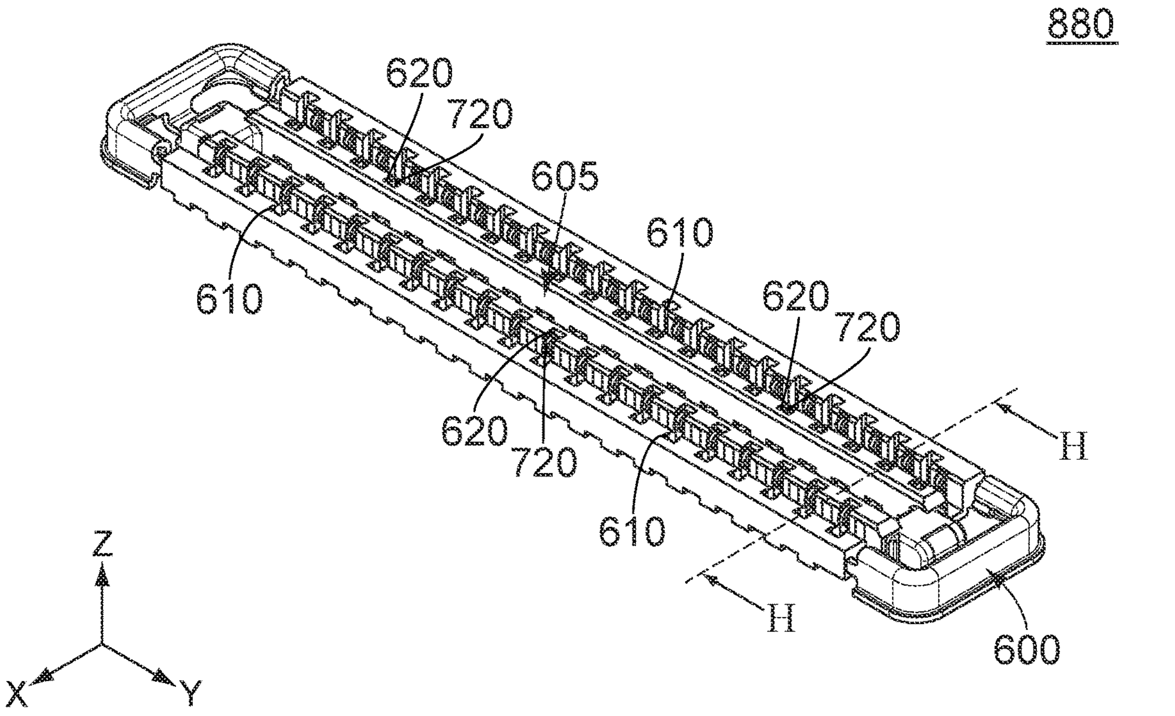
FIG. 27 is a perspective view showing a second intermediator which is obtained by removing a carrier from the first intermediator of FIG. 24.
Figure 28:
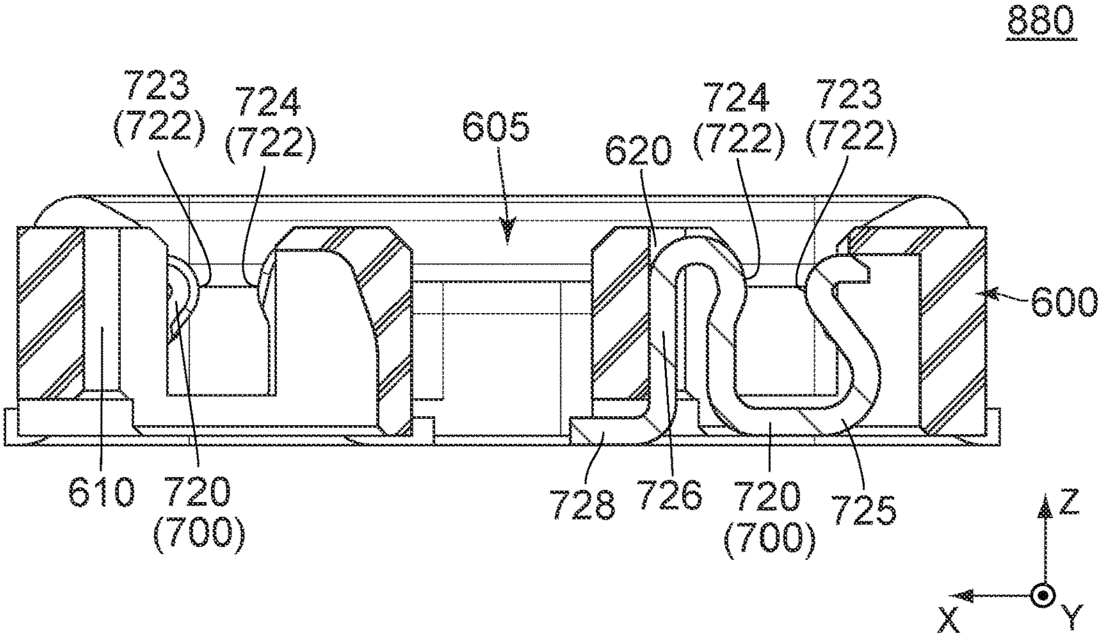
FIG. 28 is a cross-sectional view showing the second intermediator of FIG. 27, taken along line H-H.

After that, referring to FIGS. 24 and 26, the manufacturer inserts a cutting blade (not shown) into the opening 605 from above, and the manufacturer simultaneously splits the coupling portions 812 each coupling the blank 820 with the carrier 810 positioned at a front side of the second holding member 600. Similarly, the manufacturer inserts a cutting blade into the opening 605 from above, and the manufacturer simultaneously splits the coupling portions 812 each coupling the blank 820 with the carrier 810 positioned at a rear side of the second holding member 600. Then, the manufacturer obtains a second intermediator 880 shown in each of FIGS. 27 and 28. Thus, the blanks 820 become the secondary second terminals 720, and the operation of fixing the secondary second terminals 720 to the second holding member 600 is completed. It is noted that an end portion of the blank 820, which is produced by splitting the coupling portion 812, becomes the fixed portion 728 of the secondary second terminal 720.

As described above, the second connector 500 of the present embodiment has the opening 605. Accordingly, in the fixing operation of the secondary second terminals 720 to the second holding member 600 in a manufacturing process of the second connector 500 of the present embodiment, a manufacturer can simultaneously split the coupling portions 812, each of which couples the blank 820 with the carrier 810 positioned at its front side, by inserting the cutting blade into the opening 605 as described above. Similarly, in the fixing operation of the secondary second terminals 720 to the second holding member 600 in the manufacturing process of the second connector 500 of the present embodiment, a manufacturer can simultaneously split the coupling portions 812, each of which couples the blank 820 with the carrier 810 positioned at its rear side, by inserting the cutting blade into the opening 605 as described above. Thus, the second connector 500 of the present embodiment can be manufactured with simplified process and lower costs.

Where the first embodiment of the present invention is described above, the present embodiment may be modified as follows.

First Modification

Figure 29:
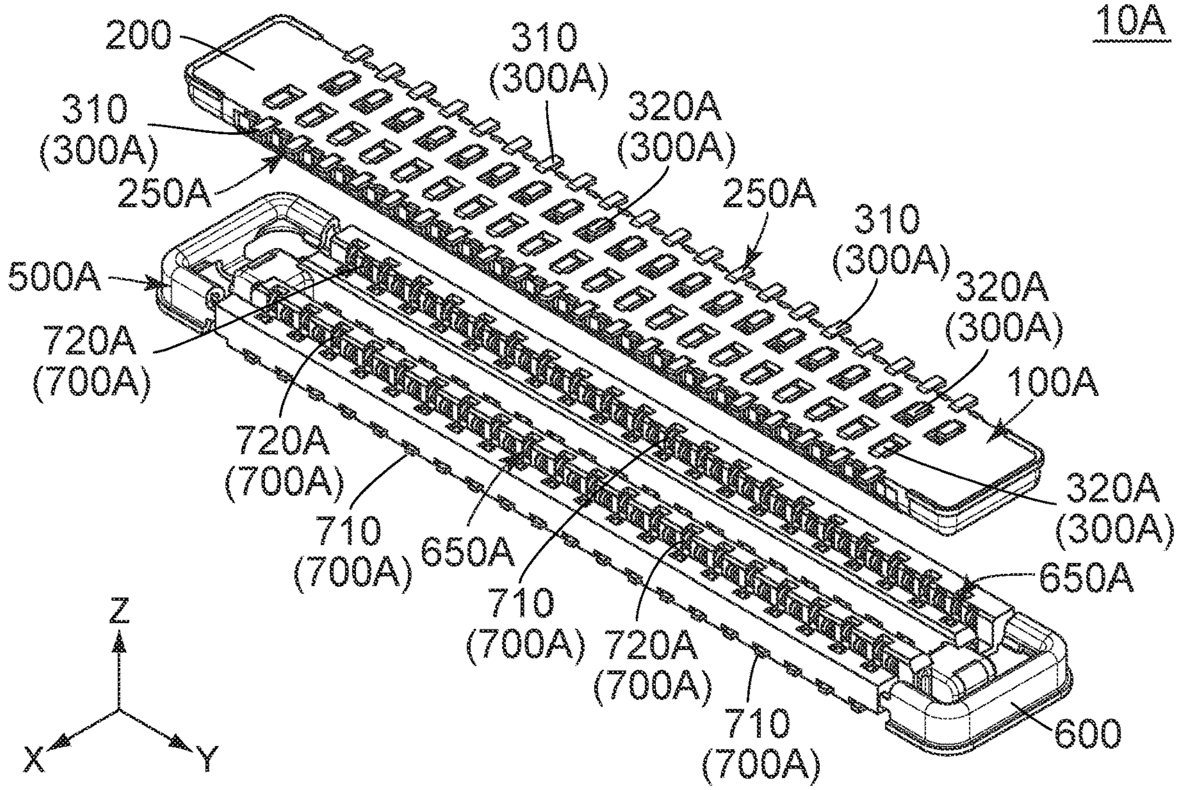
FIG. 29 is a perspective view showing a first modification of the assembly of FIG. 1. In the figure, a first connector and a second connector are not mated with each other.
Figure 30:
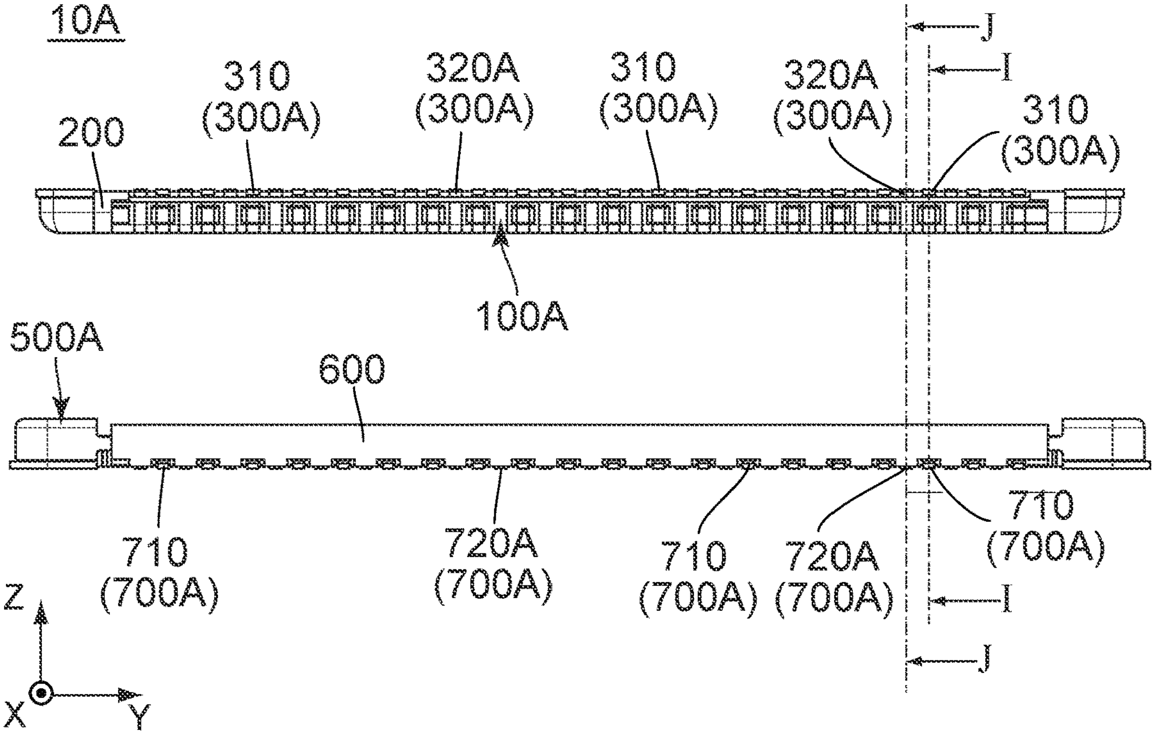
FIG. 30 is a side view showing the assembly of FIG. 29.

As shown in FIG. 29, an assembly 10A according to a first modification comprises a first connector 100A and a second connector 500A.

Figure 31:
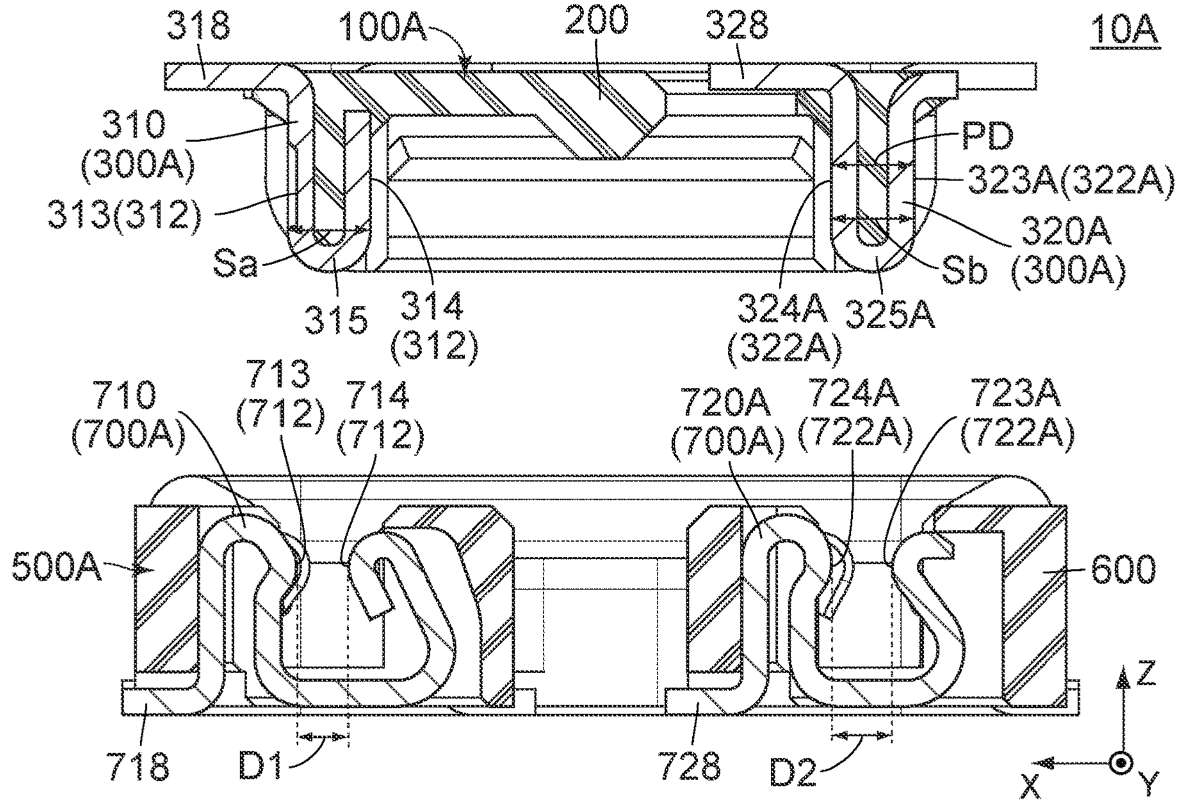
FIG. 31 is a cross-sectional view showing the assembly of FIG. 30, taken along line I-I.

As shown in FIG. 31, the first connector 100A of the present modification comprises a plurality of first terminals 300A and a first holding member 200. Each of the first terminals 300A is made of metal. The first holding member 200 of the present modification has a structure same as that of the first holding member 200 of the first embodiment. Accordingly, a detailed explanation thereabout is omitted.

As shown in FIG. 29, the first connector 100A has two first terminal rows 250A which are positioned apart from each other in the width direction. In other words, the two first terminal rows 250A are positioned apart from each other in the front-rear direction. The first terminal row 250A is also referred to as a terminal row 250A. Although the number of the terminal rows 250A is two, the present invention is not limited thereto. Specifically, the number of the terminal row 250A may be one.

As shown in FIG. 29, each of the first terminal rows 250A consists of the first terminals 300A which are arranged in the pitch direction perpendicular to both the up-down direction and the width direction.

As shown in FIG. 29, the first terminals 300A of the present modification are held by the first holding member 200. The first terminals 300A consist of a plurality of primary first terminals 310 and a plurality of secondary first terminals 320A. In other words, each of the first terminal rows 250A includes a plurality of the primary first terminals 310 and a plurality of the secondary first terminals 320A. The primary first terminal 310 is adjacent to the secondary first terminal 320A in the pitch direction. More specifically, in each of the first terminal rows 250A, the primary first terminals 310 and the secondary first terminals 320A are alternately arranged in the pitch direction. In the present modification, the number of the primary first terminals 310 and the number of the secondary first terminals 320A are equal to each other. However, the present invention is not limited thereto, but each of the first terminal rows 250A should include at least one of the primary first terminal 310 and at least one of the secondary first terminal 320A. At any rate, the first terminals 300A should include at least one of the primary first terminal 310 and at least one of the secondary first terminal 320A. If the number of the terminal row 250A is one, the terminal row 250A should be configured as follows: at least ones of the first terminals 300A are arranged in the pitch direction perpendicular to both the up-down direction and the width direction so that the at least ones of the first terminals 300A form the single terminal row 250A; and the single terminal row 250A includes the primary first terminal 310 and the secondary first terminal 320A. The primary first terminal 310 of the present modification has a structure same as that of the primary first terminal 310 of the first embodiment. Accordingly, a detailed explanation thereabout is omitted.

Figure 32:
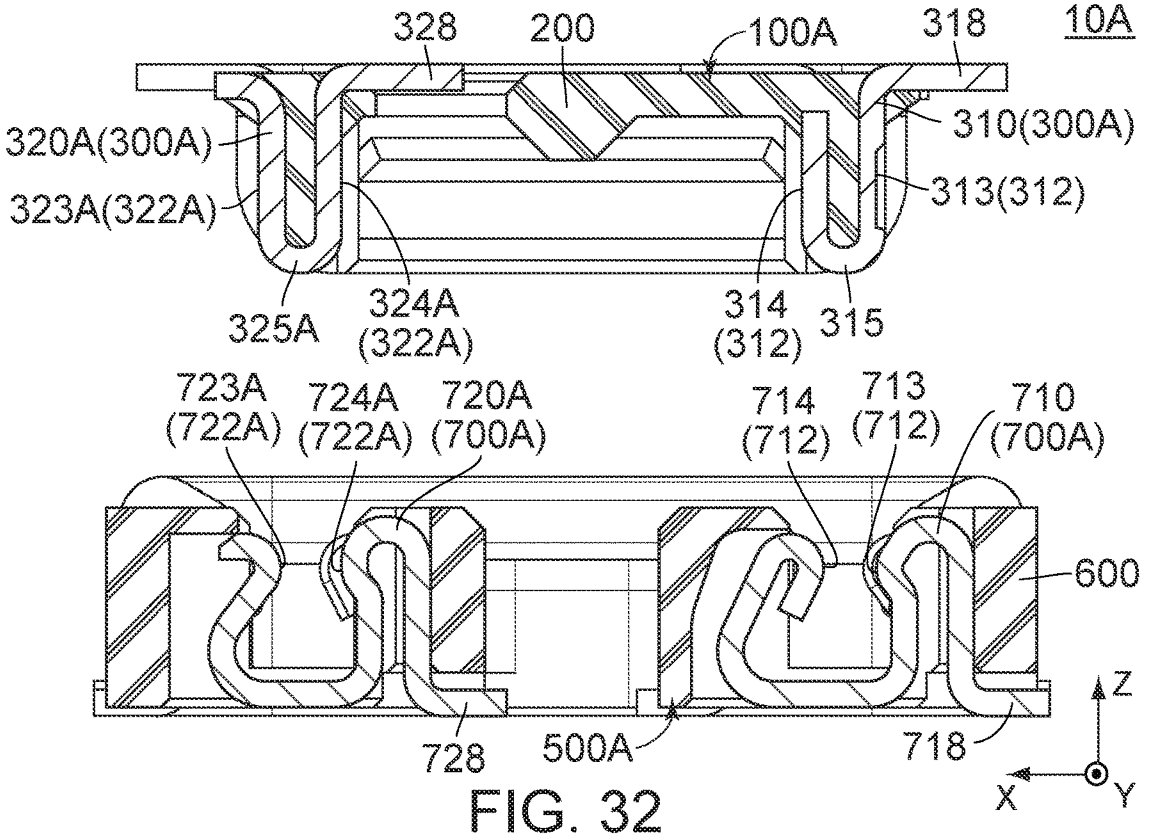
FIG. 32 is a cross-sectional view showing the assembly of FIG. 30, taken along line J-J.
Figure 33:
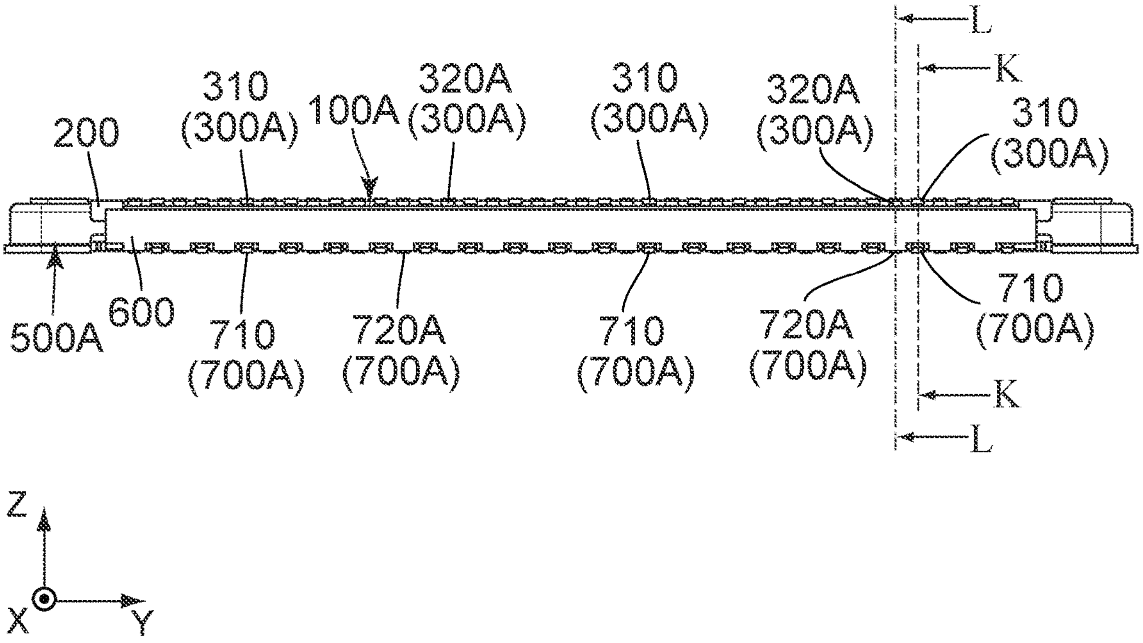
FIG. 33 is a side view showing the assembly of FIG. 29. In the figure, the first connector and the second connector are mated with each other.
Figure 34:
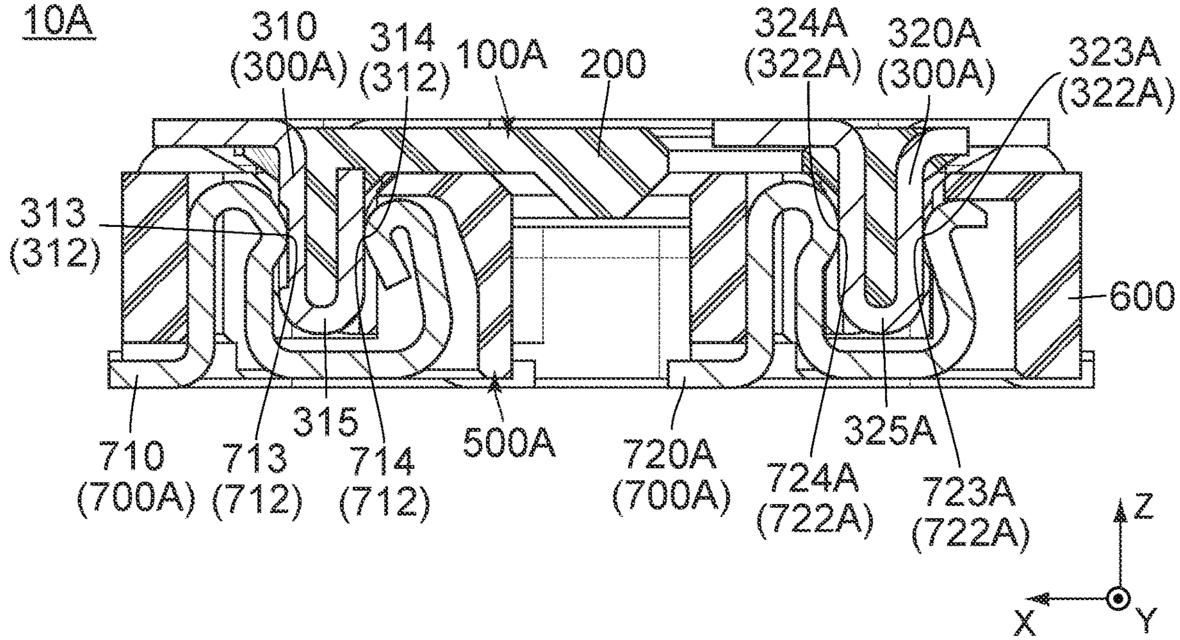
FIG. 34 is a cross-sectional view showing the assembly of FIG. 33, taken along line K-K.

Referring to FIGS. 29, 31 and 32, the secondary first terminals 320A of the two first terminal rows 250A are arranged in two-fold rotational symmetry in the plane perpendicular to the up-down direction. The secondary first terminals 320A of the two first terminal rows 250A are arranged in a staggered configuration.

Figure 37:
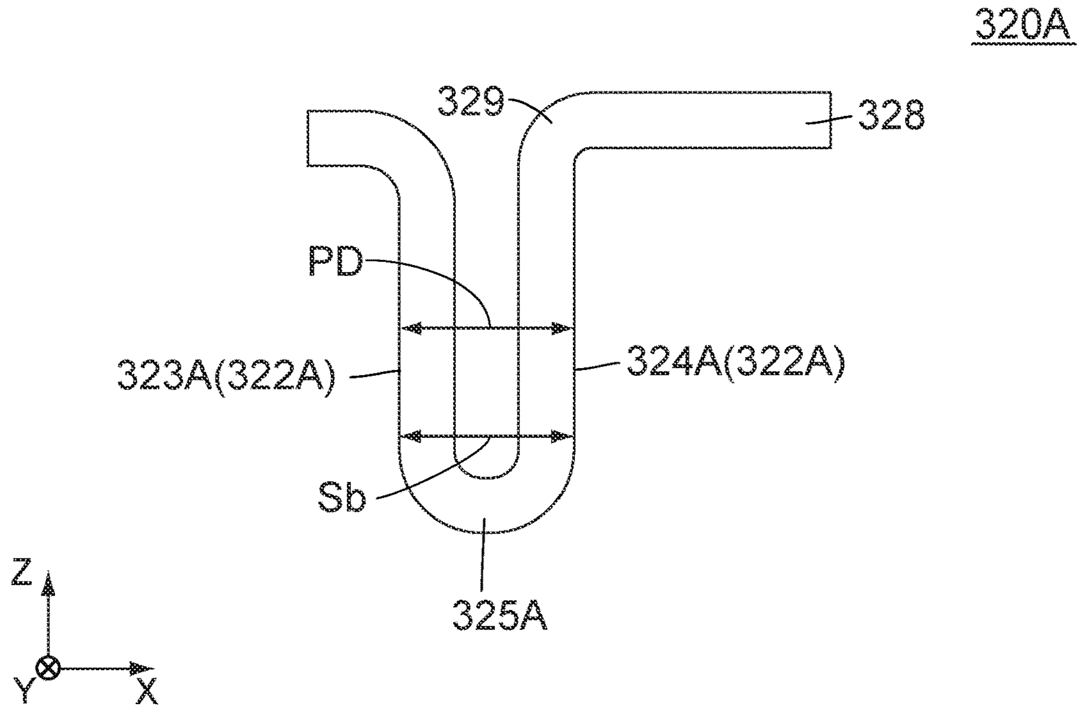
FIG. 37 is a side view showing the secondary first terminal of FIG. 36.
Figure 38:
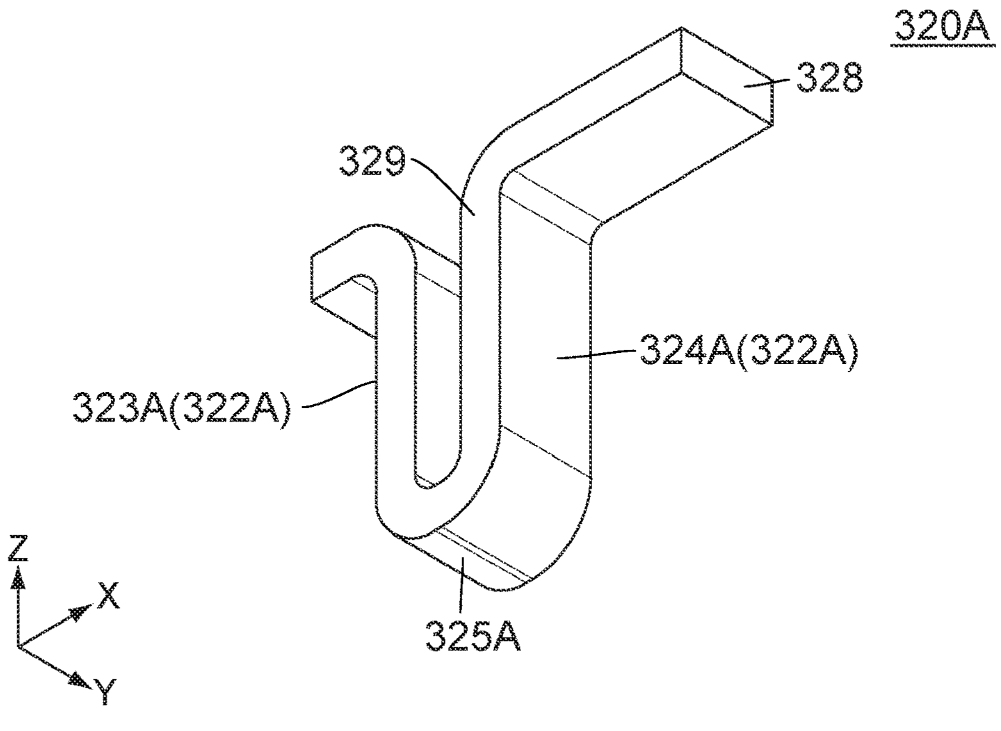
FIG. 38 is another perspective view showing the secondary first terminal of FIG. 36.

As shown in FIG. 37, each of the secondary first terminals 320A has two pressed contact points 322A, an insertion end portion 325A, a fixed portion 328 and a coupling portion 329. Specifically, dissimilar to the secondary first terminal 320 of the aforementioned embodiment, the secondary first terminal 320A of the present modification does not have an inclined portion 326. The insertion end portion 325A, the fixed portion 328 and the coupling portion 329 of the present modification have structures same as those of the insertion end portion 325, the fixed portion 328 and the coupling portion 329 of the first embodiment. Accordingly, a detailed explanation thereabout is omitted.

As shown in FIG. 37, each of the pressed contact points 322A is positioned apart from the insertion end portion 325A in the up-down direction. Each of the pressed contact points 322A is positioned above the insertion end portion 325A in the up-down direction. The pressed contact points 322A are positioned apart from each other in the width direction perpendicular to the up-down direction. The pressed contact points 322A face in orientations different from each other in the width direction.

As shown in FIG. 37, the pressed contact points 322A consist of an outer pressed contact point 323A and an inner pressed contact point 324A. The outer pressed contact point 323A and the inner pressed contact point 324A of the present modification have structures same as those of the outer pressed contact point 323 and the inner pressed contact point 324 of the first embodiment. Accordingly, a detailed a thereabout is omitted.

As shown in FIG. 37, the secondary first terminal 320A has a secondary pressed size Sb which is a largest size of the secondary first terminal 320A in the width direction in an area of the secondary first terminal 320A from the insertion end portion 325A to the pressed contact point 322A. The secondary pressed size Sb of the present modification is equal to a distance PD between the outer pressed contact point 323A and the inner pressed contact point 324A in the width direction. Specifically, the pressed contact points 322A of the secondary first terminal 320A are positioned apart from each other in the width direction by a predetermined distance PD, and the secondary pressed size Sb and the predetermined distance PD meet a condition of Sb=PD.

Referring to FIG. 31, in the present modification, the secondary pressed size Sb is equal to the primary pressed size Sa. In other words, the primary pressed size Sa and the secondary pressed size Sb meet a condition of Sa=Sb.

Referring to FIG. 29, the second connector 500A of the present modification comprises a plurality of second terminals 700A and a second holding member 600. Each of the second terminals 700A is made of metal. The second holding member 600 of the present modification have a structure same as that of the second holding member 600 of the first embodiment. Accordingly, a detailed explanation thereabout is omitted.

As shown in FIG. 29, the second connector 500A has two second terminal rows 650A which are positioned apart from each other in the width direction. In other words, the two second terminal rows 650A are positioned apart from each other in the front-rear direction. Although the number of the second terminal rows 650A is two, the present invention is not limited thereto. Specifically, the number of the second terminal row 650A may be one.

As shown in FIG. 29, each of the second terminal rows 650A consists of the second terminals 700A which are arranged in the pitch direction perpendicular to both the up-down direction and the width direction.

As shown in FIG. 31, the second terminals 700A of the present modification are held by the second holding member 600. Referring to FIGS. 31 and 32, the second terminals 700A correspond to the first terminals 300A, respectively. As shown in FIG. 29, the second terminals 700A consist of a plurality of primary second terminals 710 and a plurality of secondary second terminals 720A. In other words, each of the second terminal rows 650A includes a plurality of the primary second terminals 710 and a plurality of the secondary second terminals 720A. The primary second terminal

710 is adjacent to the secondary second terminal 720A in the pitch direction. More specifically, in each of the second terminal rows 650A, the primary second terminals 710 and the secondary second terminals 720A are alternately arranged in the pitch direction. In the present modification, the number of the primary second terminals 710 and the number of the secondary second terminals 720A are equal to each other. However, the present invention is not limited thereto, but each of the second terminal rows 650A should include the primary second terminal 710 and the secondary second terminal 720A. At any rate, the second terminals 700A should include the primary second terminal 710 and at least one of the secondary second terminal 720A. If the number of the second terminal row 650A is one, the second terminal row 650A should be configured as follows: at least ones of the second terminals 700A are arranged in the pitch direction perpendicular to both the up-down direction and the width direction so that the at least ones of the second terminals 700A form the single second terminal row 650A; and the single second terminal row 650A includes the primary second terminal 710 and the secondary second terminal 720A. The primary second terminal 710 of the present modification have a structure same as that of the primary second terminal 710 of the first embodiment. Accordingly, a detailed explanation thereabout is omitted.

Referring to FIGS. 29, 31 and 32, the secondary second terminals 720A of the two second terminal rows 650A are arranged in two-fold rotational symmetry in the plane perpendicular to the up-down direction. The secondary second terminals 720A of the two second terminal rows 650A are arranged in a staggered configuration. An operation of fixing the secondary second terminal 720A to the second holding member 600 can be achieved in a manner similar to that of the aforementioned first embodiment. The secondary second terminals 720A correspond to the secondary first terminals 320A, respectively.

Figure 39:
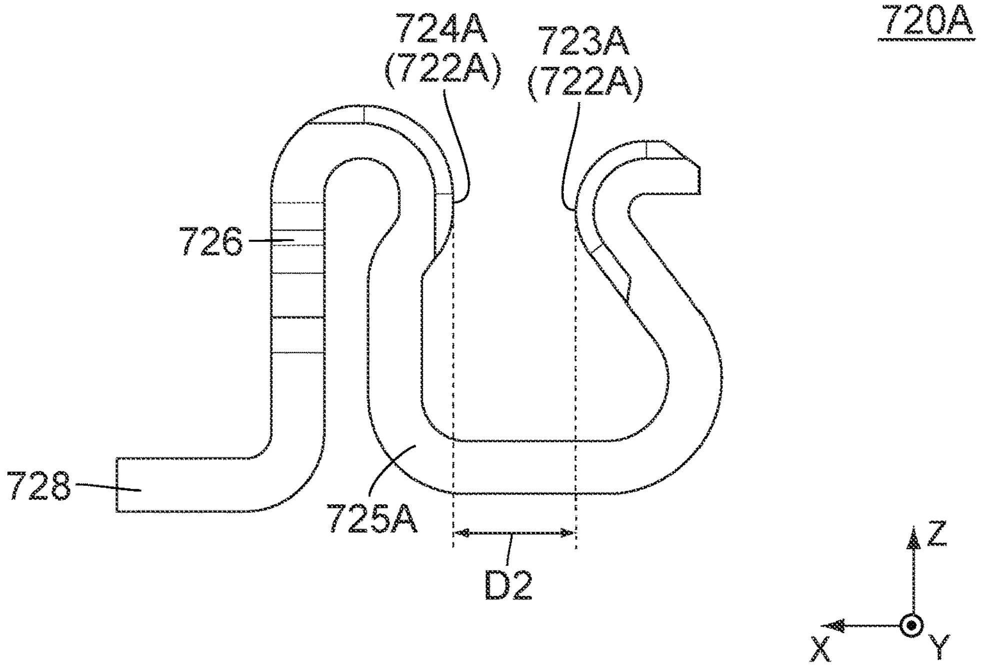
FIG. 39 is a side view showing a secondary second terminal which is included in the second connector of the assembly of FIG. 29.

As shown in FIG. 39, each of the secondary second terminals 720A of the present modification has two pressing contact points 722A, a supporting portion 725A, a held portion 726 and a fixed portion 728. The held portion 726 and the fixed portion 728 of the present modification have structures same as those of the held portion 726 and the fixed portion 728 of the first embodiment. Accordingly, a detailed explanation thereabout is omitted.

Figure 35:
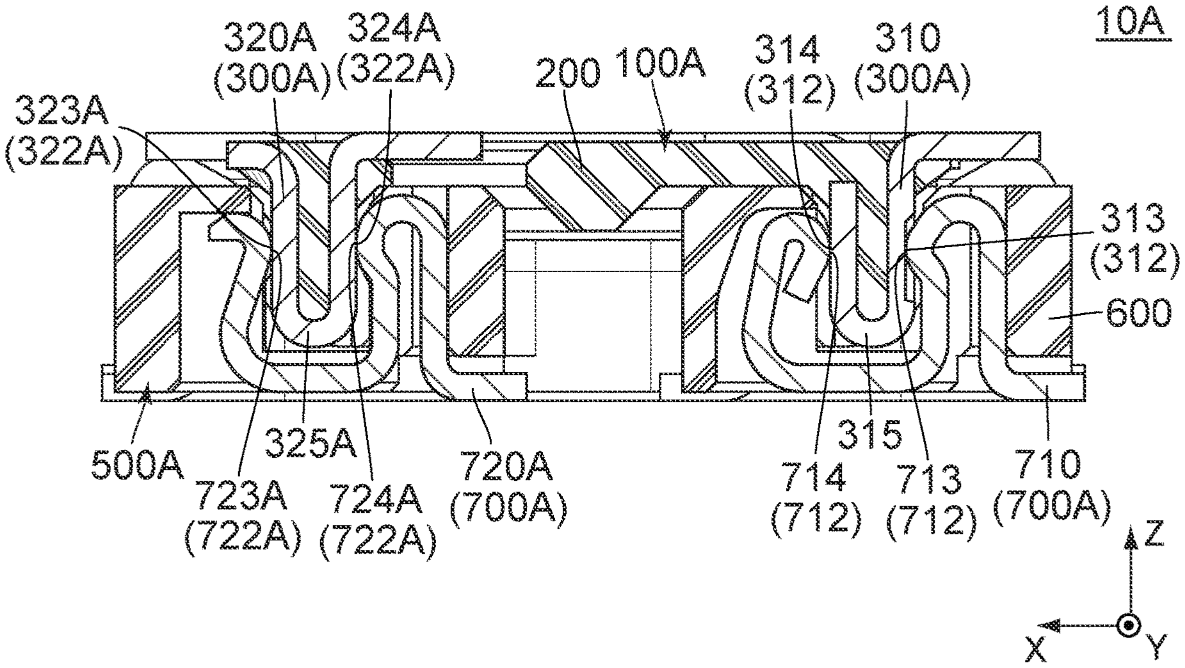
FIG. 35 is a cross-sectional view showing the assembly of FIG. 33, taken along line L-L.
Figure 36:
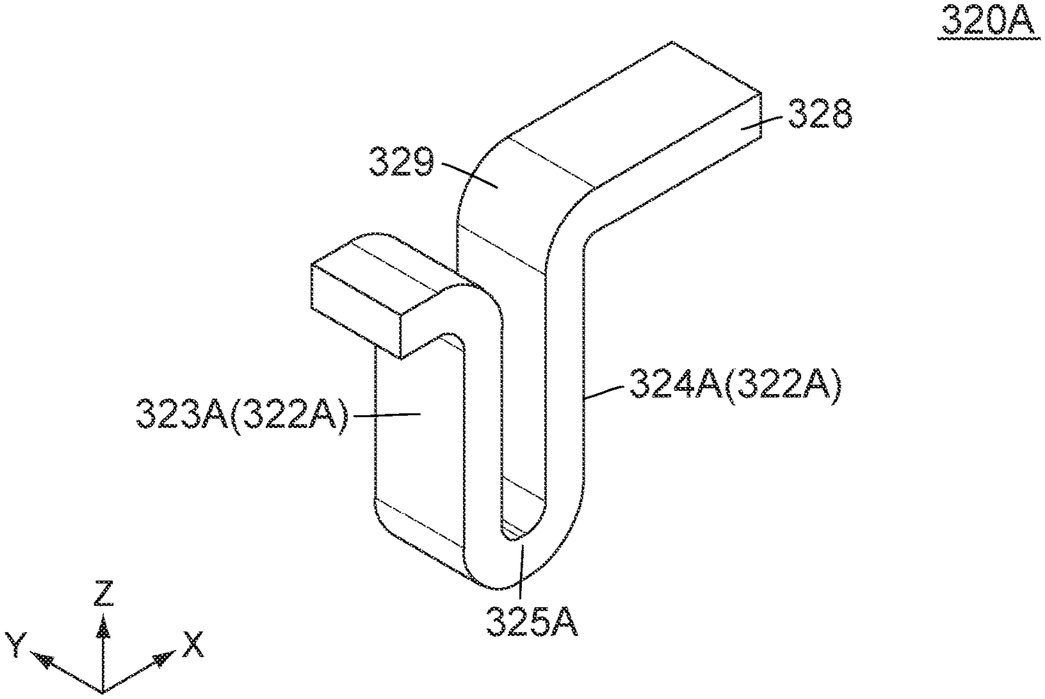
FIG. 36 is a perspective view showing a secondary first terminal which is included in the first connector of the assembly of FIG. 29.

As shown in FIG. 31, under an unmated state before the second connector 500A is mated with the first connector 100A, the pressing contact points 722A are spaced apart from each other in the width direction and face each other in the width direction. The pressing contact points 722A of the secondary second terminal 720A are spaced apart from each other in the width direction by a secondary pressing distance D2 under the unmated state. As shown in FIG. 35, the pressing contact points 722A of each of the secondary second terminals 720A press the pressed contact points 322A, respectively, of the corresponding secondary first terminal 320A under a mated state where the first connector 100 and the second connector 500 are mated with each other.

As shown in FIG. 39, the pressing contact points 722A consist of an outer pressing contact point 723A and an inner pressing contact point 724A. The outer pressing contact point 723A and the inner pressing contact point 724A of the present modification have structures same as those of the outer pressing contact point 723 and the inner pressing contact point 724 of the first embodiment. Accordingly, a detailed explanation thereabout is omitted.

Referring to FIG. 31, the secondary pressing distance D2 is unequal to the primary pressing distance D1. In other words, the primary pressing distance D1 and the secondary pressing distance D2 meet a condition of $D1 \neq D2$. More specifically, in the present modification, the secondary pressing distance D2 is greater than the primary pressing distance D1. In other words, the primary pressing distance D1 and the secondary pressing distance D2 meet a condition of $D2 > D1$.

As shown in FIG. 39, the supporting portion 725A of the present modification resiliently supports the two pressing contact points 722A. The supporting portion 725A extends from an upper end of the held portion 726.

Referring to FIG. 31, a first size S1 is unequal to a second size S2, where the first size S1 is a difference of the primary pressed size Sa minus the primary pressing distance D1, and the second size S2 is a difference of the secondary pressed size Sb minus the secondary pressing distance D2. In other words, the first size S1 and the second size S2 meet a condition of $S1 \neq S2$, where $S1 = Sa - D1$, and $S2 = Sb - D2$.

As described above, the assembly 10A of the present modification is configured as follows: the pressing contact points 712, 722A of each of the second terminals 700A press the pressed contact points 312, 322A, respectively, of the corresponding first terminal 300A in the width direction under the mated state where the first connector 100A and the second connector 500A are mated with each other; and the first size S1 and the second size S2 meet the condition of $S1 \neq S2$. Accordingly, upon the mating of the first connector 100A with the second connector 500A, the assembly 10A of the present modification requires a reduced insertion force while the first terminal 300A and the corresponding second terminal 700A are brought into contact with each other by two points so that a reliable connection of the first terminal 300A and the corresponding second terminal 700A is ensured.

Especially, in the present modification, the second size S2 is smaller than the first size S1. In other words, the first size S1 and the second size S2 meet a condition of $S2 < S1$. Accordingly, the assembly 10A of the present modification is configured so that, upon the mating of the first connector 100A with the second connector 500A, a force, which the secondary first terminal 320A receives from the secondary second terminal 720A, is smaller than a force which the primary first terminal 310 receives from the primary second terminal 710. Specifically, the assembly 10A of the present modification reliably reduces a required insertion force upon the mating of the first connector 100A with the second connector 500A.

Second Modification

Figure 40:
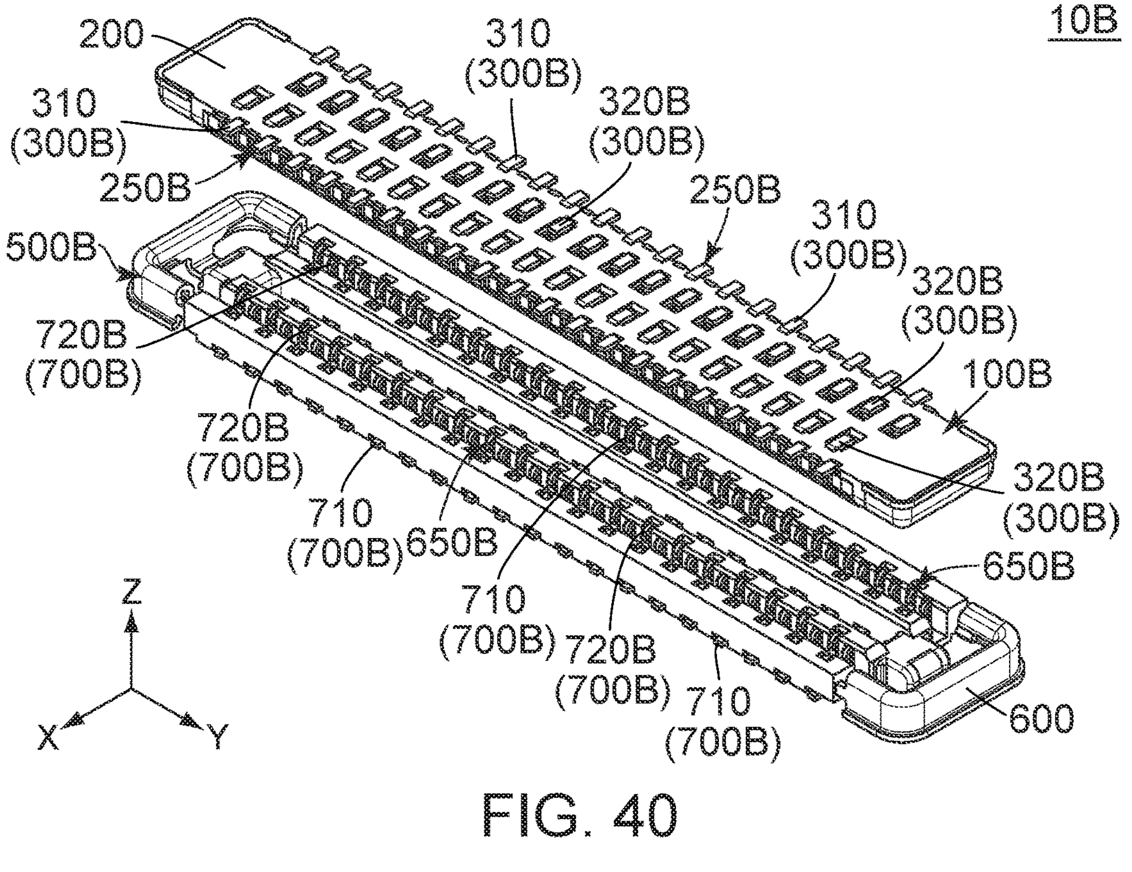
FIG. 40 is a perspective view showing a second modification of the assembly of FIG. 1. In the figure, a first connector and a second connector are not mated with each other.
Figure 41:
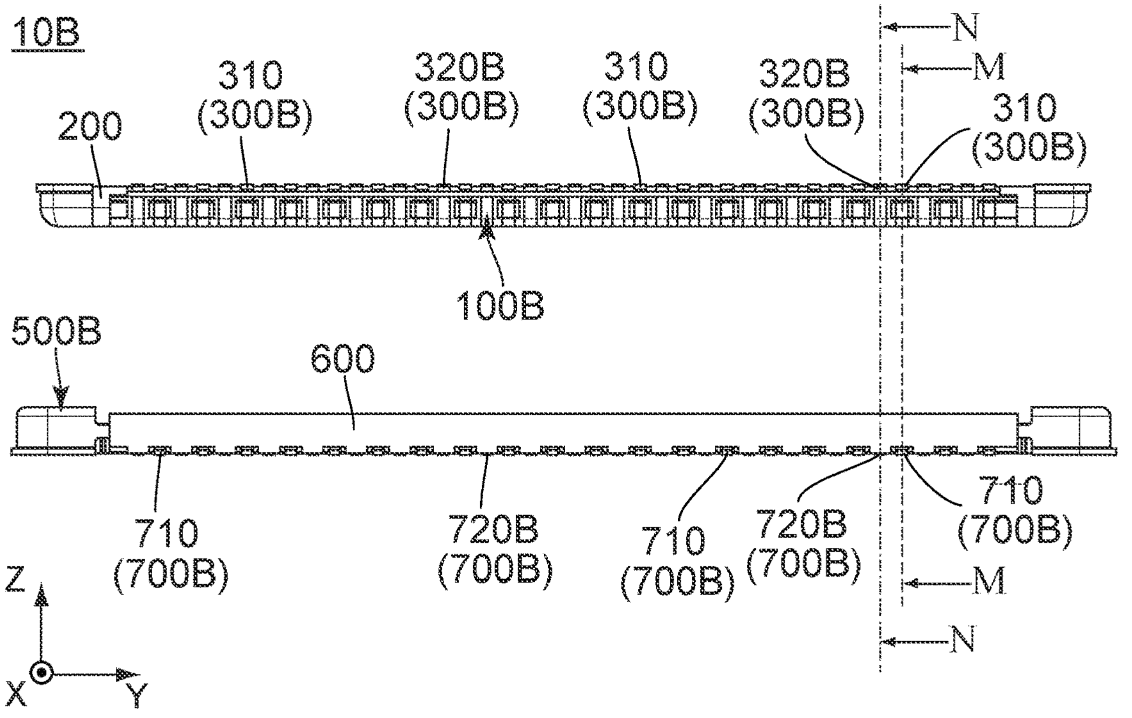
FIG. 41 is a side view showing the assembly of FIG. 40.

As shown in FIG. 40, an assembly 10B according to a second modification comprises a first connector 100B and a second connector 500B.

Figure 42:
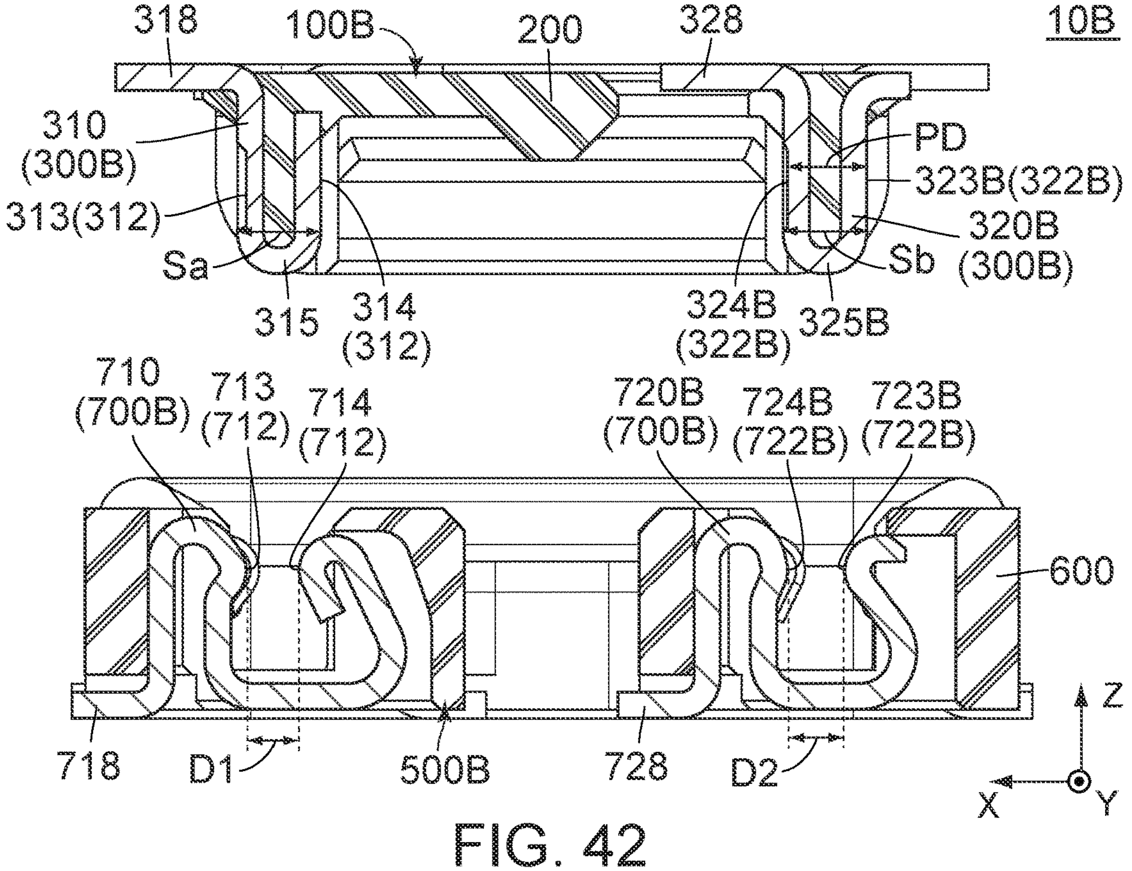
FIG. 42 is a cross-sectional view showing the assembly of FIG. 41, taken along line M-M.

As shown in FIG. 42, the first connector 100B of the present modification comprises a plurality of first terminals 300B and a first holding member 200. Each of the first terminals 300B is made of metal. The first holding member 200 of the present modification has a structure same as that of the first holding member 200 of the first embodiment. Accordingly, a detailed explanation thereabout is omitted.

As shown in FIG. 40, the first connector 100B has two first terminal rows 250B which are positioned apart from each other in the width direction. In other words, the two first terminal rows 250B are positioned apart from each other in the front-rear direction. The first terminal row 250B is also referred to as a terminal row 250B. Although the number of the terminal rows 250B is two, the present invention is not limited thereto. Specifically, the number of the terminal row 250B may be one.

As shown in FIG. 40, each of the first terminal rows 250B consists of the first terminals 300B which are arranged in the pitch direction perpendicular to both the up-down direction and the width direction.

As shown in FIG. 40, the first terminals 300B of the present modification are held by the first holding member 200. The first terminals 300B consist of a plurality of primary first terminals 310 and a plurality of secondary first terminals 320B. In other words, each of the first terminal rows 250B includes a plurality of the primary first terminals 310 and a plurality of the secondary first terminals 320B. The primary first terminal 310 is adjacent to the secondary first terminal 320B in the pitch direction. More specifically, in each of the first terminal rows 250B, the primary first terminals 310 and the secondary first terminals 320B are alternately arranged in the pitch direction. In the present embodiment, the number of the primary first terminals 310 and the number of the secondary first terminals 320B are equal to each other. However, the present invention is not limited thereto, but each of the first terminal rows 250B should include at least one of the primary first terminal 310 and at least one of the secondary first terminal 320B. At any rate, the first terminals 300B should include at least one of the primary first terminal 310 and at least one of the secondary first terminal 320B. If the number of the terminal row 250B is one, the terminal row 250B should be configured as follows: at least ones of the first terminals 300B are arranged in the pitch direction perpendicular to both the up-down direction and the width direction so that the at least ones of the first terminals 300B form the single terminal row 250B; and the single terminal row 250B includes the primary first terminal 310 and the secondary first terminal 320B. The primary first terminal 310 of the present modification has a structure same as that of the primary first terminal 310 of the first embodiment. Accordingly, a detailed explanation thereabout is omitted.

Figure 43:
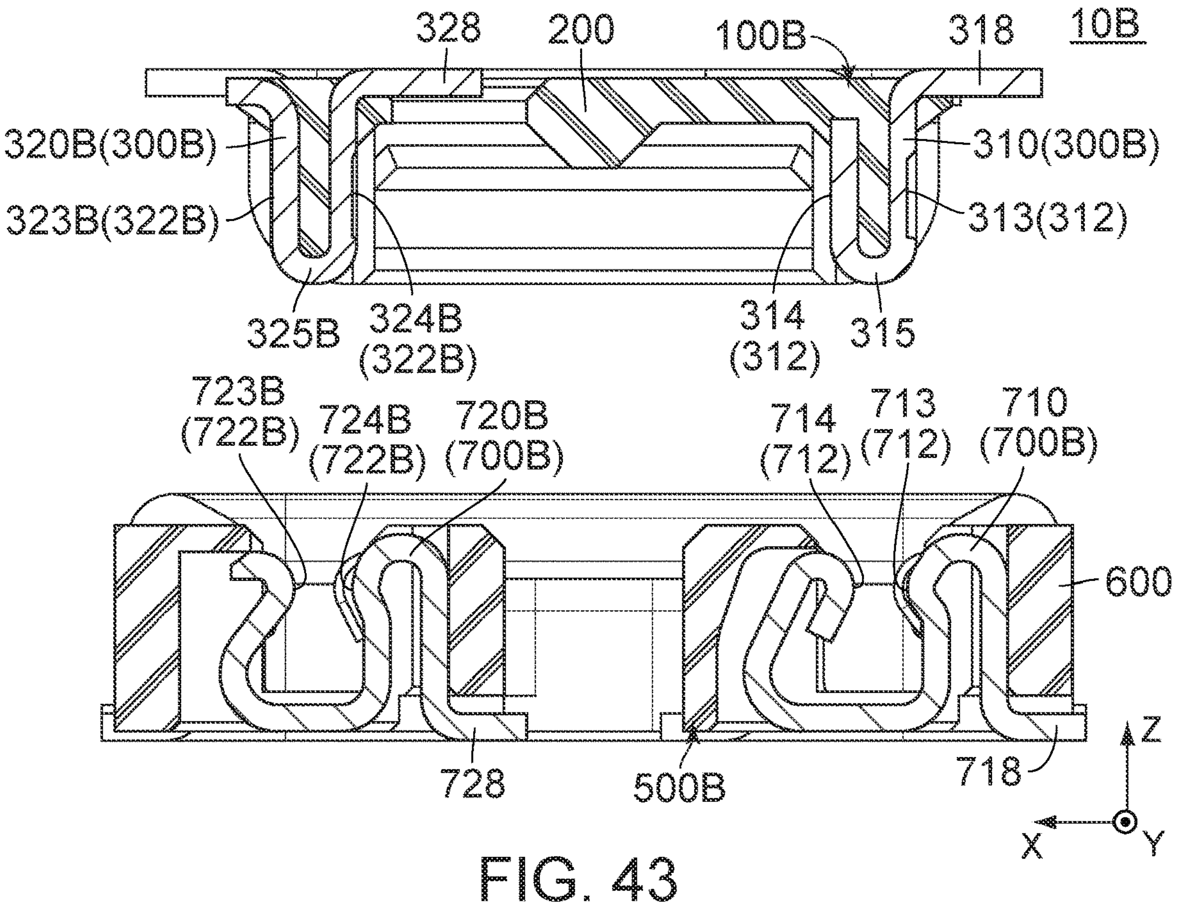
FIG. 43 is a cross-sectional view showing the assembly of FIG. 41, taken along line N-N.
Figure 44:
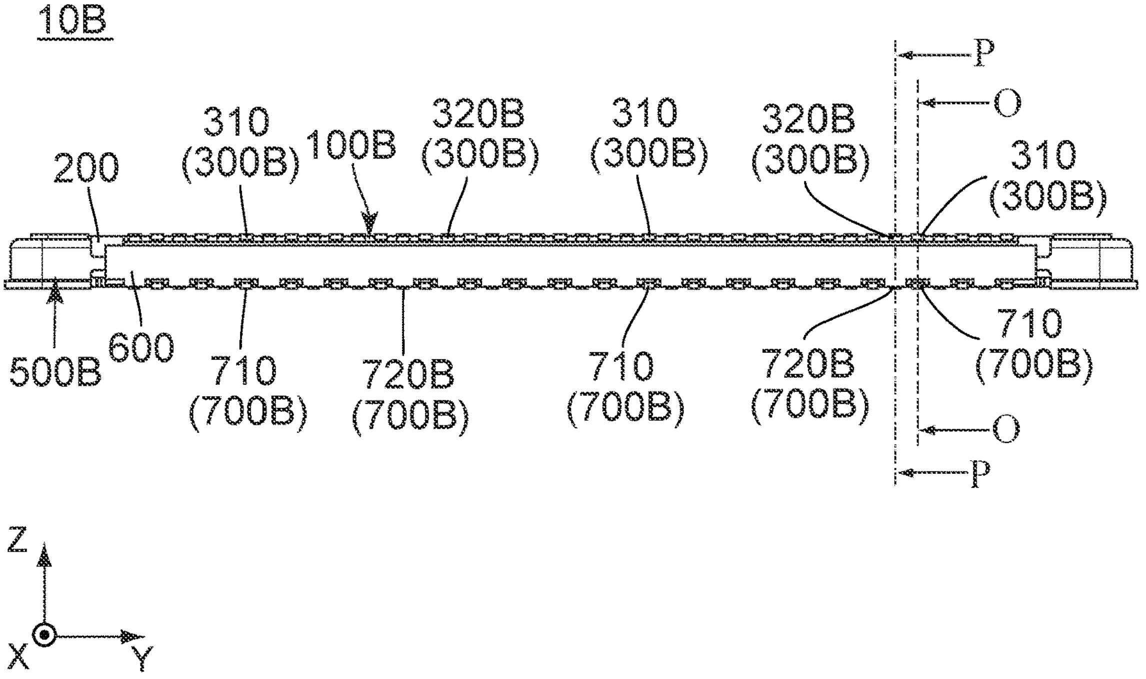
FIG. 44 is a side view showing the assembly of FIG. 40. In the figure, the first connector and the second connector are mated with each other.
Figure 45:
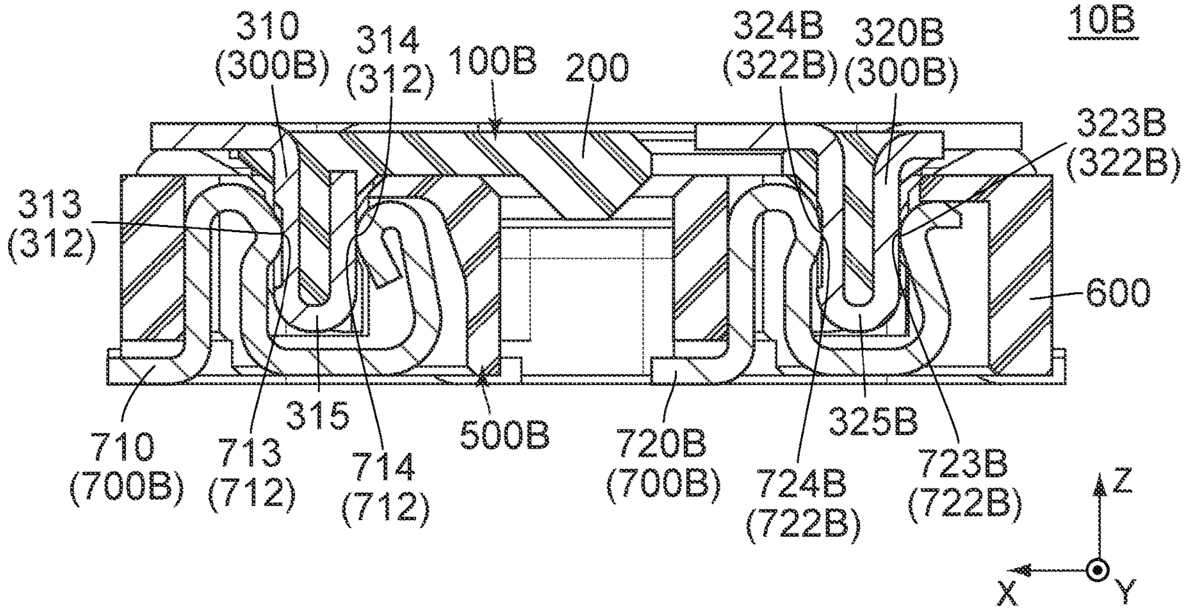
FIG. 45 is a cross-sectional view showing the assembly of FIG. 44, taken along line O-O.

Referring to FIGS. 40, 42 and 43, the secondary first terminals 320B of the two first terminal rows 250B are arranged in two-fold rotational symmetry in the plane perpendicular to the up-down direction. The secondary first terminals 320B of the two first terminal rows 250B are arranged in a staggered configuration.

Figure 48:
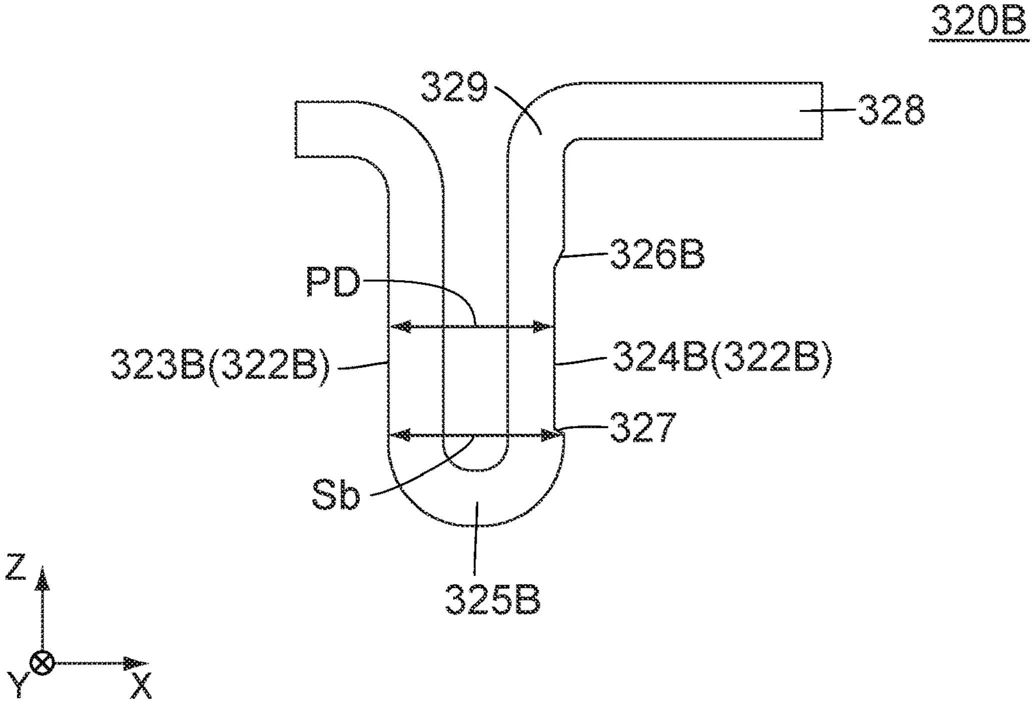
FIG. 48 is a side view showing the secondary first terminal of FIG. 47.
Figure 49:
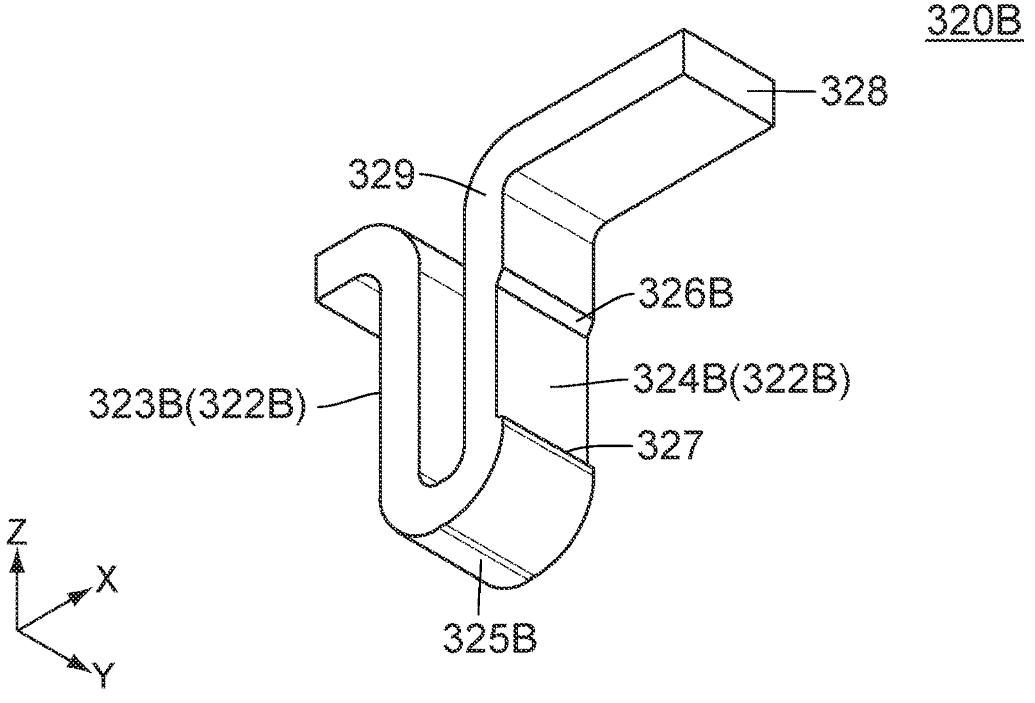
FIG. 49 is another perspective view showing the secondary first terminal of FIG. 47.

As shown in FIG. 48, each of the secondary first terminals 320B has two pressed contact points 322B, an insertion end portion 325B, an inclined portion 326B, a lock portion 327, a fixed portion 328 and a coupling portion 329. Specifically, dissimilar to the secondary first terminal 320 of the aforementioned embodiment, the secondary first terminal 320B of the present modification has the lock portion 327. The insertion end portion 325B, the fixed portion 328 and the coupling portion 329 of the present modification have structures same as those of the insertion end portion 325, the fixed portion 328 and the coupling portion 329 of the first embodiment. Accordingly, a detailed explanation thereabout is omitted.

As shown in FIG. 48, each of the pressed contact points 322B is positioned apart from the insertion end portion 325B in the up-down direction. Each of the pressed contact points 322B is positioned above the insertion end portion 325B in the up-down direction. The pressed contact points 322B are positioned apart from each other in the width direction perpendicular to the up-down direction. The pressed contact points 322B face in orientations different from each other in the width direction.

As shown in FIG. 48, the pressed contact points 322B consist of an outer pressed contact point 323B and an inner pressed contact point 324B. The outer pressed contact point 323B and the inner pressed contact point 324B of the present modification have structures same as those of the outer pressed contact point 323 and the inner pressed contact point 324 of the first embodiment. Accordingly, a detailed explanation thereabout is omitted.

As shown in FIG. 48, the inclined portion 326B of the present modification extends upward in the up-down direction and inward in the width direction from the inner pressed contact point 324B. The inclined portion 326B is oblique to both the up-down direction and the width direction. The inclined portion 326B is positioned between the inner pressed contact point 324B and the coupling portion 329 in the up-down direction. The inclined portion 326B is positioned above the inner pressed contact point 324B in the up-down direction. The inclined portion 326B is positioned below the coupling portion 329 in the up-down direction. In the width direction, a size of the inclined portion 326B of the present modification is smaller than a size of the inclined portion 326 of the first embodiment. In the up-down direction, a size of the inclined portion 326B of the present modification is smaller than a size of the inclined portion 326 of the first embodiment.

As shown in FIG. 48, the lock portion 327 of the present modification is positioned between the insertion end portion 325B and any of the pressed contact points 322B in the up-down direction. The lock portion 327 is positioned below any of the pressed contact points 322B in the up-down direction. Specifically, the lock portion 327 is positioned below the inner pressed contact point 324B in the up-down direction. The lock portion 327 is positioned above the insertion end portion 325B in the up-down direction. The lock portion 327 is positioned below the fixed portion 328 in the up-down direction. The lock portion 327 is positioned inward of any of the pressed contact points 322B in the width direction. The lock portion 327 extends inward in the width direction from the inner pressed contact point 324B.

As shown in FIG. 48, the secondary first terminal 320B has a secondary pressed size Sb which is a largest size of the secondary first terminal 320B in the width direction in an area of the secondary first terminal 320B from the insertion end portion 325B to the pressed contact point 322B. The secondary pressed size Sb of the present modification is unequal to a distance PD between the outer pressed contact point 323B and the inner pressed contact point 324B in the width direction. Specifically, the pressed contact points 322B of the secondary first terminal 320B are positioned apart from each other in the width direction by a predetermined distance PD, and the secondary pressed size Sb and the predetermined distance PD meet a condition of $Sb \neq PD$. More specifically, the secondary pressed size Sb of the present modification is larger than the distance PD between the outer pressed contact point 323B and the inner pressed contact point 324B in the width direction. In other words, the secondary pressed size Sb and the predetermined distance PD meet a condition of $Sb > PD$.

Referring to FIG. 42, in the present modification, the secondary pressed size Sb is equal to the primary pressed size Sa. In other words, the primary pressed size Sa and the secondary pressed size Sb meet a condition of $Sa = Sb$.

Referring to FIG. 40, the second connector 500B of the present modification comprises a plurality of second terminals 700B and a second holding member 600. Each of the second terminals 700B is made of metal. The second holding member 600 of the present modification have a structure same as that of the second holding member 600 of the first embodiment. Accordingly, a detailed explanation thereabout is omitted.

As shown in FIG. 40, the second connector 500B has two second terminal rows 650B which are positioned apart from each other in the width direction. In other words, the two second terminal rows 650B are positioned apart from each other in the front-rear direction. Although the number of the second terminal rows 650B is two, the present invention is not limited thereto. Specifically, the number of the second terminal row 650B may be one.

As shown in FIG. 40, each of the second terminal rows 650B consists of the second terminals 700B which are arranged in the pitch direction perpendicular to both the up-down direction and the width direction.

As shown in FIG. 42, the second terminals 700B of the present modification are held by the second holding member 600. Referring to FIGS. 42 and 43, the second terminals 700B correspond to the first terminals 300B, respectively. As shown in FIG. 40, the second terminals 700B consist of a plurality of primary second terminals 710 and a plurality of secondary second terminals 720B. In other words, each of the second terminal rows 650B includes a plurality of the primary second terminals 710 and a plurality of the secondary second terminals 720B. The primary second terminal 710 is adjacent to the secondary second terminal 720B in the pitch direction. More specifically, in each of the second terminal rows 650B, the primary second terminals 710 and the secondary second terminals 720B are alternately arranged in the pitch direction. In the present modification, the number of the primary second terminals 710 and the number of the secondary second terminals 720B are equal to each other. However, the present invention is not limited thereto, but each of the second terminal rows 650B should include the primary second terminal 710 and the secondary second terminal 720B. At any rate, the second terminals 700B should include the primary second terminal 710 and at least one of the secondary second terminal 720B. If the number of the second terminal row 650B is one, the second terminal row 650B should be configured as follows: at least ones of the second terminals 700B are arranged in the pitch direction perpendicular to both the up-down direction and the width direction so that the at least ones of the second terminals 700B form the single second terminal row 650B; and the single second terminal row 650B includes the primary second terminal 710 and the secondary second terminal 720B. The primary second terminal 710 of the present modification have a structure same as that of the primary second terminal 710 of the first embodiment. Accordingly, a detailed explanation thereabout is omitted.

Referring to FIGS. 40, 42 and 43, the secondary second terminals 720B of the two second terminal rows 650B are arranged in two-fold rotational symmetry in the plane perpendicular to the up-down direction. The secondary second terminals 720B of the two second terminal rows 650B are arranged in a staggered configuration. An operation of fixing the secondary second terminal 720B to the second holding member 600 can be achieved in a manner similar to that of the aforementioned first embodiment. The secondary second terminals 720B correspond to the secondary first terminals 320B, respectively.

Figure 50:
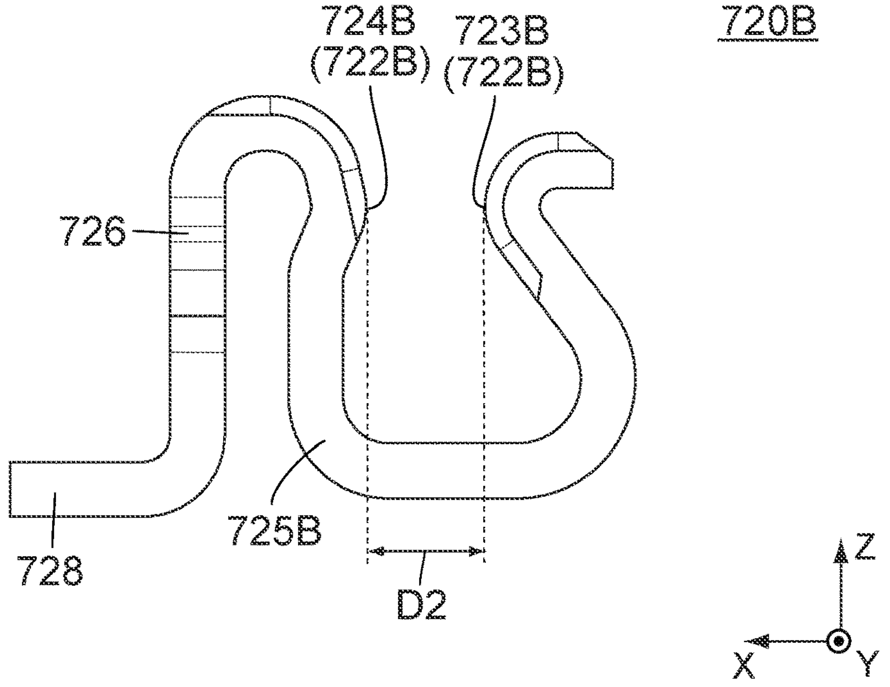
FIG. 50 is a side view showing a secondary second terminal which is included in the second connector of the assembly of FIG. 40.

As shown in FIG. 50, each of the secondary second terminals 720B of the present modification has two pressing contact points 722B, a supporting portion 725B, a held portion 726 and a fixed portion 728. The held portion 726 and the fixed portion 728 of the present modification have structures same as those of the held portion 726 and the fixed portion 728 of the first embodiment. Accordingly, a detailed explanation thereabout is omitted.

Figure 46:
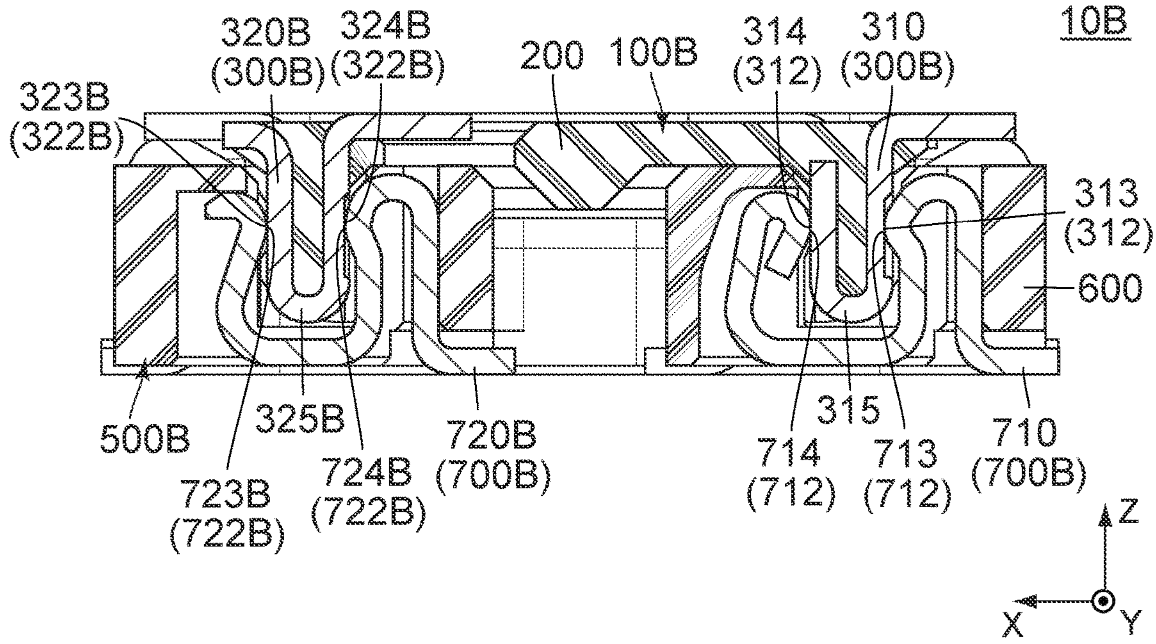
FIG. 46 is a cross-sectional view showing the assembly of FIG. 44, taken along line P-P.
Figure 47:
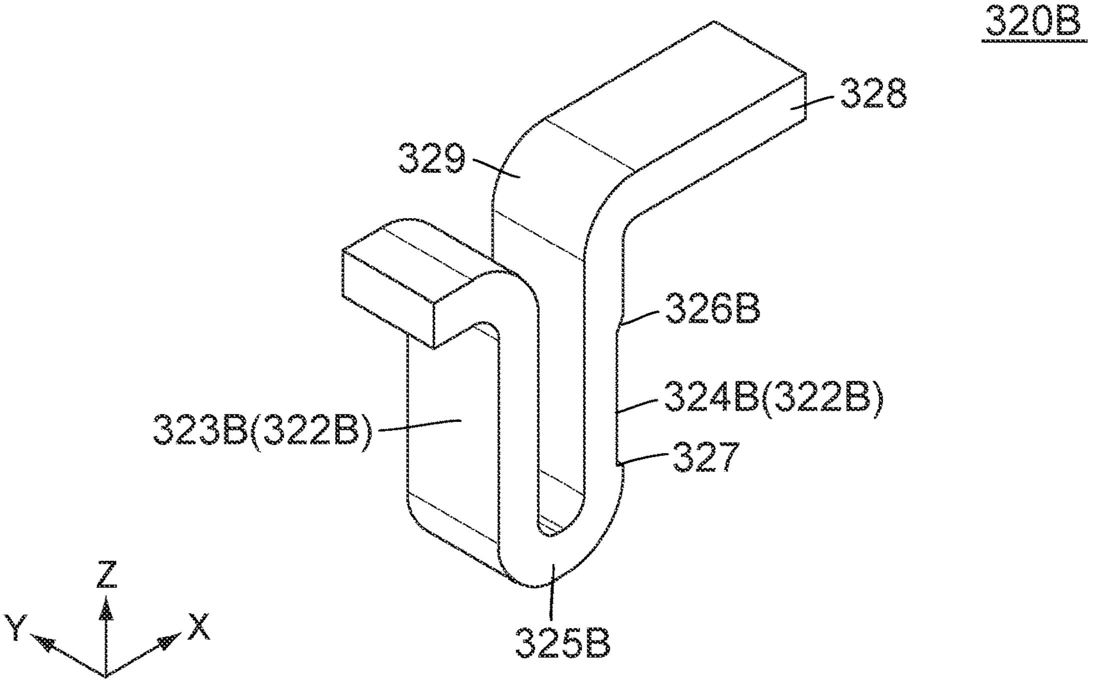
FIG. 47 is a perspective view showing a secondary first terminal which in included in the first connector of the assembly of FIG. 40.

As shown in FIG. 42, under an unmated state before the second connector 500B is mated with the first connector 1008, the pressing contact points 722B are spaced apart from each other in the width direction and face each other in the width direction. The pressing contact points 722B of the secondary second terminal 720B are spaced apart from each other in the width direction by a secondary pressing distance D2 under the unmated state. As shown in FIG. 46, the pressing contact points 722B of each of the secondary second terminals 720B press the pressed contact points 322B, respectively, of the corresponding secondary first terminal 320B in the width direction under a mated state where the first connector 1008 and the second connector 500B are mated with each other.

As shown in FIG. 50, the pressing contact points 722B consist of an outer pressing contact point 723B and an inner pressing contact point 724B. The outer pressing contact point 723B and the inner pressing contact point 724B of the present modification have structures same as those of the outer pressing contact point 723 and the inner pressing contact point 724 of the first embodiment. Accordingly, a detailed explanation thereabout is omitted.

Referring to FIG. 42, the secondary pressing distance D2 is unequal to the primary pressing distance D1. In other words, the primary pressing distance D1 and the secondary pressing distance D2 meet a condition of $D1 \neq D2$. More specifically, in the present modification, the secondary pressing distance D2 is greater than the primary pressing distance D1. In other words, the primary pressing distance D1 and the secondary pressing distance D2 meet a condition of $D2 > D1$.

As shown in FIG. 50, the supporting portion 725B of the present modification resiliently supports the two pressing contact points 722B. The supporting portion 725B extends from an upper end of the held portion 726.

Referring to FIG. 42, a first size S1 is unequal to a second size S2, where the first size S1 is a difference of the primary pressed size Sa minus the primary pressing distance D1, and the second size S2 is a difference of the secondary pressed size Sb minus the secondary pressing distance D2. In other words, the first size S1 and the second size S2 meet a condition of $S1 \neq S2$, where $S1 = Sa - D1$, and $S2 = Sb - D2$.

As described above, the assembly 10B of the present modification is configured as follows: the pressing contact points 712, 722B of each of the second terminals 700B press the pressed contact points 312, 322B, respectively, of the corresponding first terminal 300B in the width direction under the mated state where the first connector 100B and the second connector 500B are mated with each other; and the first size S1 and the second size S2 meet the condition of $S1 \neq S2$. Accordingly, upon the mating of the first connector 100B with the second connector 500B, the assembly 10B of the present modification requires a reduced insertion force while the first terminal 300B and the corresponding second terminal 700B are brought into contact with each other by two points so that a reliable connection of the first terminal 300B and the corresponding second terminal 700B is ensured.

Especially, in the present modification, the second size S2 is smaller than the first size S1. In other words, the first size S1 and the second size S2 meet a condition of $S2 < S1$. Accordingly, the assembly 10B of the present embodiment is configured so that, upon the mating of the first connector 100B with the second connector 500B, a force, which the secondary first terminal 320B receives from the secondary second terminal 720B, is smaller than a force which the primary first terminal 310 receives from the primary second terminal 710. Specifically, the assembly 10B of the present modification reliably reduces a required insertion force upon the mating of the first connector 100B with the second connector 500B.

Figure 51:
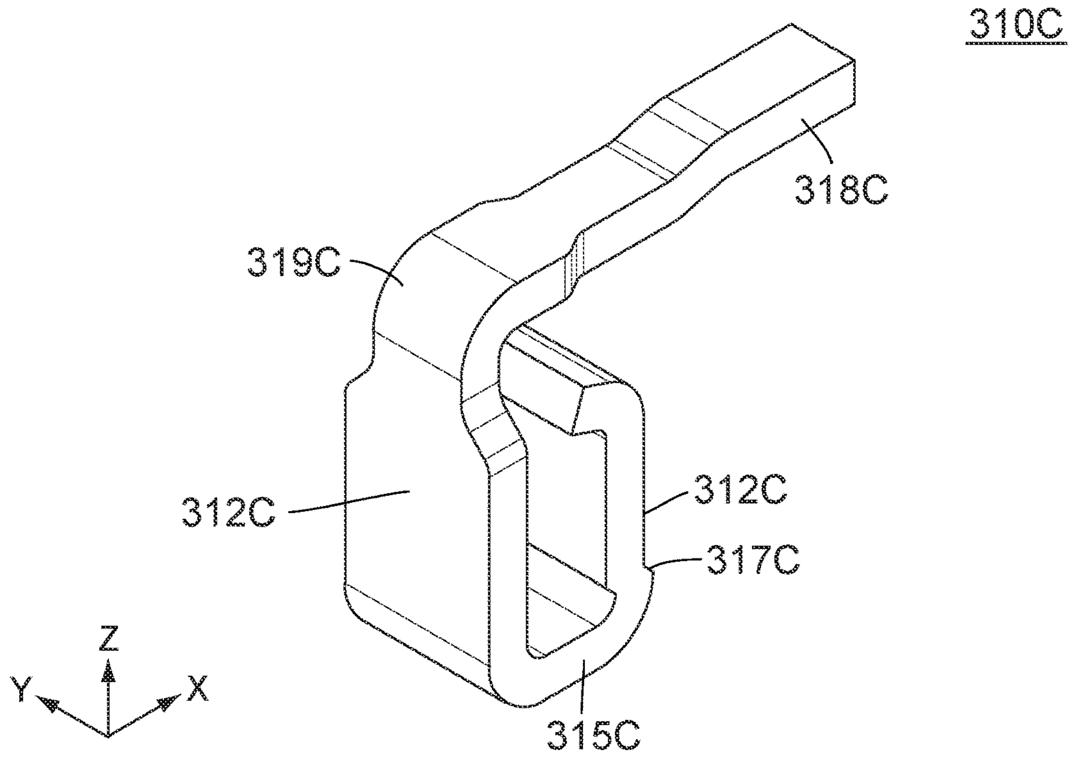
FIG. 51 is a perspective view showing a modification of the primary first terminal of FIG. 11.
Figure 52:
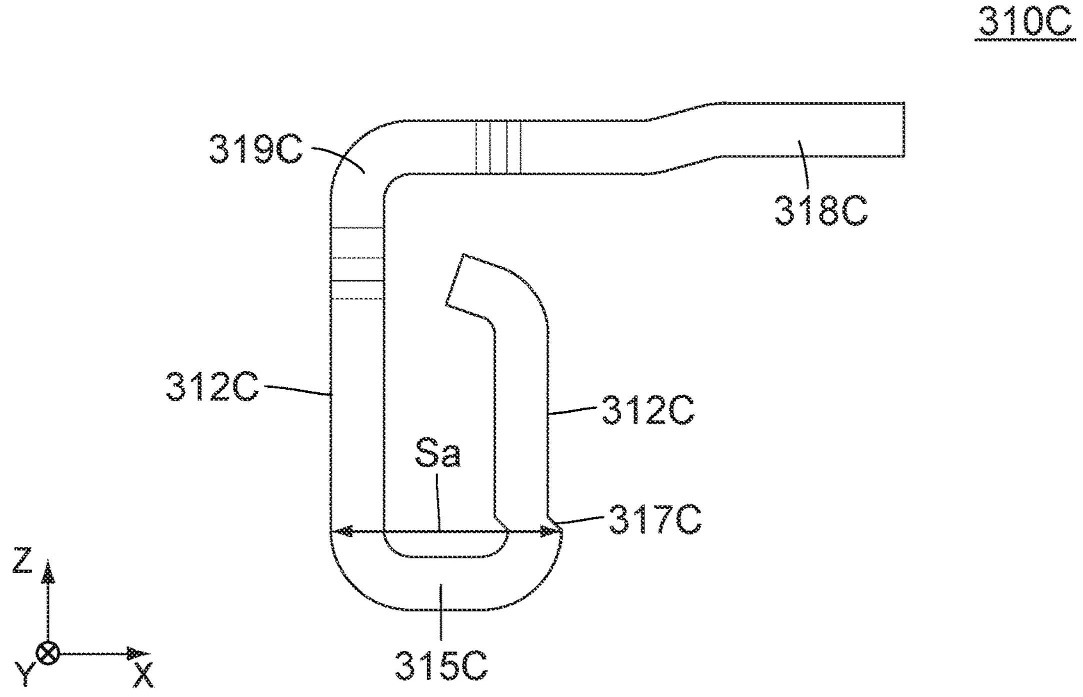
FIG. 52 is a side view showing the primary first terminal of FIG. 51.
Figure 53:
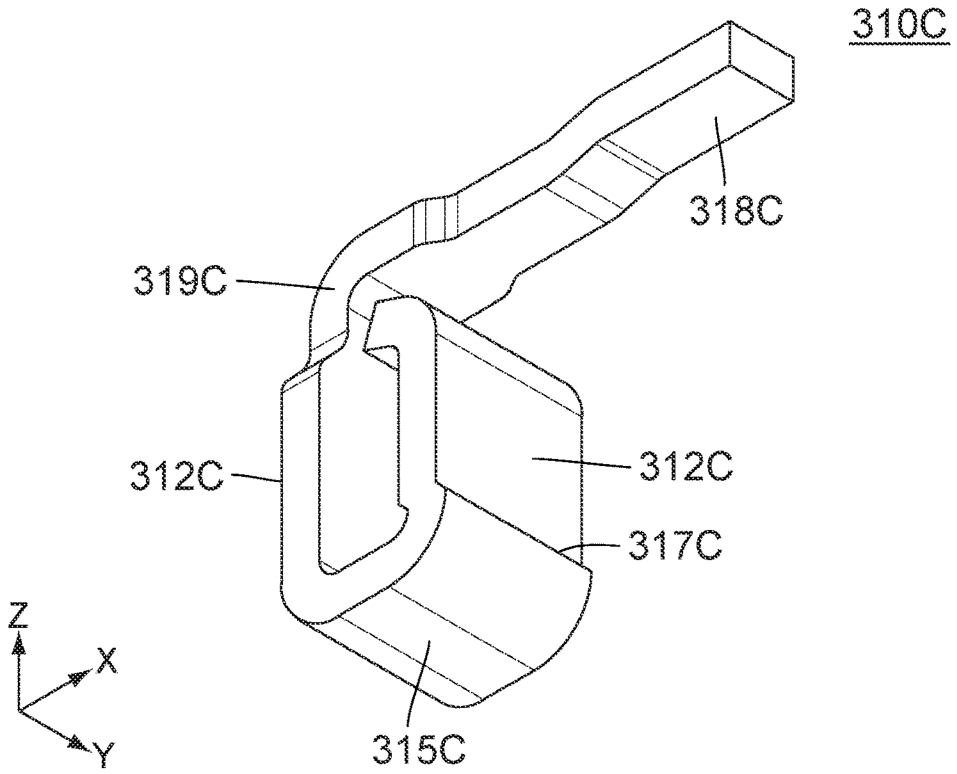
FIG. 53 is another perspective view showing the primary first terminal of FIG. 51.
Figure 66:
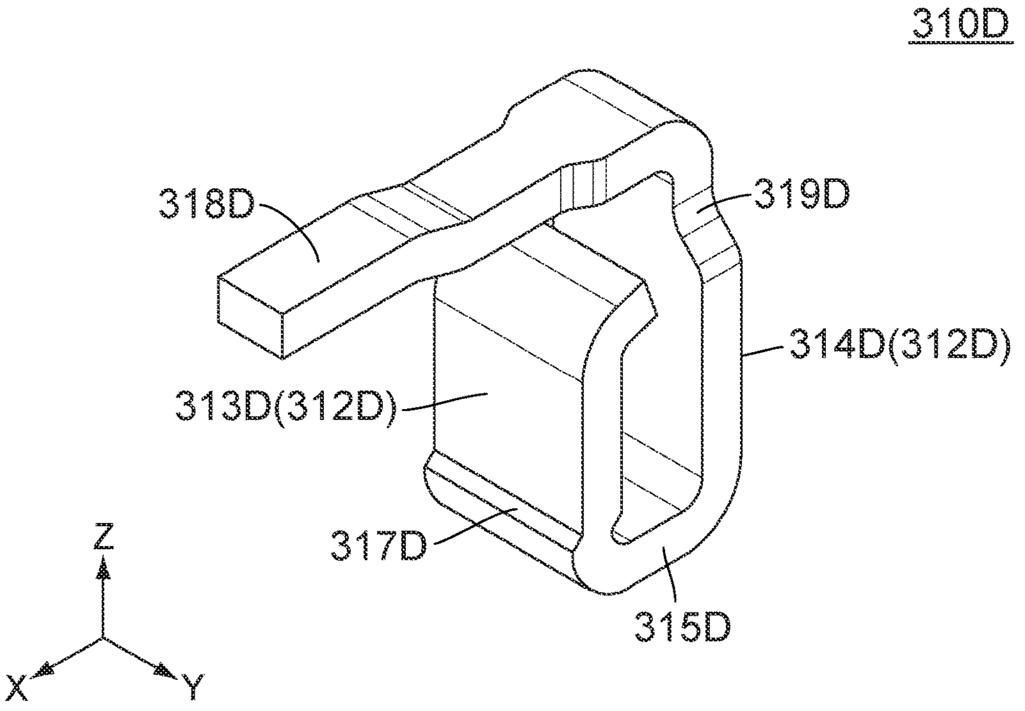
FIG. 66 is a perspective view showing a primary first terminal which is included in the first connector of FIG. 64.

Although the first connector 100, 100A, 100B of the present embodiment and modifications comprises the primary first terminals 310, the present invention is not limited thereto. The first connector 100, 100A, 100B may comprise, instead of the primary first terminals 310, primary first terminals 310C shown in each of FIGS. 51 to 53, provided that a first size S1 is unequal to the second size S2, where S1=Sa−D1, and S2=Sb−D2. The primary first terminal 310C has two pressed contact points 312C, an insertion end portion 315C, a lock portion 317C, a fixed portion 318C and a coupling portion 319C. Specifically, the primary first terminal 310C has a structure same as that of a primary first terminal 310D shown in FIG. 66. An explanation will be made later about the primary first terminal 310D.

Figure 54:
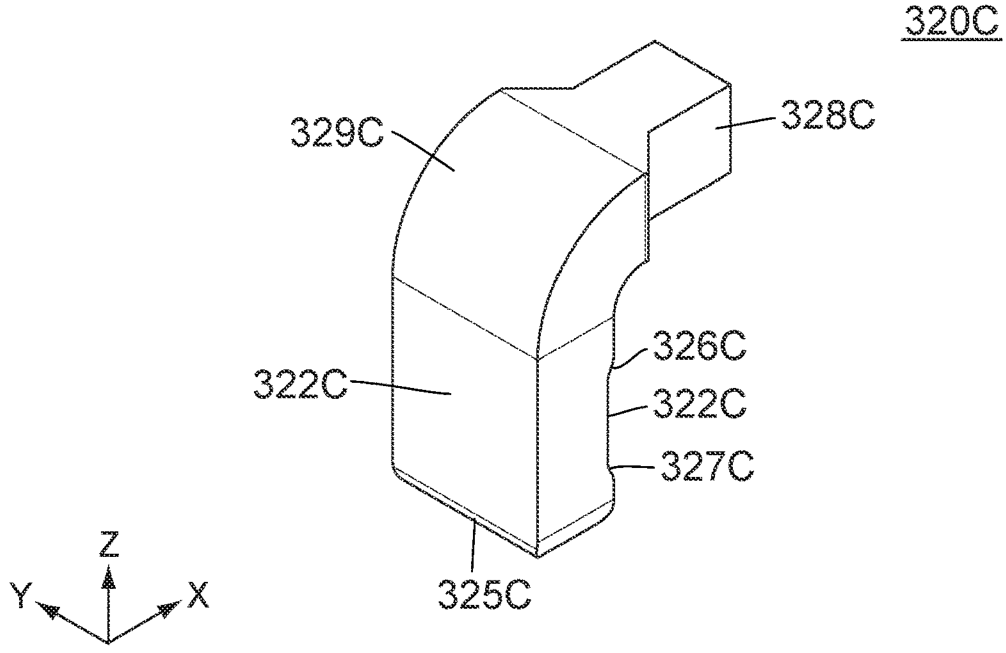
FIG. 54 is a perspective view showing a modification of the secondary first terminal of FIG. 14.
Figure 55:
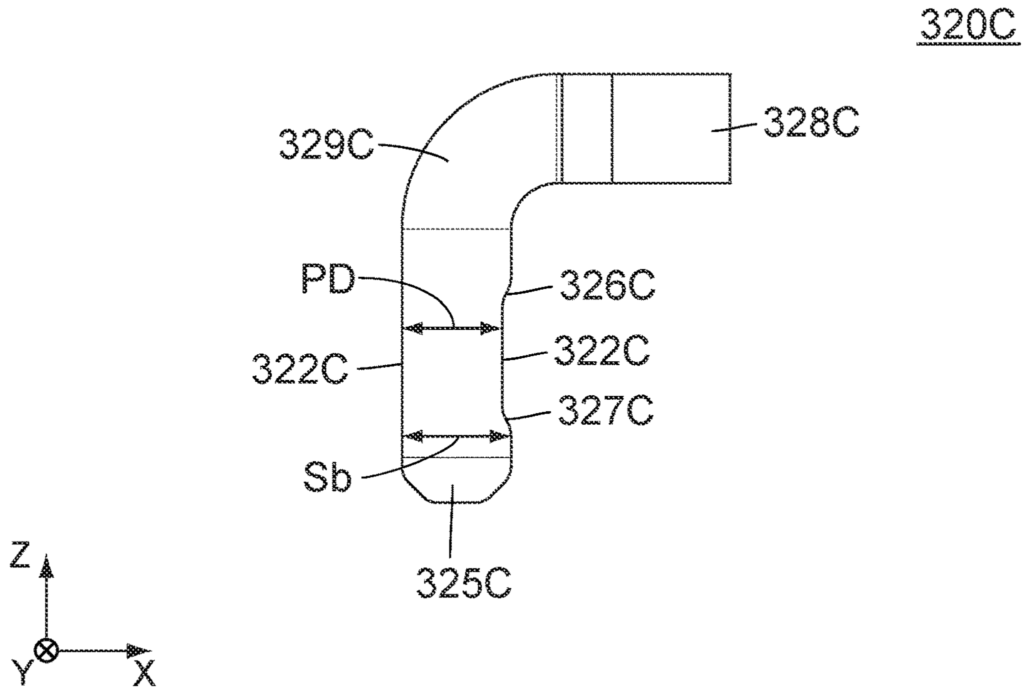
FIG. 55 is a side view showing the secondary first terminal of FIG. 54.
Figure 56:
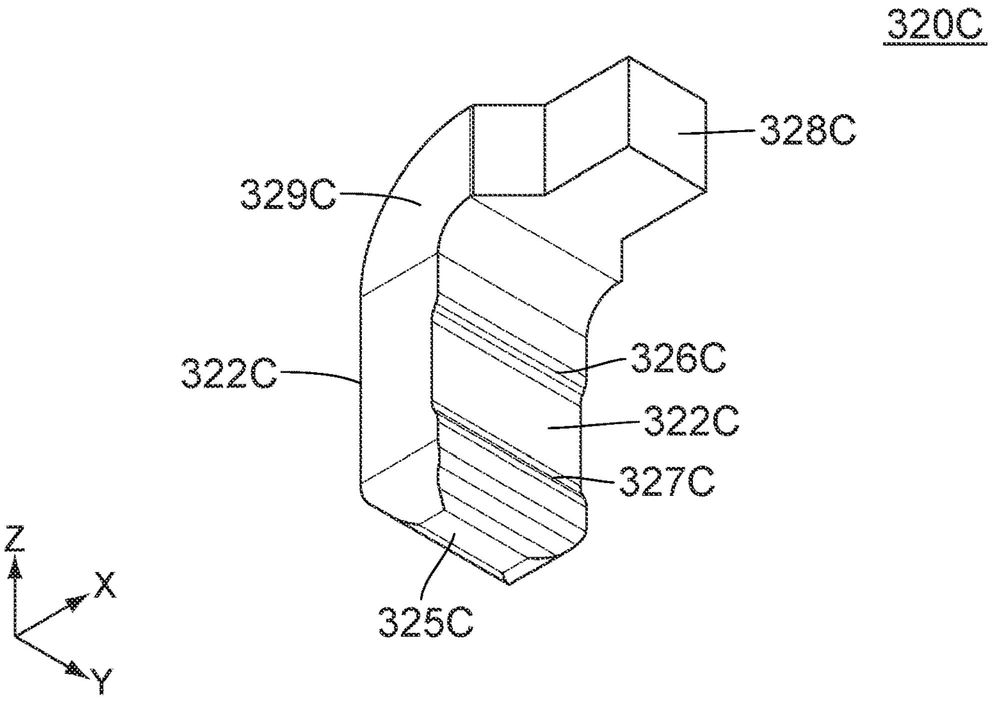
FIG. 56 is another perspective view showing the secondary first terminal of FIG. 54.

Although the first connector 100, 100A, 100B of the present embodiment and modifications comprises the secondary first terminals 320, 320A, 320B, the present invention is not limited thereto. The first connector 100, 100A, 100B may comprise, instead of the secondary first terminals 320, 320A, 320B, secondary first terminals 320C shown in each of FIGS. 54 to 56, provided that the first size S1 is unequal to a second size S2, where S1=Sa−D1, and S2=Sb−D2. Specifically, the secondary first terminal 320C has an upside-down J-shape when viewed in the pitch direction. More specifically, the secondary first terminal 320C has two pressed contact points 322C, an insertion end portion 325C, an inclined portion 326C, a lock portion 327C, a fixed portion 328C and a coupling portion 329C.

Second Embodiment

Figure 57:
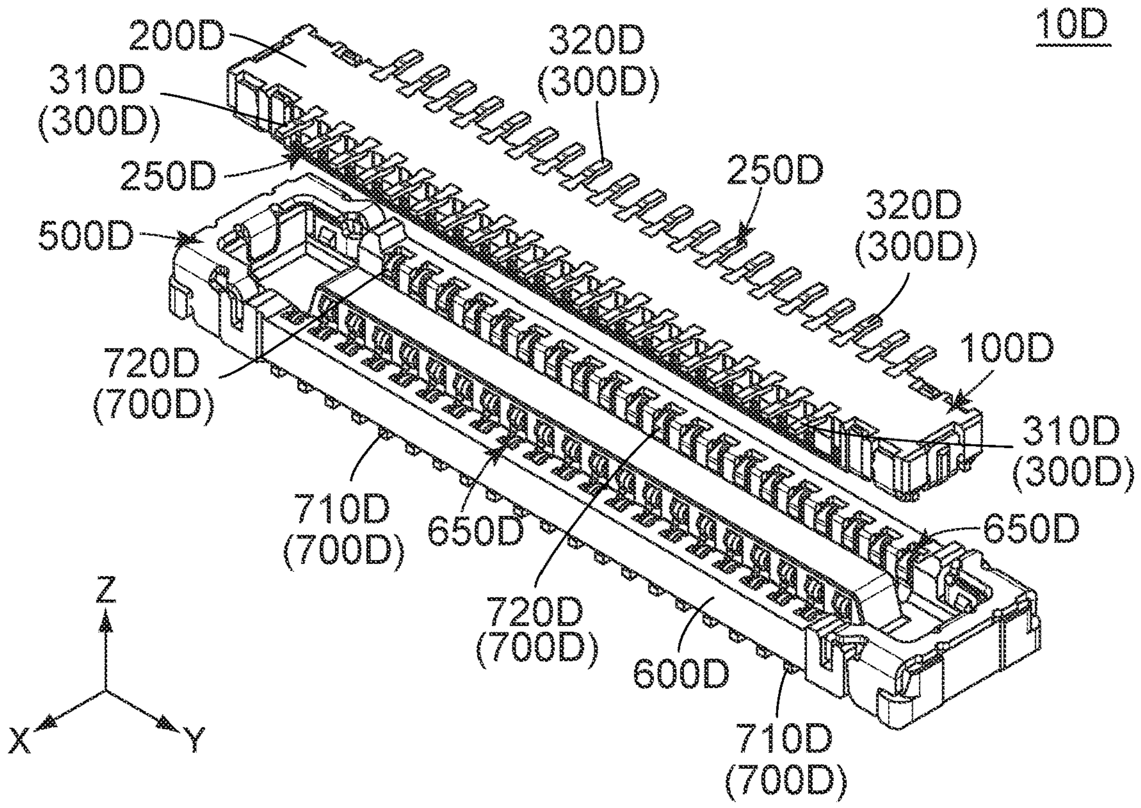
FIG. 57 is a perspective view showing an assembly according to a second embodiment of the present invention. In the figure, a first connector and a second connector are not mated with each other.
Figure 58:
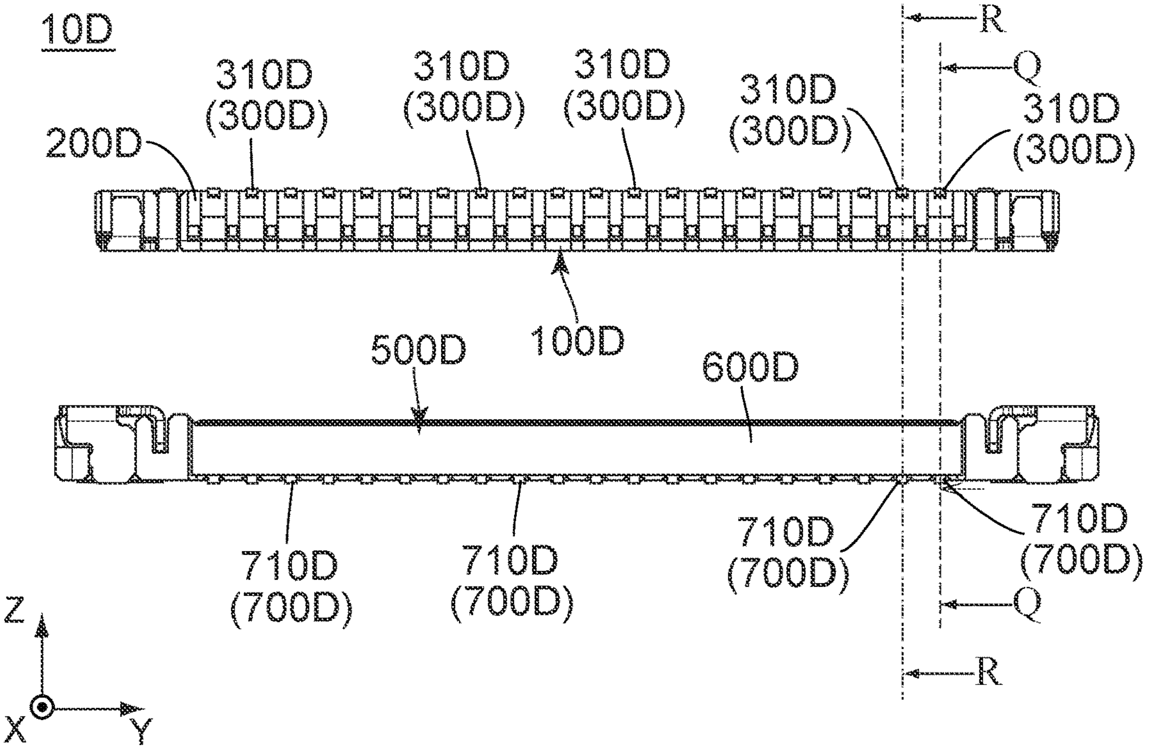
FIG. 58 is a side view showing the assembly of FIG. 57.

As shown in FIG. 57, an assembly 10D according to a second embodiment of the present invention comprises a first connector 100D and a second connector 500D.

Figure 59:
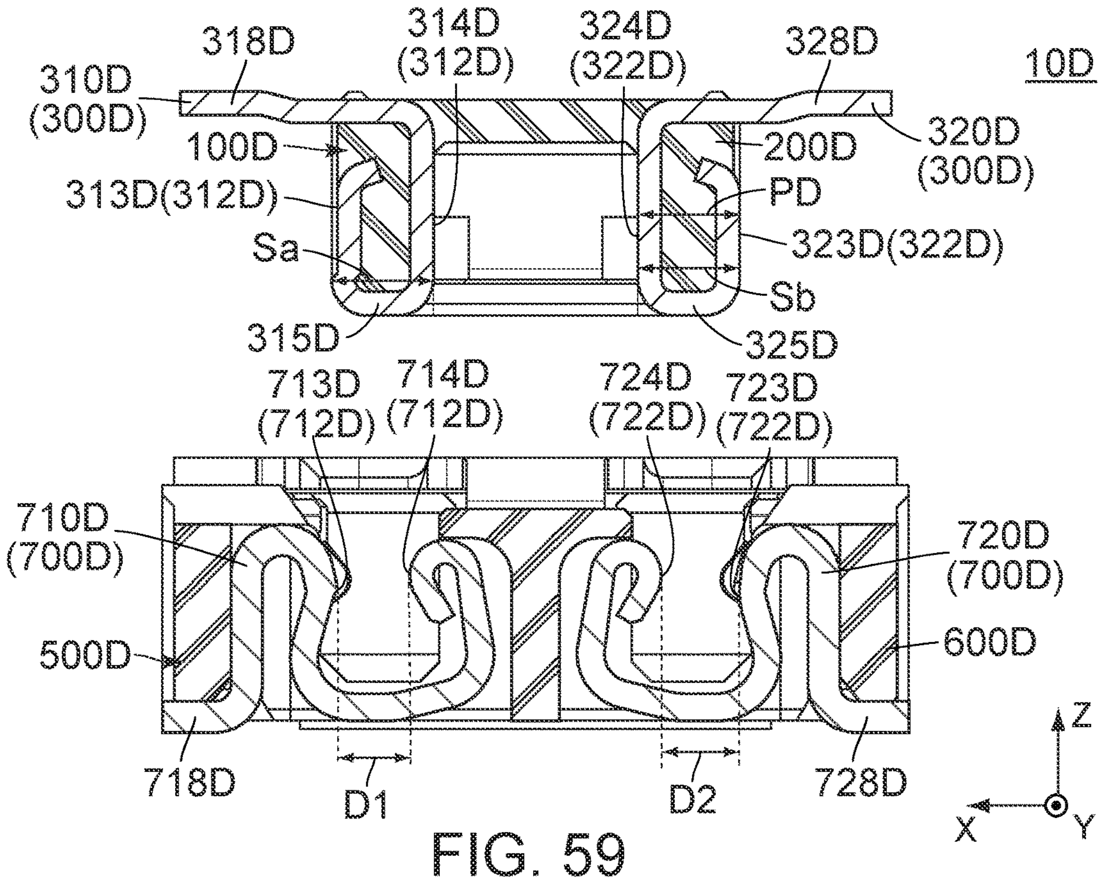
FIG. 59 is a cross-sectional view showing the assembly of FIG. 58, taken along line Q-Q.
Figure 62:
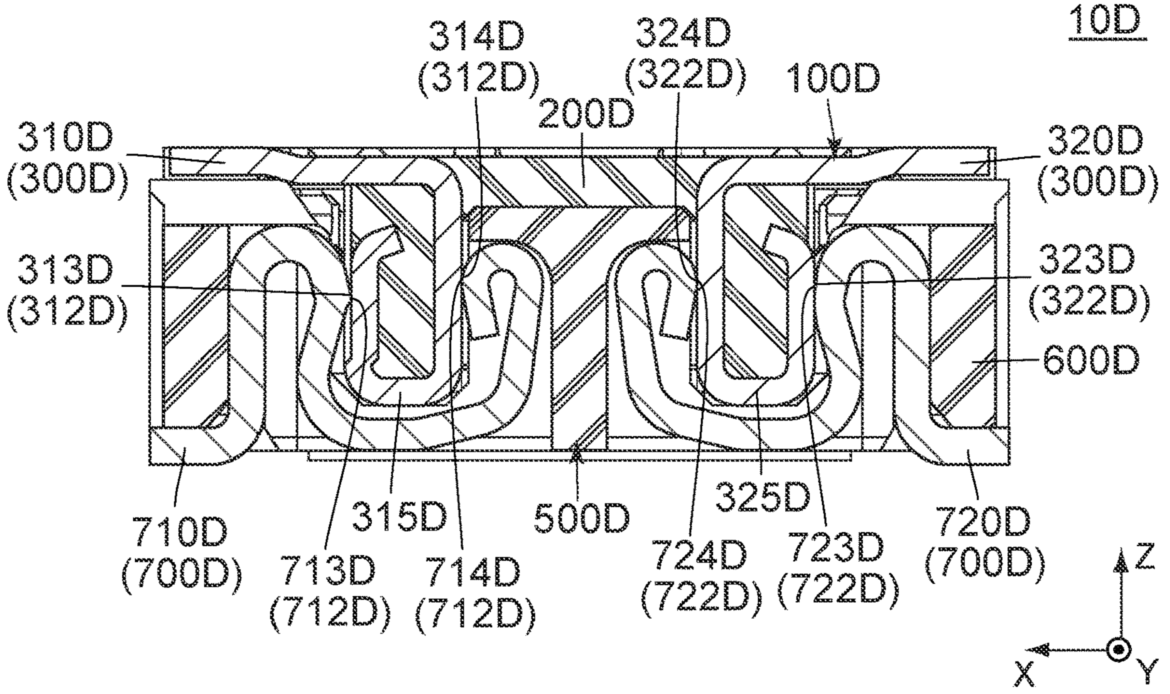
FIG. 62 is a cross-sectional view showing the assembly of FIG. 61, taken along line S-S.
Figure 63:
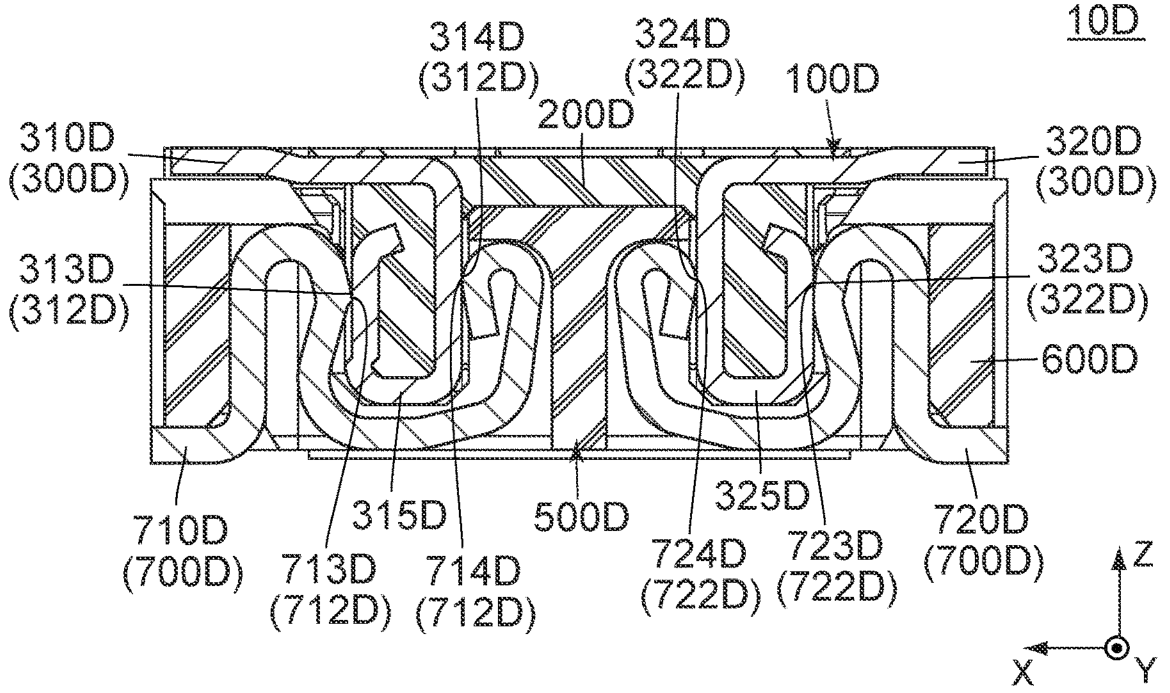
FIG. 63 is a cross-sectional view showing the assembly of FIG. 61, taken along line T-T.

As understood from FIGS. 59 and 62, the first connector 100D of the present embodiment is mateable with the second connector 500D in the up-down direction. As for directions and orientations in the present embodiment, expressions same as those of the first embodiment will be used hereinbelow. The first connector 100D is mountable on a circuit board (not shown).

Figure 64:
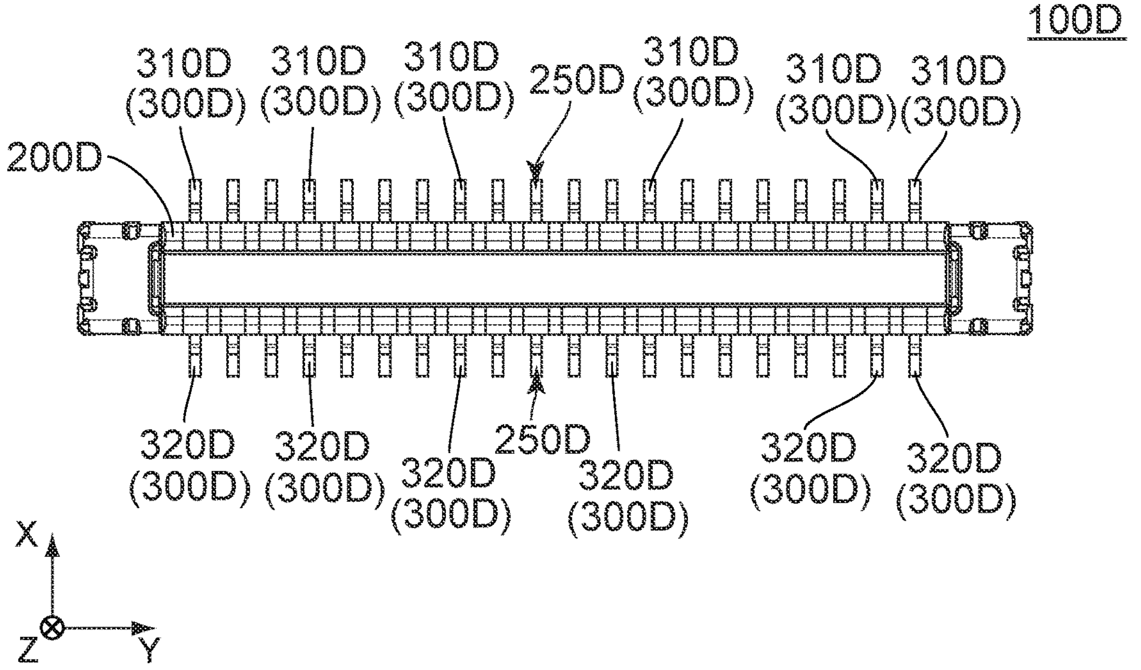
FIG. 64 is a bottom view showing the first connector which is included in the assembly of FIG. 57.

As shown in FIG. 64, the first connector 100D comprises a plurality of first terminals 300D and a first holding member 200D. Each of the first terminals 300D is made of metal. The first holding member 200D is made of insulator.

As shown in FIG. 64, the first connector 100D has two first terminal rows 250D which are positioned apart from each other in the width direction. In other words, the two first terminal rows 250D are positioned apart from each other in the front-rear direction.

As shown in FIG. 64, each of the first terminal rows 250D consists of the first terminals 300D which are arranged in the pitch direction perpendicular to both the up-down direction and the width direction.

As shown in FIG. 64, the first terminals 300D of the present embodiment are held by the first holding member 200D. The first terminals 300D consist of a plurality of primary first terminals 310D and a plurality of secondary first terminals 320D. In the present embodiment, the number of the primary first terminals 310D and the number of the secondary first terminals 320D are equal to each other. The primary first terminal 310D and the secondary first terminal 320D are positioned apart from each other in the width direction. One of the terminal rows 250D consists of only the primary first terminals 310D, and a remaining one of the terminal rows 250D consists of only the secondary first terminals 320D. More specifically, the terminal row 250D, which is positioned at a front side of the first connector 100D, consists of only the primary first terminals 310D, and the terminal row 250D, which is positioned at a rear side of the first connector 100D, consists of only the secondary first terminals 320D. However, the present invention is not limited thereto. Specifically, the number of the primary first terminal 310D may be one, and the number of the secondary first terminal 320D may be one.

Figure 67:
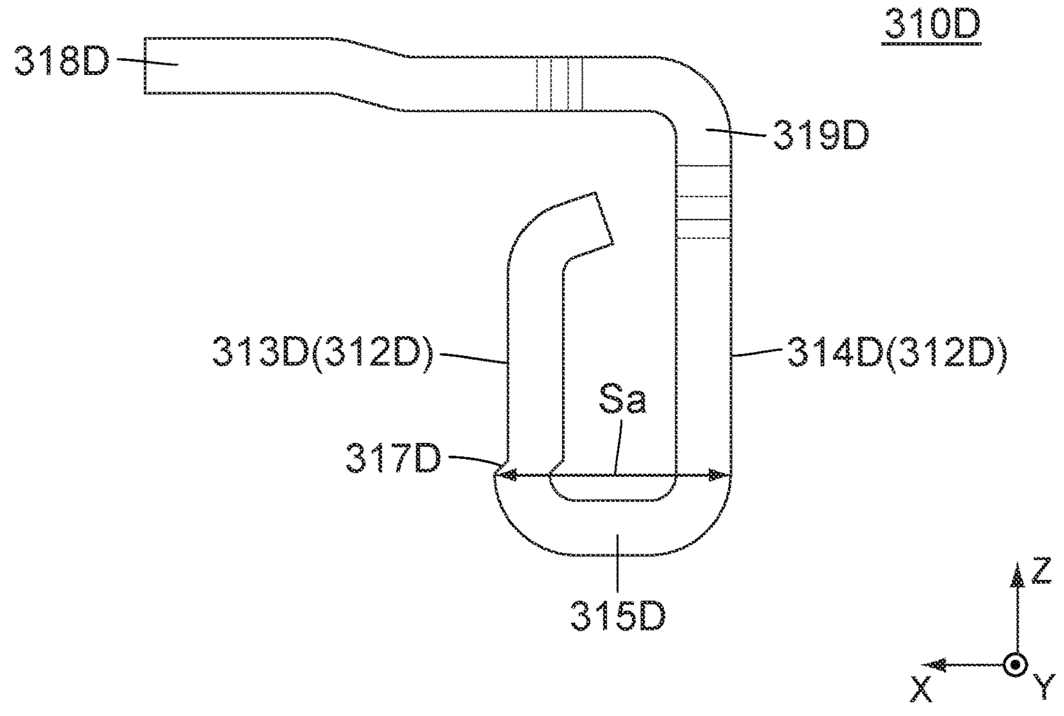
FIG. 67 is a side view showing the primary first terminal of FIG. 66.
Figure 68:
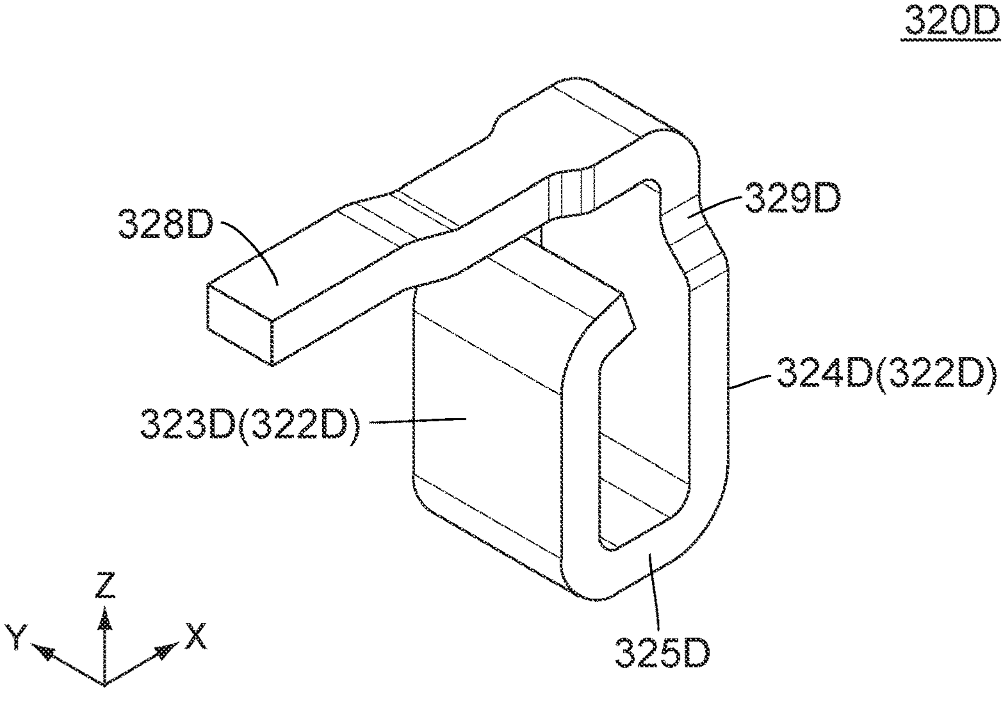
FIG. 68 is a perspective view showing a secondary first terminal which is included in the first connector of FIG. 64.

As shown in FIG. 67, each of the primary first terminals 310D of the present embodiment has two pressed contact points 312D, an insertion end portion 315D, a lock portion 317D, a fixed portion 318D and a coupling portion 319D.

As shown in FIG. 67, each of the pressed contact points 312D is positioned apart from the insertion end portion 315D in the up-down direction. Each of the pressed contact points 312D is positioned above the insertion end portion 315D in the up-down direction. The pressed contact points 312D are positioned apart from each other in the width direction perpendicular to the up-down direction. The pressed contact points 312D face in orientations different from each other in the width direction.

As shown in FIG. 67, the pressed contact points 312D consist of an outer pressed contact point 313D and an inner pressed contact point 314D.

As shown in FIG. 59, the outer pressed contact point 313D of the present embodiment faces outward in the width direction. The outer pressed contact point 313D is positioned outward of the inner pressed contact point 314D in the width direction. More specifically, the outer pressed contact point 313D faces forward in the front-rear direction. The outer pressed contact point 313D is positioned forward of the inner pressed contact point 314D in the front-rear direction.

As shown in FIG. 59, the inner pressed contact point 314D of the present embodiment faces inward in the width direction. The inner pressed contact point 314D is positioned inward of the outer pressed contact point 313D in the width direction. More specifically, the inner pressed contact point 314D faces rearward in the front-rear direction. The inner pressed contact point 314D is positioned rearward of the outer pressed contact point 313D in the front-rear direction. The inner pressed contact point 314D defines an inner end of the primary first terminal 310D in the width direction. Specifically, the inner pressed contact point 314D defines a rear end of the primary first terminal 310D in the front-rear direction.

As shown in FIG. 59, the insertion end portion 315D of the present embodiment has a substantially U-shaped cross-section in a plane perpendicular to the pitch direction. As shown in FIG. 67, the insertion end portion 315D is positioned below any of the pressed contact points 312D in the up-down direction. Specifically, the insertion end portion 315D is positioned below the outer pressed contact point 313D in the up-down direction, and the insertion end portion 315D is positioned below the inner pressed contact point 314D in the up-down direction. The insertion end portion 315D is positioned below the lock portion 317D in the up-down direction. The insertion end portion 315D is positioned below the fixed portion 318D in the up-down direction. The insertion end portion 315D is positioned below the coupling portion 319D in the up-down direction. The insertion end portion 315D defines a lower end of the primary first terminal 310D in the up-down direction.

As shown in FIG. 67, the lock portion 317D of the present embodiment is positioned between the insertion end portion 315D and any of the pressed contact points 312D in the up-down direction. The lock portion 317D is positioned below any of the pressed contact points 312D in the up-down direction. Specifically, the lock portion 317D is positioned below the outer pressed contact point 313D in the up-down direction. The lock portion 317D is positioned above the insertion end portion 315D in the up-down direction. The lock portion 317D is positioned below the fixed portion 318D in the up-down direction. The lock portion 317D is positioned below the coupling portion 319D in the up-down direction. The lock portion 317D is positioned outward of any of the pressed contact points 312D in the width direction. The lock portion 317D extends outward in the width direction from the outer pressed contact point 313D. More specifically, the lock portion 317D extends forward in the front-rear direction from the outer pressed contact point 313D.

Referring to FIG. 59, the fixed portion 318D of the present embodiment is soldered on a pad (not shown) of the circuit board when the first connector 100D is mounted on the circuit board. The fixed portion 318D defines an upper end of the primary first terminal 310D in the up-down direction. The fixed portion 318D defines an outer end of the primary first terminal 310D in the width direction. More specifically, the fixed portion 318D defines a front end of the primary first terminal 310D in the front-rear direction.

As shown in FIG. 67, the coupling portion 319D of the present embodiment couples the inner pressed contact point 314D with the fixed portion 318D. The coupling portion 319D is positioned between the inner pressed contact point 314D and the fixed portion 318D in the up-down direction. The coupling portion 319D is positioned above the inner pressed contact point 314D in the up-down direction. The coupling portion 319D is positioned below the fixed portion 318D in the up-down direction.

As shown in FIG. 67, the primary first terminal 310D has a primary pressed size Sa which is a largest size of the primary first terminal 310D in the width direction in an area of the primary first terminal 310D from the insertion end portion 315D to the pressed contact point 312D. The primary pressed size Sa of the present embodiment is equal to a distance between the inner pressed contact point 314D and a front end of the lock portion 317D.

Figure 69:
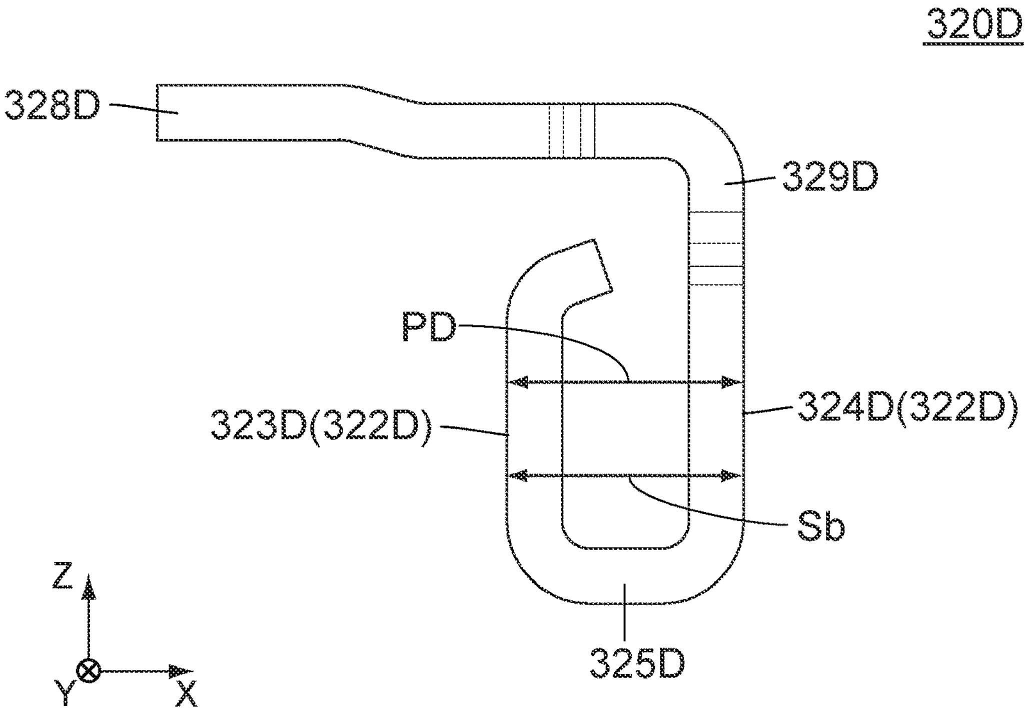
FIG. 69 is a side view showing the secondary first terminal of FIG. 68.

As shown in FIG. 69, each of the secondary first terminals 320D of the present embodiment has two pressed contact points 322D, an insertion end portion 325D, a fixed portion 328D and a coupling portion 329D. Dissimilar to the primary first terminal 310D, the secondary first terminal 320D has no lock portion As shown in FIG. 69, each of the pressed contact points 322D is positioned apart from the insertion end portion 325D in the up-down direction. Each of the pressed contact points 322D is positioned above the insertion end portion 325D in the up-down direction. The pressed contact points 322D are positioned apart from each other in the width direction perpendicular to the up-down direction. The pressed contact points 322D face in orientations different from each other in the width direction.

As shown in FIG. 69, the pressed contact points 322D consist of an outer pressed contact point 323D and an inner pressed contact point 324D.

As shown in FIG. 59, the outer pressed contact point 323D of the present embodiment faces outward in the width direction. The outer pressed contact point 323D is positioned outward of the inner pressed contact point 324D in the width direction. More specifically, the outer pressed contact point 323D faces rearward in the front-rear direction. The outer pressed contact point 323D is positioned rearward of the inner pressed contact point 324D in the front-rear direction.

As shown in FIG. 59, the inner pressed contact point 324D of the present embodiment faces inward in the width direction. The inner pressed contact point 324D is positioned inward of the outer pressed contact point 323D in the width direction. More specifically, the inner pressed contact point 324D faces forward in the front-rear direction. The inner pressed contact point 324D is positioned forward of the outer pressed contact point 323D in the front-rear direction. The inner pressed contact point 324D defines an inner end of the secondary first terminal 320D in the width direction. Specifically, the inner pressed contact point 324D defines a front end of the secondary first terminal 320D in the front-rear direction.

As shown in FIG. 59, the insertion end portion 325D of the present embodiment has a substantially U-shaped cross-section in the plane perpendicular to the pitch direction. As shown in FIG. 69, the insertion end portion 325D is positioned below any of the pressed contact points 322D in the up-down direction. The insertion end portion 325D is positioned below the outer pressed contact point 323D in the up-down direction. The insertion end portion 325D is positioned below the inner pressed contact point 324D in the up-down direction. The insertion end portion 325D is positioned below the fixed portion 328D in the up-down direction. The insertion end portion 325D is positioned below the coupling portion 329D in the up-down direction. The insertion end portion 325D defines a lower end of the secondary first terminal 320D in the up-down direction.

Referring to FIG. 59, the fixed portion 328D of the present embodiment is soldered on a pad (not shown) of the circuit board when the first connector 100D is mounted on the circuit board. The fixed portion 328D defines an upper end of the secondary first terminal 320D in the up-down direction. The fixed portion 328 defines an outer end of the secondary first terminal 320D in the width direction. Specifically, the fixed portion 328D defines a rear end of the secondary first terminal 320D in the front-rear direction.

As shown in FIG. 69, the coupling portion 329D of the present embodiment couples the inner pressed contact point 324D with the fixed portion 328D. The coupling portion 329D is positioned between the inner pressed contact point 324D and the fixed portion 328D in the up-down direction. The coupling portion 329D is positioned above the inner pressed contact point 324D in the up-down direction. The coupling portion 329D is positioned below the fixed portion 328D in the up-down direction.

As shown in FIG. 69, the secondary first terminal 320D has a secondary pressed size Sb which is a largest size of the secondary first terminal 320D in the width direction in an area of the secondary first terminal 320D from the insertion end portion 325D to the pressed contact point 322D. The secondary pressed size Sb of the present embodiment is equal to a distance PD between the outer pressed contact point 323D and the inner pressed contact point 324D in the width direction. Specifically, the pressed contact points 322D of the secondary first terminal 320D are positioned apart from each other in the width direction by a predetermined distance PD, and the secondary pressed size Sb and the predetermined distance PD meet a condition of Sb=PD.

Referring to FIG. 59, the secondary pressed size Sb is equal to the primary pressed size Sa. In other words, the primary pressed size Sa and the secondary pressed size Sb meet a condition of Sa=Sb.

As described above, each of the primary first terminals 310D has the two pressed contact points 312D and the insertion end portion 315D, and each of the secondary first terminals 320D has the two pressed contact points 322D and the insertion end portion 325D. In other words, each of the first terminals 300D has the two pressed contact points 312D, 322D and the insertion end portion 315D, 325D.

Referring to FIG. 57, the second connector 500D of the present embodiment is mountable on a circuit board (not shown) which is an object. The second connector 500D comprises a plurality of second terminals 700D and a second holding member 600D. Each of the second terminals 700D is made of metal. The second holding member 600D is made of insulator.

Figure 65:
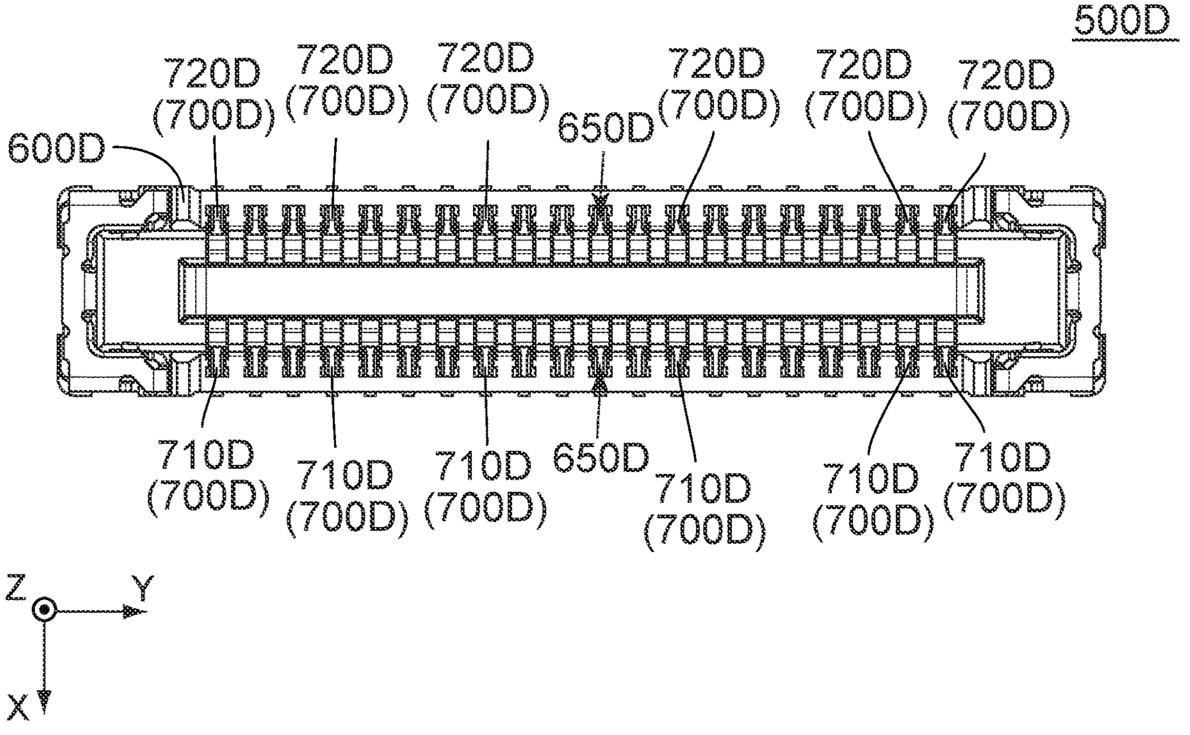
FIG. 65 is a top view showing the second connector which is included in the assembly of FIG. 57.

As shown in FIG. 65, the second connector 500D has two second terminal rows 650D which are positioned apart from each other in the width direction. In other words, the two second terminal rows 650D are positioned apart from each other in the front-rear direction.

As shown in FIG. 65, each of the second terminal rows 650D consists of the second terminals 700D which are arranged in the pitch direction perpendicular to both the up-down direction and the width direction.

Figure 60:
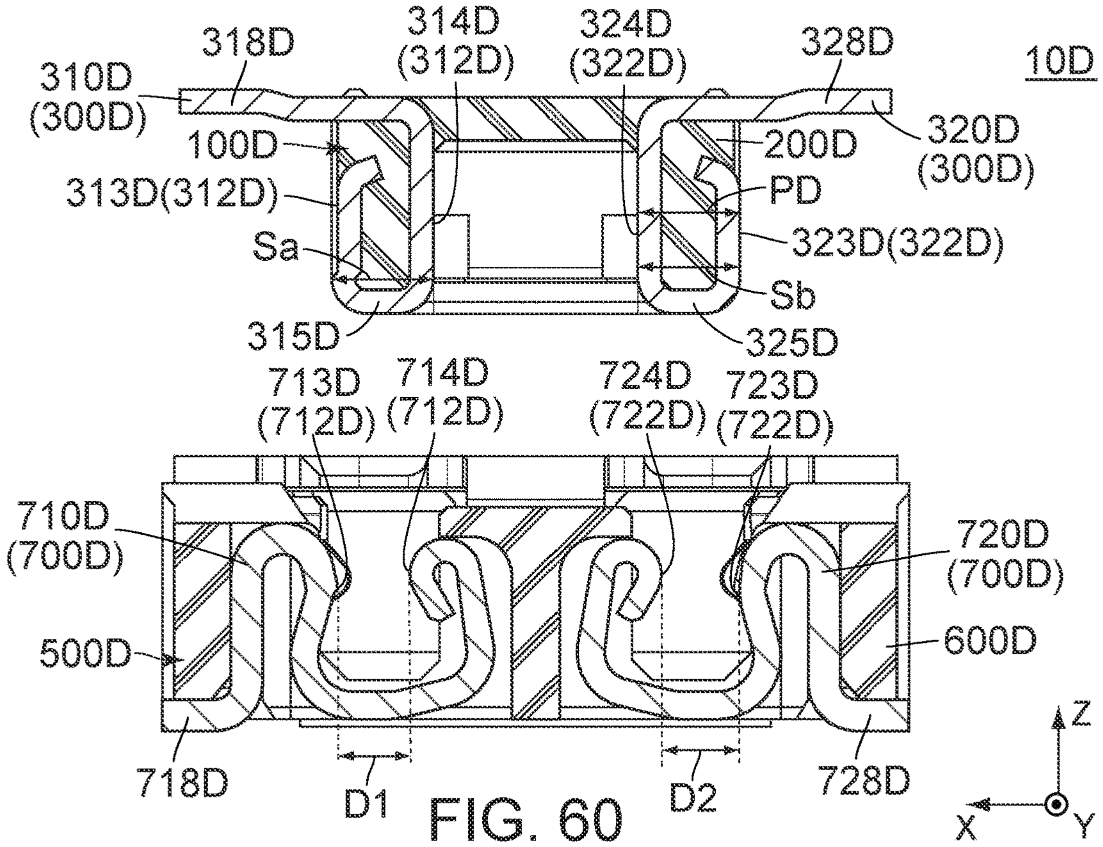
FIG. 60 is a cross-sectional view showing the assembly of FIG. 58, taken along line R-R.
Figure 61:
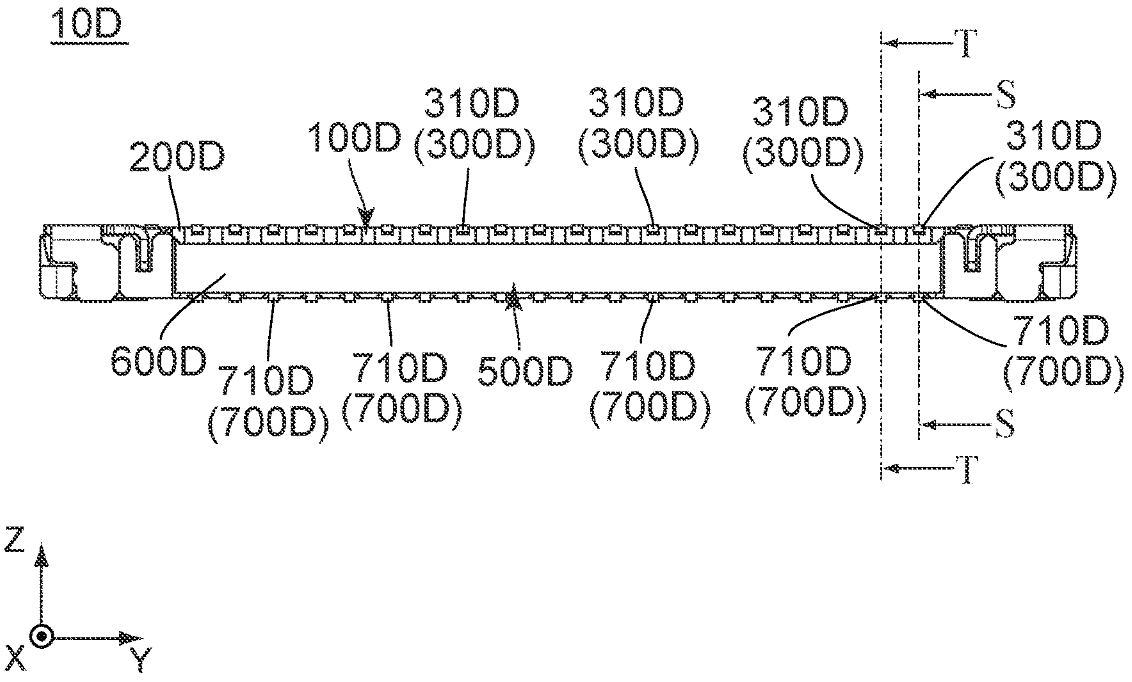
FIG. 61 is a side view showing the assembly of FIG. 57. In the figure, the first connector and the second connector are mated with each other.

As shown in FIG. 65, the second terminals 700D of the present embodiment are held by the second holding member 600D. Referring to FIGS. 59 and 60, the second terminals 700D correspond to the first terminals 300D, respectively. Referring to FIGS. 59, 60 and 65, the second terminals 700D consist of a plurality of primary second terminals 710D and a plurality of secondary second terminals 720D. In the present embodiment, the number of the primary second terminals 710D and the number of the secondary second terminals 720D are equal to each other. One of the second terminal rows 650D consists of only the primary second terminals 710D, and a remaining one of the second terminal rows 650D consists of only the secondary second terminals 720D. More specifically, the second terminal row 650D, which is positioned at a front side of the second connector 500D, consists of only the primary second terminals 710D, and the second terminal row 650D, which is positioned at a rear side of the second connector 500D, consists of only the secondary second terminals 720D. However, the present invention is not limited thereto. Specifically, the number of the primary second terminal 710D may be one, and the number of the secondary second terminal 720D may be one.

Figure 70:
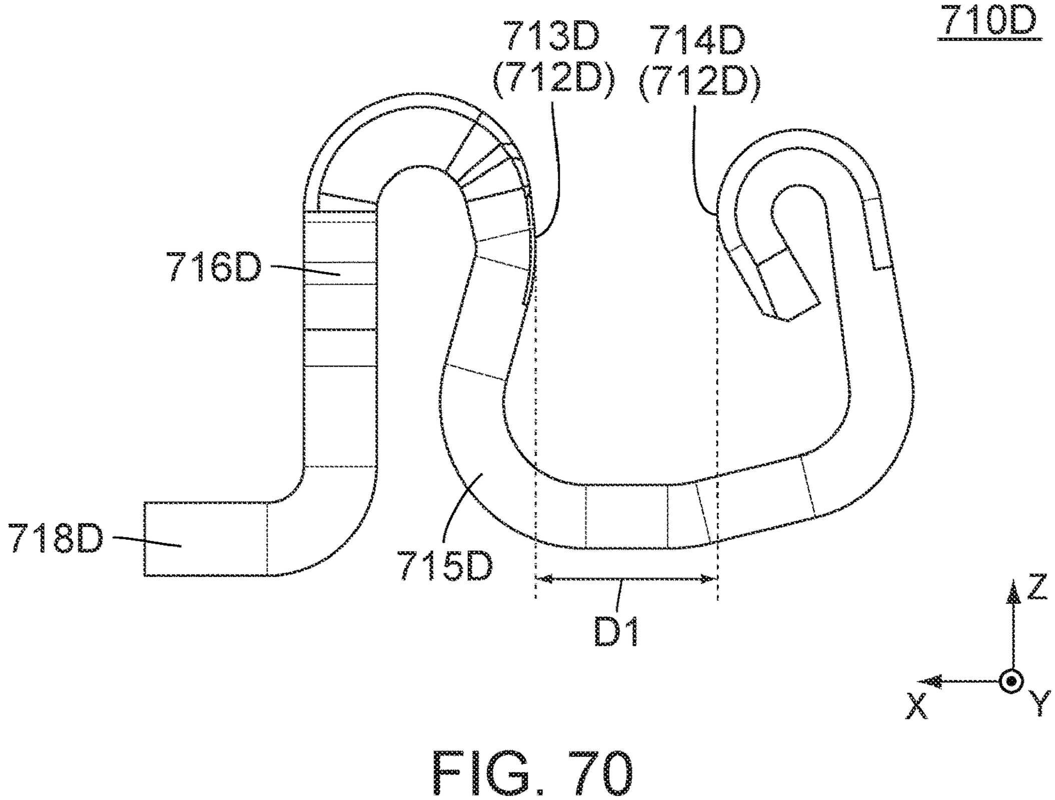
FIG. 70 is a side view showing a primary second terminal which is included in the second connector of FIG. 65.

As shown in FIG. 70, each of the primary second terminals 710D of the present embodiment has two pressing contact points 712D, a supporting portion 715D, a held portion 716D and a fixed portion 718D. The supporting portion 715D, the held portion 716D and the fixed portion 718D of the present embodiment have structures same as those of the supporting portion 715, the held portion 716 and the fixed portion 718 of the first embodiment. Accordingly, a detailed explanation thereabout is omitted.

As shown in FIG. 59, under an unmated state before the second connector 500D is mated with the first connector 100D, the pressing contact points 712D are spaced apart from each other in the width direction and face each other in the width direction. The pressing contact points 712D of the primary second terminal 710D are spaced apart from each other in the width direction by a primary pressing distance D1 under the unmated state. As shown in FIG. 62, the pressing contact points 712D of each of the primary second terminals 710D press the pressed contact points 312D, respectively, of the corresponding primary first terminal 310D under a mated state where the first connector 100D and the second connector 500D are mated with each other.

As shown in FIG. 70, the pressing contact points 712D consist of an outer pressing contact point 713D and an inner pressing contact point 714D. The outer pressing contact point 713D and the inner pressing contact point 714D of the present embodiment have structures same as those of the outer pressing contact point 713 and the inner pressing contact point 714 of the first embodiment. Accordingly, a detailed explanation thereabout is omitted.

Figure 71:
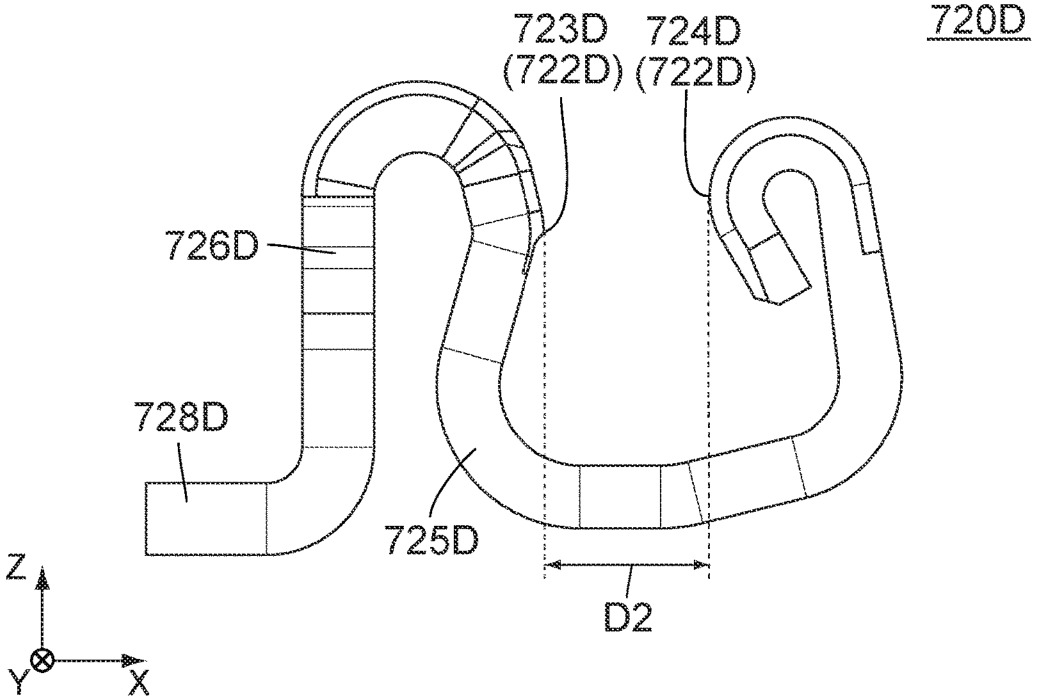
FIG. 71 is a side view showing a secondary second terminal which is included in the second connector of FIG. 65.
Figure 72:
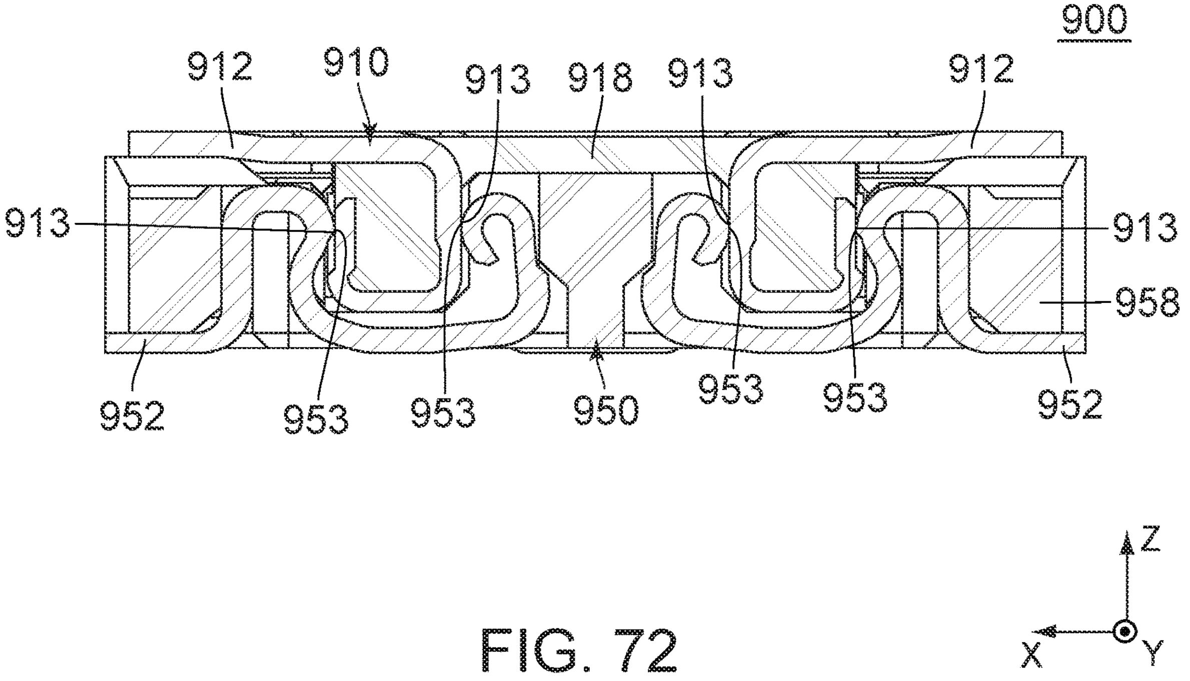
FIG. 72 PRIOR ART
FIG. 72 is a cross-sectional view showing an assembly of Patent Document 1.

As shown in FIG. 71, each of the secondary second terminals 720D of the present embodiment has two pressing contact points 722D, a supporting portion 725D, a held portion 726D and a fixed portion 728D.

As shown in FIG. 59, under the unmated state before the second connector 500D is mated with the first connector 100D, the pressing contact points 722D are spaced apart from each other in the width direction and face each other in the width direction. The pressing contact points 722D of the secondary second terminal 720D are spaced apart from each other in the width direction by a secondary pressing distance D2 under the unmated state. As shown in FIG. 62, the pressing contact points 722D of each of the secondary second terminals 720D press the pressed contact points 322D, respectively, of the corresponding secondary first terminal 320D under the mated state where the first connector 100D and the second connector 500D are mated with each other.

As shown in FIG. 71, the pressing contact points 722D consist of an outer pressing contact point 723D and an inner pressing contact point 724D.

As shown in FIG. 59, the outer pressing contact point 723D of the present embodiment faces inward in the width direction. The outer pressing contact point 723D is positioned outward of the inner pressing contact point 724D in the width direction. The outer pressing contact point 723D faces forward in the front-rear direction.

As shown in FIG. 59, the inner pressing contact point 724D of the present embodiment faces outward in the width direction. The inner pressing contact point 724D is positioned inward of the outer pressing contact point 723D in the width direction. The inner pressing contact point 724D faces rearward in the front-rear direction.

As shown in FIG. 59, under the unmated state, the outer pressing contact point 723D and the inner pressing contact point 724D are spaced apart from each other in the width direction and face each other in the width direction. The outer pressing contact point 723D and the inner pressing contact point 724D are spaced apart from each other in the width direction by the secondary pressing distance D2 under the unmated state. As shown in FIG. 62, the outer pressing contact point 723D of the secondary second terminal 720D presses the outer pressed contact point 323D of the corresponding secondary first terminal 320D in the width direction under the mated state. The inner pressing contact point 724D of the secondary second terminal 720D presses the inner pressed contact point 324D of the corresponding secondary first terminal 320D in the width direction under the mated state.

Referring to FIG. 59, the secondary pressing distance D2 is unequal to the primary pressing distance D1. In other words, the primary pressing distance D1 and the secondary pressing distance D2 meet a condition of $D1 \neq D2$. More specifically, in the present embodiment, the secondary pressing distance D2 is smaller than the primary pressing distance D1. In other words, the primary pressing distance D1 and the secondary pressing distance D2 meet a condition of $D2 < D1$.

As shown in FIG. 71, the supporting portion 725D of the present embodiment resiliently supports the two pressing contact points 722D. The supporting portion 725D extends from an upper end of the held portion 726D.

Referring to FIGS. 59 and 71, the held portion 726D of the present embodiment is held by the second holding member 600D. As shown in FIG. 71, the held portion 726D is positioned between the supporting portion 725D and the fixed portion 728D in the width direction. The held portion 726D extends downward in the up-down direction from an outer end of the supporting portion 725D in the width direction. The held portion 726D extends upward in the up-down direction from an inner end of the fixed portion 728D in the width direction.

Referring to FIG. 59, the fixed portion 728D of the present embodiment is soldered to a pad (not shown) of the circuit board when the second connector 500D is mounted on the circuit board. As shown in FIG. 71, the fixed portion 728D defines a lower end of the secondary second terminal 720D in the up-down direction. The fixed portion 728D defines an outer end of the secondary second terminal 720D in the width direction. The fixed portion 728D extends outward in the width direction from a lower end of the held portion 726D.

As described above, each of the primary second terminals 710D has the two pressing contact points 712D while each of the secondary second terminals 720D has the two pressing contact points 722D. In other words, each of the second terminals 700D has the two pressing contact points 712D, 722D.

Referring to FIG. 59, a first size S1 is unequal to a second size S2, where the first size S1 is a difference of the primary pressed size Sa minus the primary pressing distance D1, and the second size S2 is a difference of the secondary pressed size Sb minus the secondary pressing distance D2. In other words, the first size S1 and the second size S2 meet a condition of $S1 \neq S2$, where $S1 = Sa - D1$, and $S2 = Sb - D2$.

As described above, the assembly 10D of the present embodiment is configured as follows: the pressing contact points 712D, 722D of each of the second terminals 700D press the pressed contact points 312D, 322D, respectively, of the corresponding first terminal 300D in the width direction under the mated state where the first connector 100D and the second connector 500D are mated with each other; and the first size S1 and the second size S2 meet the condition of $S1 \neq S2$. Accordingly, upon the mating of the first connector 100D with the second connector 500D, the assembly 10D of the present embodiment requires a reduced insertion force while the first terminal 300D and the corresponding second terminal 700D are brought into contact with each other by two points so that a reliable connection of the first terminal 300D and the corresponding second terminal 700D is ensured.

Especially, in the present embodiment, the first size S1 is smaller than the second size S2. In other words, the first size S1 and the second size S2 meet a condition of $S1 < S2$. Accordingly, the assembly 10D of the present embodiment is configured so that, upon the mating of the first connector 100D with the second connector 500D, a force, which the primary first terminal 310D receives from the primary second terminal 710D, is smaller than a force which the secondary first terminal 320D receives from the secondary second terminal 720D. Specifically, the assembly 10D of the present embodiment reliably reduces a required insertion force upon the mating of the first connector 100D with the second connector 500D.

Although the specific explanation about the present invention is made above referring to the embodiments, the present invention is not limited thereto and is susceptible to various modifications and alternative forms. In addition, the above embodiments and variations may also be combined.

Although the secondary pressing distance D2 is unequal to the primary pressing distance D1 in the aforementioned embodiments and modifications, the present invention is not limited thereto. Specifically, the secondary pressing distance D2 may be equal to the primary pressing distance D1, provided that the first size S1 is unequal to the second size S2, where $S1 = Sa - D1$, and $S2 = Sb - D2$. In other words, the assembly 10, 10A, 10B, 10D may meet both conditions of $D1 = D2$ and $S1 \neq S2$.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An assembly comprising a first connector and a second connector, wherein:

the first connector is mateable with the second connector in an up-down direction;

the first connector comprises a plurality of first terminals and a first holding member;

the first terminals are held by the first holding member;

each of the first terminals has two pressed contact points and an insertion end portion;

each of the pressed contact points is positioned apart from the insertion end portion in the up-down direction;

the pressed contact points are positioned apart from each other in a width direction perpendicular to the up-down direction;

the pressed contact points face in orientations different from each other in the width direction;

the first terminals include at least one primary first terminal and at least one secondary first terminal;

the primary first terminal has a primary pressed size Sa which is a largest size of the primary first terminal in the width direction in an area of the primary first terminal from the insertion end portion to the pressed contact point;

the secondary first terminal has a secondary pressed size Sb which is a largest size of the secondary first terminal in the width direction in an area of the secondary first terminal from the insertion end portion to the pressed contact point;

the second connector comprises a plurality of second terminals and a second holding member;

the second terminals correspond to the first terminals, respectively;

the second terminals are held by the second holding member;

each of the second terminals has two pressing contact points;

under an unmated state before the second connector is mated with the first connector, the pressing contact points are spaced apart from each other in the width direction and face each other in the width direction;

under a mated state where the first connector and the second connector are mated with each other, the pressing contact points of each of the second terminals press the pressed contact points, respectively, of the corresponding first terminal in the width direction;

the second terminals include a primary second terminal and at least one secondary second terminal;

the primary second terminal corresponds to the primary first terminal;

the secondary second terminal corresponds to the secondary first terminal;

the pressing contact points of the primary second terminal are spaced apart from each other in the width direction by a primary pressing distance D1 under the unmated state;

the pressing contact points of the secondary second terminal are spaced apart from each other in the width direction by a secondary pressing distance D2 under the unmated state; and a first size S1 and a second size S2 meet a condition of S1≠S2, where S1=Sa−D1, and S2=Sb−D2.

2. The assembly as recited in claim 1, wherein:

at least ones of the first terminals are arranged in a pitch direction perpendicular to both the up-down direction and the width direction so that the at least ones of the first terminals form a terminal row; and the terminal row includes the primary first terminal and the secondary first terminal.

3. The assembly as recited in claim 1, wherein:

the first connector has two first terminal rows which are positioned apart from each other in the width direction;

each of the first terminal rows consists of the first terminals which are arranged in a pitch direction perpendicular to both the up-down direction and the width direction;

the at least one primary first terminal includes a plurality of the primary first terminals;

the at least one secondary first terminal includes a plurality of the secondary first terminals;

each of the first terminal rows includes the primary first terminal and the secondary first terminal;

the primary first terminals of the two first terminal rows are arranged in two-fold rotational symmetry in a plane perpendicular to the up-down direction; and the secondary first terminals of the two first terminal rows are arranged in two-fold rotational symmetry in the plane perpendicular to the up-down direction.

4. The assembly as recited in claim 1, wherein the primary pressing distance D1 and the secondary pressing distance D2 meet a condition of D1≠D2.

5. The assembly as recited in claim 1, wherein:

the second connector is mountable on an object;

the at least one secondary second terminal includes a plurality of the secondary second terminals;

each of the secondary second terminals has a supporting portion, a held portion and a fixed portion;

the supporting portion resiliently supports the two pressing contact points;

the held portion is press-fit into the second holding member;

the fixed portion is fixed to the object when the second connector is mounted on the object;

the second holding member is provided with an opening; and the fixed portions of the plurality of secondary second terminals are visible through the opening when the second connector is viewed along the up-down direction.

6. The assembly as recited in claim 1, wherein the primary first terminal and the secondary first terminal are positioned apart from each other in the width direction.

7. The assembly as recited in claim 6, wherein:

the first connector has two terminal rows which are positioned apart from each other in the width direction;

each of the terminal rows consist of the first terminals which are arranged in a pitch direction perpendicular to both the up-down direction and the width direction;

the at least one primary first terminal includes a plurality of the primary first terminals;

the at least one secondary first terminal includes a plurality of the secondary first terminals;

one of the terminal rows consists of only the primary first terminals; and a remaining one of the terminal rows consists of only the secondary first terminals.

8. The assembly as recited in claim 1, wherein the primary pressed size Sa and the secondary pressed size Sb meet a condition of Sa≠Sb.

9. The assembly as recited in claim 8, wherein:

the pressed contact points of the secondary first terminal are positioned apart from each other in the width direction by a predetermined distance PD; and the secondary pressed size Sb and the predetermined distance PD meet a condition of Sb=PD.

10. A first connector that is mateable with a second connector in an up-down direction, the first connector comprising:

a plurality of first terminals and a first holding member; wherein:

the first terminals are held by the first holding member;

each of the first terminals has two pressed contact points and an insertion end portion;

each of the pressed contact points is positioned apart from the insertion end portion in the up-down direction;

the pressed contact points are positioned apart from each other in a width direction perpendicular to the up-down direction;

the pressed contact points face in orientations different from each other in the width direction;

the first terminals include at least one primary first terminal and at least one secondary first terminal;

the primary first terminal has a primary pressed size Sa which is a largest size of the primary first terminal in the width direction in an area of the primary first terminal from the insertion end portion to the pressed contact point;

the secondary first terminal has a secondary pressed size Sb which is a largest size of the secondary first terminal in the width direction in an area of the secondary first terminal from the insertion end portion to the pressed contact point;

the second connector comprises a plurality of second terminals and a second holding member;

the second terminals correspond to the first terminals, respectively;

the second terminals are held by the second holding member;

each of the second terminals has two pressing contact points;

under an unmated state before the second connector is mated with the first connector, the pressing contact points are spaced apart from each other in the width direction and face each other in the width direction;

under a mated state where the first connector and the second connector are mated with each other, the pressing contact points of each of the second terminals press the pressed contact points, respectively, of the corresponding first terminal in the width direction;

the second terminals include a primary second terminal and at least one secondary second terminal;

the primary second terminal corresponds to the primary first terminal;

the secondary second terminal corresponds to the secondary first terminal;

the pressing contact points of the primary second terminal are spaced apart from each other in the width direction by a primary pressing distance D1 under the unmated state;

the pressing contact points of the secondary second terminal are spaced apart from each other in the width direction by a secondary pressing distance D2 under the unmated state;

a first size S1 and a second size S2 meet a condition of S1≠S2, where S1=Sa−D1, and S2=Sb−D2; and the primary pressed size Sa and the secondary pressed size Sb meet a condition of Sa≠Sb.

11. A second connector that is mateable with a first connector in an up-down direction, wherein the first connector comprises a plurality of first terminals and a first holding member, the first terminals are held by the first holding member, each of the first terminals has two pressed contact points and an insertion end portion, each of the pressed contact points is positioned apart from each other in a width direction perpendicular to the up-down direction, the pressed contact points face in orientations different from each other in the width direction, the first terminals include at least one primary first terminal and at least one secondary first terminal, the primary first terminal has a primary pressed size Sa which is a largest size of the primary first terminal in the width direction in an area of the primary first terminal from the insertion end portion to the pressed contact point, the secondary first terminal has a secondary pressed size Sb which is a largest size of the secondary first terminal in the width direction in an area of the secondary first terminal from the insertion end portion to the pressed contact point, the second connector comprising:

a plurality of second terminals and a second holding member;

wherein:

the second terminals correspond to the first terminals, respectively;

the second terminals are held by the second holding member;

each of the second terminals has two pressing contact points;

under an unmated state before the second connector is mated with the first connector, the pressing contact points are spaced apart from each other in the width direction and face each other in the width direction;

under a mated state where the first connector and the second connector are mated with each other, the pressing contact points of each of the second terminals press the pressed contact points, respectively, of the corresponding first terminal in the width direction;

the second terminals include a primary second terminal and at least one secondary second terminal;

the primary second terminal corresponds to the primary first terminal;

the secondary second terminal corresponds to the secondary first terminal;

the pressing contact points of the primary second terminal are spaced apart from each other in the width direction by a primary pressing distance D1 under the unmated state;

the pressing contact points of the secondary second terminal are spaced apart from each other in the width direction by a secondary pressing distance D2 under the unmated state;

a first size S1 and a second size S2 meet a condition of S1≠S2, where S1=Sa−D1, and S2=Sb−D2; and the primary pressing distance D1 and the secondary pressing distance D2 meet a condition of D1=D2.

* * * * *